(12) United States Patent
Lyu et al.

(10) Patent No.: US 11,067,777 B2
(45) Date of Patent: Jul. 20, 2021

(54) OPTICAL IMAGING SYSTEM

(71) Applicant: Zhejiang Sunny Optical Co., Ltd, Ningbo (CN)

(72) Inventors: Saifeng Lyu, Ningbo (CN); Jianke Wenren, Ningbo (CN); Ling Ding, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 291 days.

(21) Appl. No.: 16/273,700

(22) Filed: Feb. 12, 2019

(65) Prior Publication Data
US 2019/0170984 A1   Jun. 6, 2019

Related U.S. Application Data

(63) Continuation of application No. PCT/CN2018/092869, filed on Jun. 26, 2018.

(30) Foreign Application Priority Data

Nov. 2, 2017 (CN) .......................... 201711066338.7
Nov. 2, 2017 (CN) .......................... 201721446626.0

(51) Int. Cl.
*G02B 13/00* (2006.01)
*G02B 13/18* (2006.01)
(Continued)

(52) U.S. Cl.
CPC ........... *G02B 13/0045* (2013.01); *G02B 9/64* (2013.01); *G02B 13/0055* (2013.01); *G02B 13/04* (2013.01); *G02B 13/18* (2013.01)

(58) Field of Classification Search
CPC .... G02B 13/0045; G02B 13/04; G02B 13/18; G02B 9/64; G02B 13/0055
(Continued)

(56) References Cited

U.S. PATENT DOCUMENTS

| 6,154,314 A | 11/2000 | Takahashi |
| 2011/0279906 A1* | 11/2011 | Komatsu ............... G02B 15/177 359/680 |

(Continued)

FOREIGN PATENT DOCUMENTS

| CN | 204925495 | 12/2015 |
| CN | 105988193 | 10/2016 |

(Continued)

*Primary Examiner* — Mohammed A Hasan
(74) *Attorney, Agent, or Firm* — Hauptman Ham, LLP

(57) ABSTRACT

The present disclosure discloses an optical imaging system. The optical imaging system includes, sequentially from an object side to an image side, a first lens having a negative refractive power; a second lens having a refractive power; a third lens having a negative refractive power; a fourth lens having a refractive power; a fifth lens having a refractive power; a sixth lens having a refractive power; and a seventh lens having a refractive power. There is an air spacing on an optical axis between any two adjacent lenses in the first to seventh lenses. An effective focal length f of the optical imaging system and an entrance pupil diameter EPD of the optical imaging system satisfy: f/EPD≤2.10. The effective focal length f of the optical imaging system and an effective focal length f1 of the first lens satisfy: f1/f>-3.

20 Claims, 16 Drawing Sheets

(51) Int. Cl.
*G02B 9/64* (2006.01)
*G02B 13/04* (2006.01)

(58) Field of Classification Search
USPC .......................................................... 359/755
See application file for complete search history.

(56) References Cited

U.S. PATENT DOCUMENTS

| | | |
|---|---|---|
| 2012/0212836 A1 | 8/2012 | Hsieh et al. |
| 2014/0043694 A1 | 2/2014 | Tsai et al. |
| 2015/0022908 A1 | 1/2015 | Tomioka |
| 2016/0085053 A1 | 3/2016 | Asami |
| 2016/0109687 A1 | 4/2016 | Son |
| 2016/0320590 A1 | 11/2016 | Mori |
| 2017/0139185 A1 | 5/2017 | Tang et al. |
| 2017/0254986 A1 | 9/2017 | Lai et al. |
| 2017/0336603 A1* | 11/2017 | Chen .................. G02B 13/0045 |
| 2019/0187413 A1* | 6/2019 | Oinuma ............. G02B 27/0025 |

FOREIGN PATENT DOCUMENTS

| | | |
|---|---|---|
| CN | 106125260 | 11/2016 |
| CN | 206020792 | 3/2017 |
| CN | 106772951 | 5/2017 |
| CN | 106932887 | 7/2017 |
| CN | 106932889 | 7/2017 |
| CN | 106959499 | 7/2017 |
| CN | 206515544 | 9/2017 |
| CN | 107664829 | 2/2018 |
| CN | 107728290 | 2/2018 |
| CN | 207440372 | 6/2018 |
| JP | 2004-354435 | 12/2004 |

\* cited by examiner

OPTICAL IMAGING SYSTEM

CROSS-REFERENCE TO RELATED APPLICATIONS

This application is a continuation of International Application No. PCT/CN2018/092869, filed on Jun. 26, 2018, which claims the priorities and rights to Chinese Patent Application No. 201711066338.7 and Chinese Patent Application No. 201721446626.0, filed with the China National Intellectual Property Administration (CNIPA) on Nov. 2, 2017. All of the aforementioned applications are hereby incorporated by reference in their entirety.

TECHNICAL FIELD

The present disclosure relates to an optical imaging system, and specifically to an optical imaging system including seven lenses.

BACKGROUND

With the rapid upgrade of consumer electronics such as cell phones and tablet computers, the market demand for the imaging lens assembly at the product side is becoming increasingly diverse. At present, in addition to requiring the imaging lens assembly to have characteristics such as high pixel, high resolution, and high relative brightness, higher requirements on large aperture, wide field-of-view, etc. have been brought forward, to satisfy imaging demands in various areas.

Therefore, the present disclosure provides an optical imaging system which may be applicable to portable electronic products and has characteristics such as large aperture, good imaging quality, and wide-angle.

SUMMARY

In order to solve at least one problem in the existing technology, the present disclosure provides an optical imaging system.

According to an aspect, the present disclosure provides an optical imaging system. The optical imaging system includes, sequentially from an object side to an image side, a first lens having a negative refractive power; a second lens having a refractive power; a third lens having a negative refractive power; a fourth lens having a refractive power; a fifth lens having a refractive power; a sixth lens having a refractive power; and a seventh lens having a refractive power. There is an air spacing between any two adjacent lenses in the first to seventh lenses on an optical axis. An effective focal length f of the optical imaging system and an entrance pupil diameter EPD of the optical imaging system satisfy: $f/EPD \leq 2.10$. The effective focal length f of the optical imaging system and an effective focal length f1 of the first lens satisfy: $f1/f > -3$.

According to an implementation of the present disclosure, an axial distance TTL from an object-side surface of the first lens to an image plane and half of a diagonal length ImgH of an effective pixel area on the image plane satisfy: $2 \leq TTL/ImgH \leq 6$.

According to an implementation of the present disclosure, the effective focal length f of the optical imaging system and a radius of curvature R12 of an image-side surface of the sixth lens satisfy: $-1.5 \leq f/R12 \leq 0$.

According to an implementation of the present disclosure, the effective focal length f of the optical imaging system and a radius of curvature R3 of an object-side surface of the second lens satisfy: $0 \leq f/R3 \leq 1.5$.

According to an implementation of the present disclosure, the effective focal length f1 of the first lens and an effective focal length f7 of the seventh lens satisfy: $0 < f1/f7 \leq 1.5$.

According to an implementation of the present disclosure, a radius of curvature R5 of an object-side surface of the third lens and a radius of curvature R6 of an image-side surface of the third lens satisfy: $0.5 \leq |R5+R6|/|R5-R6|$.

According to an implementation of the present disclosure, an effective focal length f4 of the fourth lens and an effective focal length f6 of the sixth lens satisfy: $0 \leq f4/f6 \leq 2$.

According to an implementation of the present disclosure, an effective focal length f5 of the fifth lens, a radius of curvature R2 of an image-side surface of the first lens, and the radius of curvature R3 of the object-side surface of the second lens satisfy: $2 \leq |f5/R2|+|f5/R3| \leq 15$.

According to an implementation of the present disclosure, the axial distance TTL from the object-side surface of the first lens to the image plane and an air spacing T12 on the optical axis between the first lens and the second lens satisfy: $0 < T12/TTL < 0.5$.

According to an implementation of the present disclosure, a refractive index N3 of the third lens, a refractive index N5 of the fifth lens, and a refractive index N7 of the seventh lens satisfy: $1.5 \leq |N3+N5+N7|/3$.

According to an implementation of the present disclosure, an effective focal length f2 of the second lens, an effective focal length f3 of the third lens, the effective focal length f4 of the fourth lens, the effective focal length f5 of the fifth lens, the effective focal length f6 of the sixth lens, and the effective focal length f7 of the seventh lens satisfy: $|f5+f6+f7|/|f2+f3+f4| \leq 2$.

According to another aspect, the present disclosure provides an optical imaging system. The optical imaging system includes, sequentially from an object side to an image side, a first lens having a negative refractive power; a second lens having a refractive power, wherein an object-side surface of the second lens is a convex surface; a third lens having a refractive power, wherein an object-side surface of the third lens is a concave surface; a fourth lens having a refractive power; a fifth lens having a refractive power; a sixth lens having a refractive power; and a seventh lens having a negative refractive power. An effective focal length f of the optical imaging system and an entrance pupil diameter EPD of the optical imaging system satisfy: $f/EPD \leq 2.10$. Half of a maximal field-of-view HFOV of the optical imaging system satisfies: $HFOV \geq 60°$.

According to an implementation of the present disclosure, an axial distance TTL from an object-side surface of the first lens to an image plane and half of a diagonal length ImgH of an effective pixel area on the image plane satisfy: $2 \leq TTL/ImgH \leq 6$.

According to an implementation of the present disclosure, the effective focal length f of the optical imaging system and a radius of curvature R12 of an image-side surface of the sixth lens satisfy: $-1.5 \leq f/R12 \leq 0$.

According to an implementation of the present disclosure, the effective focal length f of the optical imaging system and a radius of curvature R3 of the object-side surface of the second lens satisfy: $0 \leq f/R3 \leq 1.5$.

According to an implementation of the present disclosure, an effective focal length f1 of the first lens and an effective focal length f7 of the seventh lens satisfy: $0 < f1/f7 \leq 1.5$.

According to an implementation of the present disclosure, a radius of curvature R5 of the object-side surface of the third lens and a radius of curvature R6 of an image-side surface of the third lens satisfy: $0.5 \leq |R5+R6|/|R5-R6|$.

According to an implementation of the present disclosure, an effective focal length f4 of the fourth lens and an effective focal length f6 of the sixth lens satisfy: $0 \leq f4/f6 \leq 2$.

According to an implementation of the present disclosure, an effective focal length f5 of the fifth lens, a radius of curvature R2 of an image-side surface of the first lens, and the radius of curvature R3 of the object-side surface of the second lens satisfy: $2 \leq |f5/R2|+|f5/R3| \leq 15$.

According to an implementation of the present disclosure, the axial distance TTL from the object-side surface of the first lens to the image plane and an air spacing T12 on an optical axis between the first lens and the second lens satisfy: $0 < T12/TTL < 0.5$.

According to an implementation of the present disclosure, a refractive index N3 of the third lens, a refractive index N5 of the fifth lens, and a refractive index N7 of the seventh lens satisfy: $1.5 \leq |N3+N5+N7|/3$.

According to an implementation of the present disclosure, an effective focal length f2 of the second lens, an effective focal length f3 of the third lens, the effective focal length f4 of the fourth lens, the effective focal length f5 of the fifth lens, the effective focal length f6 of the sixth lens, and the effective focal length f7 of the seventh lens satisfy: $|f5+f6+f7|/|f2+f3+f4| \leq 2$.

The optical imaging system according to the present disclosure may be applicable to portable electronic products, which is an optical imaging system having characteristics of a large aperture, a good imaging quality, and wide-angle.

BRIEF DESCRIPTION OF THE DRAWINGS

By describing non-limiting implementations below in detail and in combination with the accompanying drawings, other features, objectives and advantages of the present disclosure will be more apparent. In the accompanying drawings.

DETAILED DESCRIPTION OF EMBODIMENTS

Figure 1:
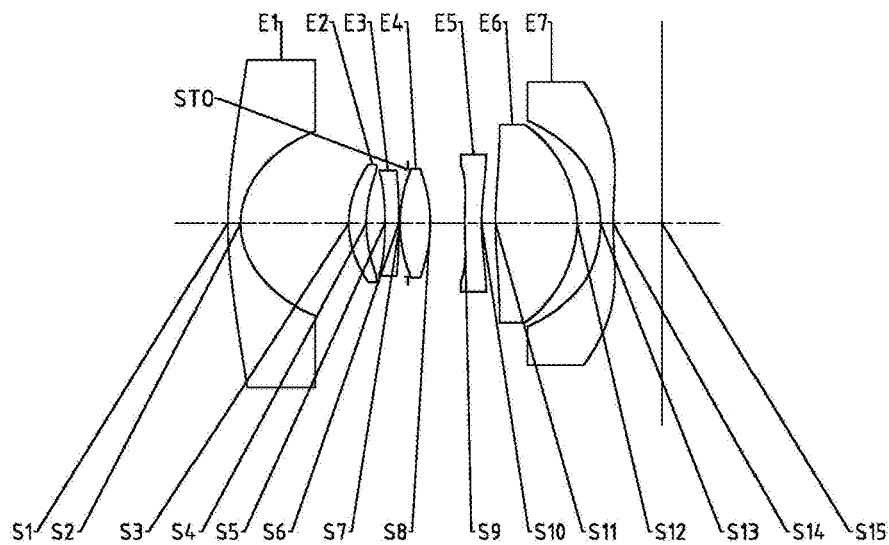
FIG. 1 is a schematic structural diagram illustrating an optical imaging system according to Embodiment 1.

The present disclosure will be further described below in detail in combination with the accompanying drawings and the embodiments. It could be appreciated that the specific embodiments described herein are merely used for explaining the relevant invention, rather than limiting the invention. In addition, it should be noted that, for the ease of description, only the parts related to the relevant invention are shown in the accompanying drawings.

It should be understood that in the present disclosure, when an element or a layer is referred to as being "on," "connected to" or "coupled to" another element or layer, it may be directly on, connected or coupled to another element or layer, or an intervening element or layer may be present. When an element is referred to as being "directly on," "directly connected to" or "directly coupled to" another element or layer, there are no intervening elements or layers present. The same reference numerals designate the same elements throughout this specification. As used herein, the term "and/or" includes any and all combinations of one or more of the associated listed items.

It should be understood that, although terms such as "first" and "second" may be used herein to describe various elements, components, areas, layers and/or sections, these elements, components, areas, layers and/or sections should not be limited by these terms. These terms are used to distinguish one element, component, area, layer or section from another element, component, area, layer or section. Thus, a first element, component, area, layer or section discussed below could be termed a second element, component, area, layer or section without departing from the teachings of the present disclosure.

The terminology used herein is for the purpose of describing specific implementations only and is not intended to limit the present disclosure. As used herein, the singular forms "a," "an" and "the" are intended to include the plural forms as well, unless the context clearly indicates otherwise. It should be further understood that the terms "comprising," "including," "having" and variants thereof, when used in this specification, specify the presence of stated features, entireties, steps, operations, elements and/or components, but do not preclude the presence or addition of one or more other features, entireties, steps, operations, elements, components and/or groups thereof. As used herein, the term "and/or" includes any and all combinations of one or more of the associated listed items. Expressions such as "at least one of," when preceding a list of elements, modify the entire list of elements rather than an individual element in the list. Further, the use of "may," when describing implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The present disclosure provides an optical imaging system. The optical imaging system includes, sequentially from an object side to an image side, a first lens having a negative refractive power, a second lens having a refractive power, a third lens having a negative refractive power, a fourth lens having a refractive power, a fifth lens having a refractive power, a sixth lens having a refractive power, and a seventh lens having a refractive power.

In the embodiments of the present disclosure, there is an air spacing on an optical axis between any two adjacent lenses in the first to seventh lenses.

In the embodiments of the present disclosure, an effective focal length f of the optical imaging system and an entrance pupil diameter EPD of the optical imaging system satisfy: $f/EPD \leq 2.10$. Specifically, $f/EPD \leq 2.03$ is satisfied. The effective focal length f of the optical imaging system and an effective focal length f1 of the first lens satisfy: $f1/f > -3$. Specifically, $f1/f2 \geq -2.69$ is satisfied. By satisfying the above relationships, the amount of light admitted can be increased and the shooting effect in an environment of insufficient light can be enhanced. At the same time, it is conducive to mitigating the deflection of the light, increasing the field-of-view, and ensuring the miniaturization and imaging quality of the lens assembly.

In the embodiments of the present disclosure, an axial distance TTL from an object-side surface of the first lens to an image plane and half of a diagonal length ImgH of an effective pixel area on the image plane satisfy: $2 \leq TTL/ImgH \leq 6$. Specifically, $2.14 \leq TTL/ImgH \leq 5.91$ is satisfied. By satisfying the above relationship, the miniaturization of the lens assembly can be maintained. At the same time, the imaging quality of the system can be ensured.

In the embodiments of the present disclosure, the effective focal length f of the optical imaging system and a radius of curvature R12 of an image-side surface of the sixth lens satisfy: $-1.5 \leq f/R12 \leq 0$. Specifically, $-1.25 \leq f/R12 \leq -0.38$ is satisfied. By satisfying the above relationship, the high-order comatic aberration and the high-order tangential astigmatism can be improved, thereby enhancing the imaging quality.

In the embodiments of the present disclosure, the effective focal length f of the optical imaging system and a radius of curvature R3 of an object-side surface of the second lens satisfy: $0 \leq f/R3 \leq 1.5$. Specifically, $0.18 \leq f/R3 \leq 1.28$ is satisfied. By satisfying the above relationship, the incident angle of the ray entering a wide-angle lens assembly can be mitigated, which is conducive to increasing the field-of-view and correcting the aberration.

In the embodiments of the present disclosure, the effective focal length f1 of the first lens and an effective focal length f7 of the seventh lens satisfy: $0 < f1/f7 \leq 1.5$. More specifically, $0.12 \leq f1/f7 \leq 1.36$ is satisfied. By distributing the refractive power of the first lens and the refractive power of the seventh lens, it is conducive to mitigating the incident angle of the wide-angle lens assembly, to match the CRA of a chip, At the same time, the astigmatism may be effectively corrected, and the distortion may be effectively reduced.

In the embodiments of the present disclosure, a radius of curvature R5 of an object-side surface of the third lens and a radius of curvature R6 of an image-side surface of the third lens satisfy: 0.5≤|R5+R6|/|R5−R6|. More specifically, 0.74≤|R5+R6|/|R5−R6| is satisfied. By satisfying the above relationship, the radius of curvature of the object-side surface of the third lens and the radius of curvature of the image-side surface of the third lens can be reasonably distributed, which is conducive to correcting a spherical aberration, and reducing the sensitivity of the field in the central area of the system.

In the embodiments of the present disclosure, an effective focal length f4 of the fourth lens and an effective focal length f6 of the sixth lens satisfy: 0≤f4/f6≤2. Specifically, 0.55≤f4/f6≤1.79 is satisfied. By reasonably distributing the effective focal length of the fourth lens and the effective focal length of the sixth lens, the high-order spherical aberration may be reduced, and at the same time, the chromatic aberration may be effectively corrected by cooperating with the fifth lens.

In the embodiments of the present disclosure, an effective focal length f5 of the fifth lens, a radius of curvature R2 of an image-side surface of the first lens, and the radius of curvature R3 of the object-side surface of the second lens satisfy: 2≤|f5/R2|+|f5/R3|≤15. Specifically, 1.24≤|f5/R2|+|f5/R3|≤5.65 is satisfied. Satisfying the above relationship is conducive to correcting the chromatic aberration of the wide-angle lens assembly, thereby improving the imaging quality of the optical system. At the same time, it is conducive to reducing the sensitivity of the system.

In the embodiments of the present disclosure, the axial distance TTL from the object-side surface of the first lens to the image plane and an air spacing T12 on the optical axis between the first lens and the second lens satisfy: 0<T12/TTL<0.5. Specifically, 0.10≤T12/TTL≤0.38 is satisfied. Satisfying the above relationship is conducive to mitigating the incident ray, improving the high-order aberration of the wide-angle system, and enhancing the imaging effect.

In the embodiments of the present disclosure, a refractive index N3 of the third lens, a refractive index N5 of the fifth lens, and a refractive index N7 of the seventh lens satisfy: 1.5|N3+N5+N7|/3. Specifically, 1.67≤|N3+N5+N7|/3 is satisfied. Satisfying the above relationship is conducive to correcting the aberration of the entire system, and maintaining the miniaturization of the lens assembly. At the same time, it facilitates the system having a good imaging performance.

In the embodiments of the present disclosure, an effective focal length f2 of the second lens, an effective focal length f3 of the third lens, the effective focal length f4 of the fourth lens, the effective focal length f5 of the fifth lens, the effective focal length f6 of the sixth lens, and the effective focal length f7 of the seventh lens satisfy: |f5+f6+f7|/|f2+f3+f4|≤2. Specifically, |f5+f6+f7|/|f2+f3+f4|≤1.74 is satisfied. Satisfying the above relationship is conducive to achieving the compactness of the system, maintaining the miniaturization of the lens assembly, ensuring a good imaging performance and a good processing characteristic. At the same time, it facilitates the system having the characteristic of low sensitivity.

The present disclosure provides an optical imaging system. The optical imaging system includes, sequentially from an object side to an image side, a first lens having a negative refractive power; a second lens having a refractive power, wherein an object-side surface of the second lens is a convex surface; a third lens having a refractive power, wherein an object-side surface of the third lens is a concave surface; a fourth lens having a refractive power; a fifth lens having a refractive power; a sixth lens having a refractive power; and a seventh lens having a negative refractive power.

In the embodiments of the present disclosure, an effective focal length f of the optical imaging system and an entrance pupil diameter EPD of the optical imaging system satisfy: f/EPD≤2.10. Specifically, f/EPD≤2.03 is satisfied. Half of a maximal field-of-view HFOV of the optical imaging system satisfies: HFOV≥60°. Specifically, HFOV≥63.1° is satisfied. By satisfying the above relationships, the amount of light admitted can be increased and the shooting effect in an environment of insufficient light can be enhanced. At the same time, it is conducive to mitigating the deflection of the light, increasing the field-of-view, ensuring the miniaturization and imaging quality of the lens assembly, and increasing the degree of matching the CRA of a sensor.

The present disclosure is further described below in combination with specific embodiments.

Embodiment 1

First, an optical imaging system according to Embodiment 1 of the present disclosure is described with reference to FIGS. 1-5.

FIG. 1 is a schematic structural diagram illustrating the optical imaging system according to Embodiment 1. As shown in FIG. 1, the optical imaging system includes seven lenses. The seven lenses are respectively the first lens E1 having an object-side surface S1 and an image-side surface S2, the second lens E2 having an object-side surface S3 and an image-side surface S4, the third lens E3 having an object-side surface S5 and an image-side surface S6, the fourth lens E4 having an object-side surface S7 and an image-side surface S8, the fifth lens E5 having an object-side surface S9 and an image-side surface S10, the sixth lens E6 having an object-side surface S11 and an image-side surface S12, and the seventh lens E7 having an object-side surface S13 and an image-side surface S14. The first to the seventh lenses E1-E7 are sequentially arranged from the object side to the image side of the optical imaging system.

The first lens E1 may have a negative refractive power. The object-side surface S1 of the first lens E1 may be a convex surface, and the image-side surface S2 of the first lens E1 may be a concave surface.

The second lens E2 may have a positive refractive power. The object-side surface S3 of the second lens E2 may be a convex surface, and the image-side surface S4 of the second lens E2 may be a concave surface.

The third lens E3 may have a negative refractive power. The object-side surface S5 of the third lens E3 may be a concave surface, and the image-side surface S6 of the third lens E3 may be a convex surface.

The fourth lens E4 may have a positive refractive power. The object-side surface S7 of the fourth lens E4 may be a convex surface, and the image-side surface S8 of the fourth lens E4 may be a convex surface.

The fifth lens E5 may have a negative refractive power. The object-side surface S9 of the fifth lens E5 may be a convex surface, and the image-side surface S10 of the fifth lens E5 may be a concave surface.

The sixth lens E6 may have a positive refractive power. The object-side surface S11 of the sixth lens E6 may be a convex surface, and the image-side surface S12 of the sixth lens E6 may be a convex surface.

The seventh lens E7 may have a negative refractive power. The object-side surface S13 of the seventh lens E7 may be a concave surface, and the image-side surface S14 of the seventh lens E7 may be a concave surface.

In this embodiment, light from an object sequentially passes through the surfaces S1-S14 and finally forms an image on an image plane S15.

In this embodiment, the first to the seventh lenses E1-E7 have respective effective focal lengths f1-f7. The first to seventh lenses E1-E7 are sequentially arranged along the optical axis and collectively determine the total effective focal length f of the optical imaging system. Table 1 below shows the effective focal lengths f1-f7 of the first to seventh lenses E1-E7, the total effective focal length f of the optical imaging system, the total length TTL (mm) of the optical imaging system, and the half of the diagonal length ImgH of the effective pixel area of an electronic photosensitive element.

TABLE 1

| f1(mm) | −3.11 | f(mm) | 2.09 |
|---|---|---|---|
| f2(mm) | 7.58 | TTL(mm) | 7.50 |
| f3(mm) | −16.00 | ImgH(mm) | 3.50 |
| f4(mm) | 2.45 | | |
| f5(mm) | −9.22 | | |
| f6(mm) | 2.67 | | |
| f7(mm) | −2.40 | | |

Table 2 below shows the surface type, the radius of curvature, the thickness, the material and the conic coefficient of each lens of the optical imaging system in this embodiment. The units of the radius of curvature and the thickness are both shown in millimeters (mm).

TABLE 2

| surface number | surface type | radius of curvature | thickness | material | | conic coefficient |
|---|---|---|---|---|---|---|
| | | | | refractive index | abbe number | |
| OBJ | spherical | infinite | infinite | | | |
| S1 | aspheric | 6.5718 | 0.2200 | 1.54 | 55.7 | −45.0452 |
| S2 | aspheric | 1.3170 | 1.8738 | | | −0.7373 |
| S3 | aspheric | 1.6290 | 0.3036 | 1.55 | 64.1 | 0.0834 |
| S4 | aspheric | 2.5075 | 0.3225 | | | 1.0176 |
| S5 | aspheric | −5.4550 | 0.2395 | 1.67 | 20.4 | 10.1271 |
| S6 | aspheric | −11.3444 | 0.1572 | | | −73.4578 |
| STO | spherical | infinite | −0.1372 | | | |
| S7 | aspheric | 2.4741 | 0.5225 | 1.55 | 64.1 | 0.9335 |
| S8 | aspheric | −2.7120 | 0.5981 | | | 0.9389 |

TABLE 2-continued

| surface number | surface type | radius of curvature | thickness | material | | conic coefficient |
|---|---|---|---|---|---|---|
| | | | | refractive index | abbe number | |
| S9 | aspheric | 8.7456 | 0.2789 | 1.67 | 20.4 | −99.0000 |
| S10 | aspheric | 3.5669 | 0.2397 | | | −22.4596 |
| S11 | aspheric | 5.7376 | 1.4125 | 1.54 | 55.7 | −75.0202 |
| S12 | aspheric | −1.7439 | 0.4062 | | | −3.5764 |
| S13 | aspheric | −2.1280 | 0.2200 | 1.67 | 20.4 | 0.2456 |
| S14 | aspheric | 6.7708 | 0.8426 | | | 0.0000 |
| S15 | spherical | infinite | | | | |
| S16 | spherical | infinite | | | | |
| S17 | spherical | infinite | | | | |

In this embodiment, each lens may be an aspheric lens. The surface type x of each aspheric surface is defined by the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the $i^{th}$ order of the aspheric surface.

Table 3 below shows the high-order coefficients applicable to the aspheric surfaces S1-S14 of the aspheric lenses in this embodiment.

TABLE 3

| surface number | A4 | A6 | A8 | A10 | A12 | A14 | A16 |
|---|---|---|---|---|---|---|---|
| S1 | 1.3864E−03 | −7.4957E−05 | −1.5006E−05 | 1.5003E−06 | −3.5650E−08 | 0.0000E+00 | 0.0000E+00 |
| S2 | 3.8141E−05 | 7.5954E−05 | −3.4409E−04 | 5.9189E−04 | 2.1724E−05 | 0.0000E+00 | 0.0000E+00 |
| S3 | −9.0162E−03 | −7.0529E−03 | −1.1214E−03 | −1.3471E−02 | 0.0000E+00 | 0.0000E+00 | 0.0000E+00 |
| S4 | 7.9493E−03 | −3.2887E−03 | −1.6119E−02 | −1.3241E−02 | 0.0000E+00 | 0.0000E+00 | 0.0000E+00 |
| S5 | −7.4821E−03 | −1.3155E−02 | −1.9980E−02 | 5.5687E−03 | 0.0000E+00 | 0.0000E+00 | 0.0000E+00 |
| S6 | 6.9096E−03 | −1.0848E−02 | 2.6126E−03 | −7.6248E−03 | 0.0000E+00 | 0.0000E+00 | 0.0000E+00 |
| S7 | −5.9840E−03 | 6.2424E−03 | 0.0000E+00 | 0.0000E+00 | 0.0000E+00 | 0.0000E+00 | 0.0000E+00 |
| S8 | −1.7361E−02 | 1.1947E−02 | 1.5103E−02 | −3.4832E−03 | 0.0000E+00 | 0.0000E+00 | 0.0000E+00 |
| S9 | −1.1023E−01 | 3.2461E−02 | −1.6562E−02 | −1.2644E−02 | 0.0000E+00 | 0.0000E+00 | 0.0000E+00 |
| S10 | −6.7863E−02 | 5.6271E−02 | −2.6580E−02 | 4.4967E−03 | 0.0000E+00 | 0.0000E+00 | 0.0000E+00 |
| S11 | −1.6919E−02 | 3.3976E−03 | 1.7396E−03 | −6.8528E−04 | 0.0000E+00 | 0.0000E+00 | 0.0000E+00 |
| S12 | −7.9257E−03 | −1.2379E−02 | 1.8225E−04 | 3.1185E−04 | 0.0000E+00 | 0.0000E+00 | 0.0000E+00 |
| S13 | 7.0751E−03 | −3.0994E−02 | 1.0029E−02 | −7.4032E−04 | 0.0000E+00 | 0.0000E+00 | 0.0000E+00 |
| S14 | −5.4507E−02 | 6.2363E−03 | −1.5055E−04 | −1.9691E−05 | 0.0000E+00 | 0.0000E+00 | 0.0000E+00 |

Figure 2:
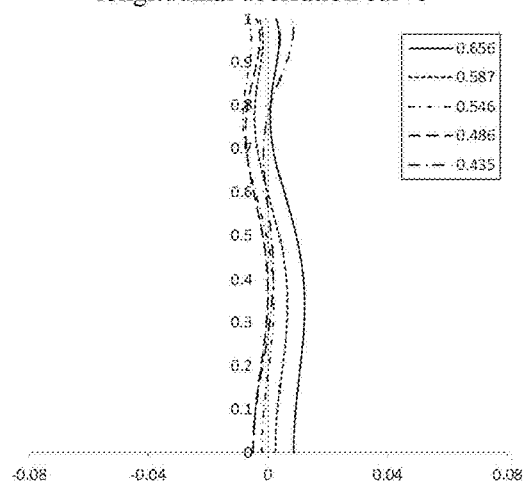
FIGS. 2-5 respectively illustrate a longitudinal aberration curve, an astigmatic curve, a distortion curve, and a lateral color curve of the optical imaging system according to Embodiment 1.
Figure 3:
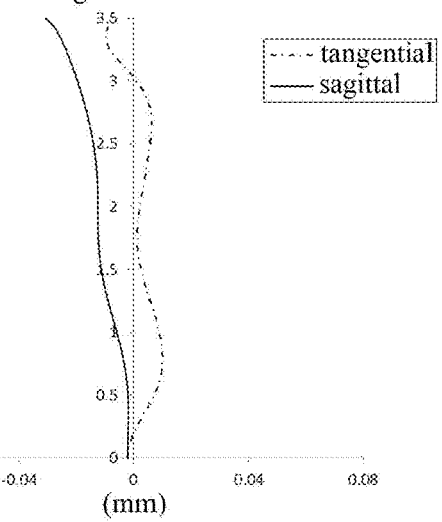
Figure 4:
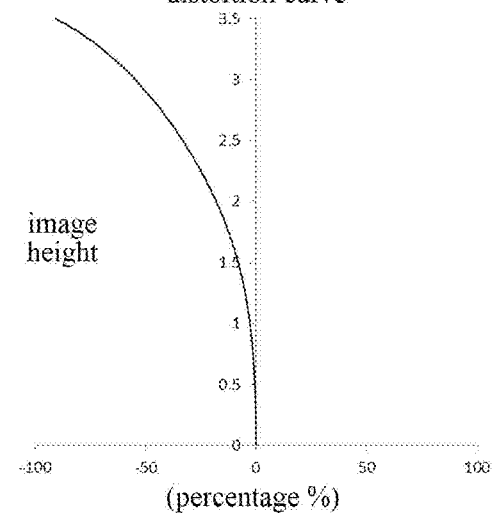
Figure 5:
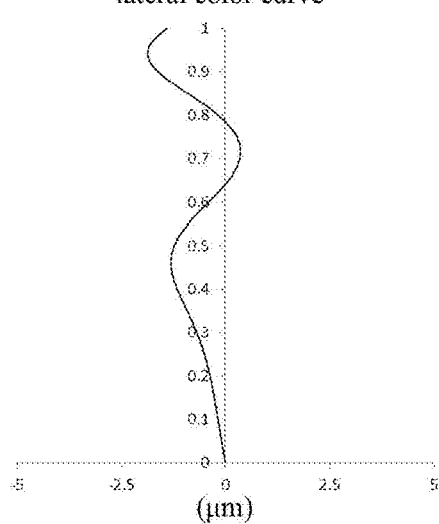

FIG. 2 illustrates the longitudinal aberration curve of the optical imaging system according to Embodiment 1, representing deviations of focal points of light of different wavelengths converged after passing through the optical system. FIG. 3 illustrates the astigmatic curve of the optical imaging system according to Embodiment 1, representing a curvature of the tangential image plane and a curvature of the sagittal image plane. FIG. 4 illustrates the distortion curve of the optical imaging system according to Embodiment 1, representing amounts of distortion at different viewing angles. FIG. 5 illustrates the lateral color curve of the optical imaging system according to Embodiment 1, representing deviations of different image heights on the image plane after light passes through the optical imaging system. In summary, it can be seen from FIGS. 2-5 that the optical imaging system according to Embodiment 1 is applicable to portable electronic products and has a large aperture, a good imaging quality, and wide-angle characteristics.

Embodiment 2

An optical imaging system according to Embodiment 2 of the present disclosure is described with reference to FIGS. 6-10.

Figure 6:
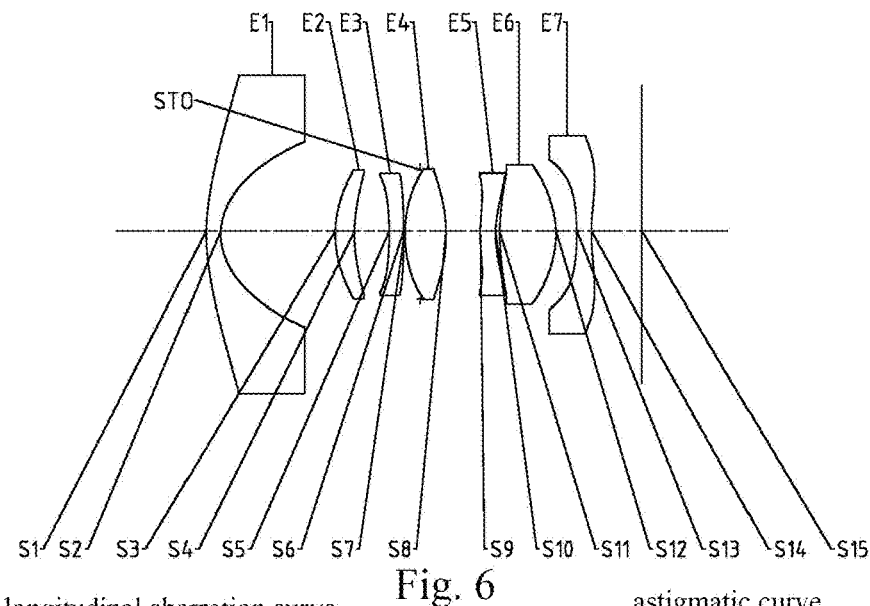
FIG. 6 is a schematic structural diagram illustrating an optical imaging system according to Embodiment 2.

FIG. 6 is a schematic structural diagram illustrating the optical imaging system according to Embodiment 2. As shown in FIG. 6, the optical imaging system includes seven lenses. The seven lenses are respectively the first lens E1 having an object-side surface S1 and an image-side surface S2, the second lens E2 having an object-side surface S3 and an image-side surface S4, the third lens E3 having an object-side surface S5 and an image-side surface S6, the fourth lens E4 having an object-side surface S7 and an image-side surface S8, the fifth lens E5 having an object-side surface S9 and an image-side surface S10, the sixth lens E6 having an object-side surface S11 and an image-side surface S12, and the seventh lens E7 having an object-side surface S13 and an image-side surface S14. The first to seventh lenses E1-E7 are sequentially arranged from the object side to the image side of the optical imaging system.

The first lens E1 may have a negative refractive power. The object-side surface S1 of the first lens E1 may be a convex surface, and the image-side surface S2 of the first lens E1 may be a concave surface.

The second lens E2 may have a positive refractive power. The object-side surface S3 of the second lens E2 may be a convex surface, and the image-side surface S4 of the second lens E2 may be a concave surface.

The third lens E3 may have a negative refractive power. The object-side surface S5 of the third lens E3 may be a concave surface, and the image-side surface S6 of the third lens E3 may be a convex surface.

The fourth lens E4 may have a positive refractive power. The object-side surface S7 of the fourth lens E4 may be a convex surface, and the image-side surface S8 of the fourth lens E4 may be a convex surface.

The fifth lens E5 may have a negative refractive power. The object-side surface S9 of the fifth lens E5 may be a convex surface, and the image-side surface S10 of the fifth lens E5 may be a concave surface.

The sixth lens E6 may have a positive refractive power. The object-side surface S11 of the sixth lens E6 may be a convex surface, and the image-side surface S12 of the sixth lens E6 may be a convex surface.

The seventh lens E7 may have a negative refractive power. The object-side surface S13 of the seventh lens E7 may be a concave surface, and the image-side surface S14 of the seventh lens E7 may be a concave surface.

In this embodiment, light from an object sequentially passes through the surfaces S1-S14 and finally forms an image on an image plane S15.

Table 4 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 4

| f1(mm) | −2.79 | f(mm) | 1.58 |
|---|---|---|---|
| f2(mm) | 8.63 | TTL(mm) | 7.50 |
| f3(mm) | −16.61 | ImgH(mm) | 2.50 |
| f4(mm) | 2.34 | | |
| f5(mm) | −5.01 | | |
| f6(mm) | 2.03 | | |
| f7(mm) | −2.78 | | |

Table 5 below shows the surface type, the radius of curvature, the thickness, the material and the conic coefficient of each lens of the optical imaging system in this embodiment. The units of the radius of curvature and the thickness are both shown in millimeters (mm).

TABLE 5

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 3.2840 | 0.2500 | 1.54 | 55.7 | −13.6763 |
| S2 | aspheric | 1.0018 | 1.9759 | | | −0.8376 |
| S3 | aspheric | 1.8969 | 0.3309 | 1.55 | 64.1 | 0.1944 |
| S4 | aspheric | 2.9778 | 0.5992 | | | 0.7958 |
| S5 | aspheric | −5.2601 | 0.2503 | 1.67 | 20.4 | 15.3142 |
| S6 | aspheric | −10.1997 | 0.2799 | | | −50.5391 |
| STO | spherical | infinite | −0.2609 | | | |
| S7 | aspheric | 2.1097 | 0.7087 | 1.55 | 64.1 | 0.6743 |
| S8 | aspheric | −2.8477 | 0.5805 | | | 1.5449 |
| S9 | aspheric | 2.8367 | 0.2600 | 1.67 | 20.4 | −39.4798 |
| S10 | aspheric | 1.4789 | 0.0734 | | | −11.4086 |
| S11 | aspheric | 2.9668 | 0.9722 | 1.54 | 55.7 | −46.3890 |
| S12 | aspheric | −1.5244 | 0.3585 | | | −3.6861 |
| S13 | aspheric | −4.0843 | 0.2500 | 1.67 | 20.4 | 2.3846 |
| S14 | aspheric | 3.4864 | 0.8714 | | | 0.0000 |
| S15 | spherical | infinite | | | | |
| S16 | spherical | infinite | | | | |
| S17 | spherical | infinite | | | | |

Table 6 below shows the high-order coefficients applicable to the aspheric surfaces S1-S14 of the aspheric lenses in this embodiment. The surface type of each aspheric surface may be defined by the formula (1) given in Embodiment 1.

TABLE 6

| Surface number | A4 | A6 | A8 | A10 | A12 | A14 | A16 |
|---|---|---|---|---|---|---|---|
| S1 | 1.2501E−03 | −6.2308E−05 | −1.0524E−05 | 1.2716E−06 | −3.5650E−08 | 0.0000E+00 | 0.0000E+00 |
| S2 | −1.0663E−02 | 8.0913E−03 | 7.5665E−04 | −1.8033E−05 | 2.1724E−05 | 0.0000E+00 | 0.0000E+00 |
| S3 | −3.7415E−03 | −1.1194E−02 | −2.5046E−03 | −3.1716E−03 | 0.0000E+00 | 0.0000E+00 | 0.0000E+00 |
| S4 | 5.5208E−03 | −1.1410E−02 | −1.4272E−02 | −5.7275E−04 | 0.0000E+00 | 0.0000E+00 | 0.0000E+00 |
| S5 | −1.0212E−02 | −2.3035E−02 | −2.6152E−02 | 7.1125E−03 | 0.0000E+00 | 0.0000E+00 | 0.0000E+00 |
| S6 | 1.0128E−02 | −1.8720E−02 | −1.3517E−02 | 1.7694E−03 | 0.0000E+00 | 0.0000E+00 | 0.0000E+00 |
| S7 | −7.5690E−03 | 7.6177E−04 | 0.0000E+00 | 0.0000E+00 | 0.0000E+00 | 0.0000E+00 | 0.0000E+00 |

TABLE 6-continued

| Surface number | A4 | A6 | A8 | A10 | A12 | A14 | A16 |
|---|---|---|---|---|---|---|---|
| S8 | −3.0726E−02 | 3.6967E−02 | 6.2603E−03 | −3.9489E−03 | 0.0000E+00 | 0.0000E+00 | 0.0000E+00 |
| S9 | −1.3370E−01 | 3.5020E−02 | −8.3975E−03 | −1.4111E−02 | 0.0000E+00 | 0.0000E+00 | 0.0000E+00 |
| S10 | −7.2075E−02 | 5.9672E−02 | −1.7869E−02 | 1.9601E−03 | 0.0000E+00 | 0.0000E+00 | 0.0000E+00 |
| S11 | 9.7553E−04 | 1.1269E−02 | −1.9242E−03 | 1.9618E−04 | 0.0000E+00 | 0.0000E+00 | 0.0000E+00 |
| S12 | −1.2489E−03 | −2.2765E−02 | −4.8102E−03 | 1.8235E−03 | 0.0000E+00 | 0.0000E+00 | 0.0000E+00 |
| S13 | −3.3581E−02 | −5.9279E−02 | 9.6796E−03 | 9.7837E−05 | 0.0000E+00 | 0.0000E+00 | 0.0000E+00 |
| S14 | −1.0381E−01 | 1.4161E−02 | −9.0557E−04 | 1.0405E−04 | 0.0000E+00 | 0.0000E+00 | 0.0000E+00 |

Figures 7, 8:
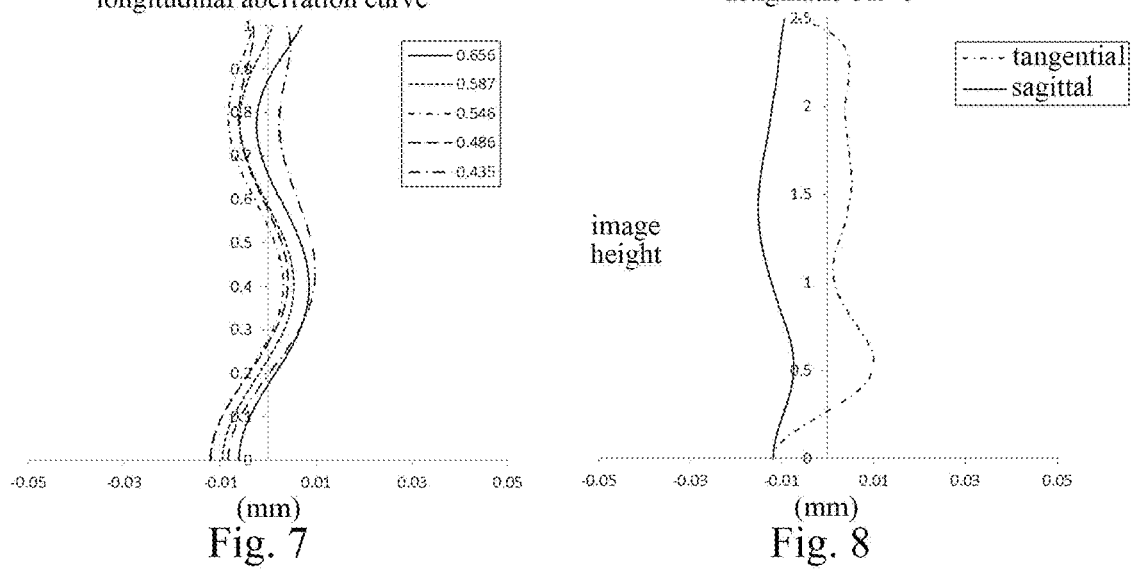
FIGS. 7-10 respectively illustrate a longitudinal aberration curve, an astigmatic curve, a distortion curve, and a lateral color curve of the optical imaging system according to Embodiment 2.
Figures 9, 10:
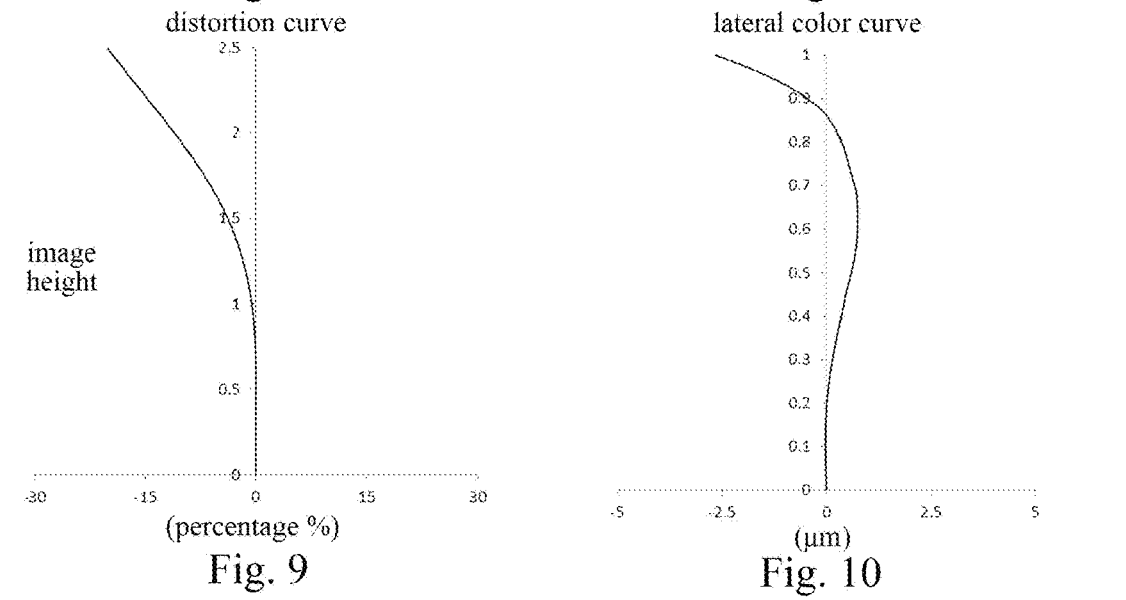

FIG. 7 illustrates the longitudinal aberration curve of the optical imaging system according to Embodiment 2, representing deviations of focal points of light of different wavelengths converged after passing through the optical system. FIG. 8 illustrates the astigmatic curve of the optical imaging system according to Embodiment 2, representing a curvature of the tangential image plane and a curvature of the sagittal image plane. FIG. 9 illustrates the distortion curve of the optical imaging system according to Embodiment 2, representing amounts of distortion at different viewing angles. FIG. 10 illustrates the lateral color curve of the optical imaging system according to Embodiment 2, representing deviations of different image heights on the image plane after light passes through the optical imaging system. In summary, it can be seen from FIGS. 7-10 that the optical imaging system according to Embodiment 2 is applicable to portable electronic products and has a large aperture, a good imaging quality, and wide-angle characteristics.

Embodiment 3

An optical imaging system according to Embodiment 3 of the present disclosure is described with reference to FIGS. 11-15.

Figure 11:
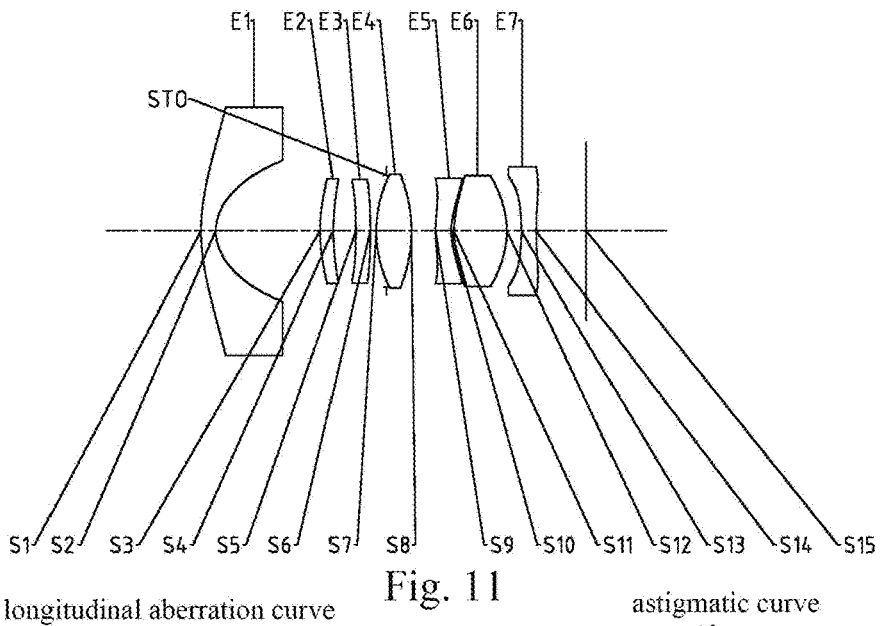
FIG. 11 is a schematic structural diagram illustrating an optical imaging system according to Embodiment 3.

FIG. 11 is a schematic structural diagram illustrating the optical imaging system according to Embodiment 3. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a concave surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a convex surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a concave surface.

Table 7 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 7

| f1(mm) | −2.05 | f(mm) | 1.04 |
|---|---|---|---|
| f2(mm) | 13.18 | TTL(mm) | 6.50 |
| f3(mm) | −68.12 | ImgH(mm) | 1.50 |
| f4(mm) | 2.26 | | |
| f5(mm) | −2.45 | | |
| f6(mm) | 1.26 | | |
| f7(mm) | −3.29 | | |

Table 8 below shows the surface type, the radius of curvature, the thickness, the material and the conic coefficient of each lens of the optical imaging system in this embodiment. The units of the radius of curvature and the thickness are both shown in millimeters (mm).

TABLE 8

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 3.2609 | 0.2500 | 1.54 | 55.7 | −7.9374 |
| S2 | aspheric | 0.8005 | 1.7623 | | | −0.8038 |
| S3 | aspheric | 2.9758 | 0.2172 | 1.55 | 64.1 | −1.0064 |
| S4 | aspheric | 4.9408 | 0.3781 | | | 10.9310 |
| S5 | aspheric | −7.9388 | 0.2440 | 1.67 | 20.4 | 14.8354 |
| S6 | aspheric | −9.7342 | 0.2706 | | | 1.2772 |
| STO | spherical | infinite | −0.1689 | | | |
| S7 | aspheric | 2.2072 | 0.5935 | 1.56 | 60.6 | 0.7404 |
| S8 | aspheric | −2.7422 | 0.4106 | | | 1.7386 |
| S9 | aspheric | 2.4442 | 0.2600 | 1.67 | 20.4 | −58.1474 |
| S10 | aspheric | 0.9393 | 0.0474 | | | −9.7478 |
| S11 | aspheric | 1.3511 | 0.8952 | 1.64 | 56.9 | −15.9395 |
| S12 | aspheric | −1.5016 | 0.2463 | | | −3.0517 |
| S13 | aspheric | −3.9863 | 0.2500 | 1.67 | 20.4 | 8.7406 |
| S14 | aspheric | 5.0304 | 0.8438 | | | 0.0000 |
| S15 | spherical | infinite | | | | |
| S16 | spherical | infinite | | | | |
| S17 | spherical | infinite | | | | |

Table 9 below shows the high-order coefficients applicable to the aspheric surfaces S1-S14 of the aspheric lenses in this embodiment. The surface type of each aspheric surface may be defined by the formula (1) given in Embodiment 1.

TABLE 9

| surface number | A4 | A6 | A8 | A10 | A12 | A14 | A16 |
|---|---|---|---|---|---|---|---|
| S1 | −9.8670E−04 | −2.5531E−04 | −1.0084E−05 | 4.1818E−06 | −3.5650E−08 | 0.0000E+00 | 0.0000E+00 |
| S2 | 3.0718E−02 | 5.4729E−03 | 5.0585E−03 | 2.2682E−04 | 2.1724E−05 | 0.0000E+00 | 0.0000E+00 |
| S3 | −9.0182E−03 | −1.6400E−02 | −5.1970E−03 | −6.9776E−04 | 0.0000E+00 | 0.0000E+00 | 0.0000E+00 |
| S4 | 1.1003E−02 | −8.5750E−03 | −1.4601E−02 | −1.2939E−04 | 0.0000E+00 | 0.0000E+00 | 0.0000E+00 |
| S5 | −7.3383E−03 | −2.0118E−02 | −3.0489E−02 | −7.5610E−03 | 0.0000E+00 | 0.0000E+00 | 0.0000E+00 |
| S6 | 5.4023E−03 | −1.9648E−02 | −1.3795E−02 | −8.8604E−05 | 0.0000E+00 | 0.0000E+00 | 0.0000E+00 |
| S7 | −6.4492E−03 | 3.2132E−03 | 0.0000E+00 | 0.0000E+00 | 0.0000E+00 | 0.0000E+00 | 0.0000E+00 |
| S8 | −3.4604E−02 | 3.7423E−02 | 4.1085E−03 | −4.8588E−03 | 0.0000E+00 | 0.0000E+00 | 0.0000E+00 |
| S9 | −1.3988E−01 | 2.9810E−02 | −1.8757E−02 | −2.4149E−02 | 0.0000E+00 | 0.0000E+00 | 0.0000E+00 |
| S10 | −6.7210E−02 | 5.8020E−02 | −1.6165E−02 | 4.2405E−03 | 0.0000E+00 | 0.0000E+00 | 0.0000E+00 |
| S11 | 8.8915E−03 | 1.6820E−02 | 3.3556E−04 | 3.1095E−03 | 0.0000E+00 | 0.0000E+00 | 0.0000E+00 |
| S12 | −1.2747E−02 | −2.6313E−02 | −1.5341E−03 | 4.2679E−03 | 0.0000E+00 | 0.0000E+00 | 0.0000E+00 |
| S13 | −6.4345E−02 | −7.3099E−02 | 4.0312E−03 | 1.8192E−03 | 0.0000E+00 | 0.0000E+00 | 0.0000E+00 |
| S14 | −7.9815E−02 | −7.5820E−03 | 3.5917E−04 | 1.0549E−03 | 0.0000E+00 | 0.0000E+00 | 0.0000E+00 |

Figure 12:
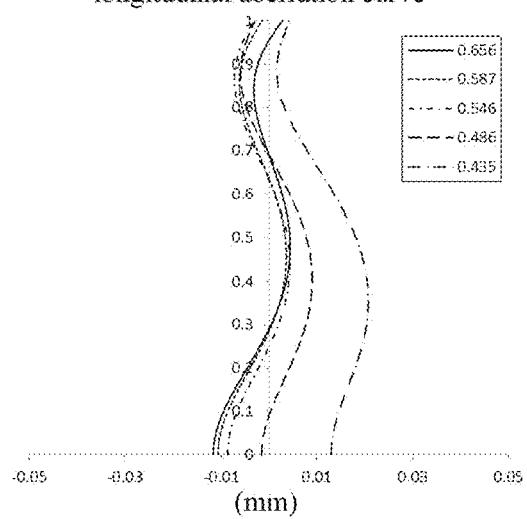
FIGS. 12-15 respectively illustrate a longitudinal aberration curve, an astigmatic curve, a distortion curve, and a lateral color curve of the optical imaging system according to Embodiment 3.
Figure 13:
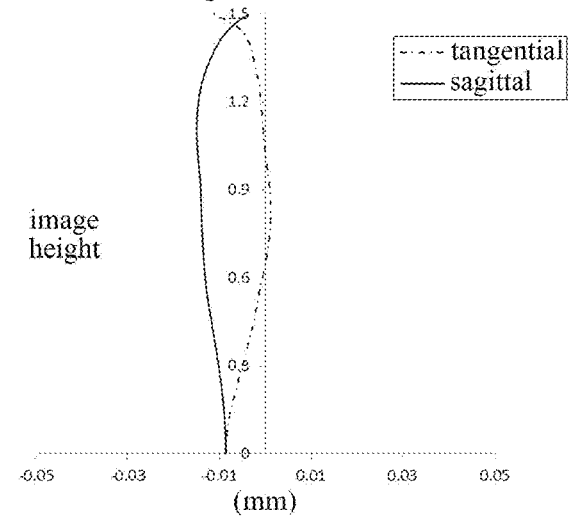
Figure 14:
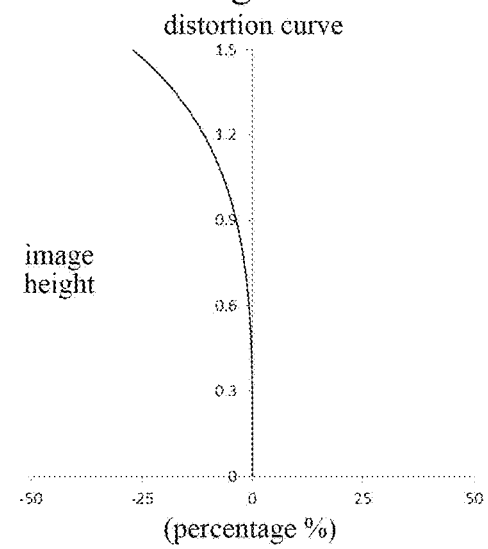
Figure 15:
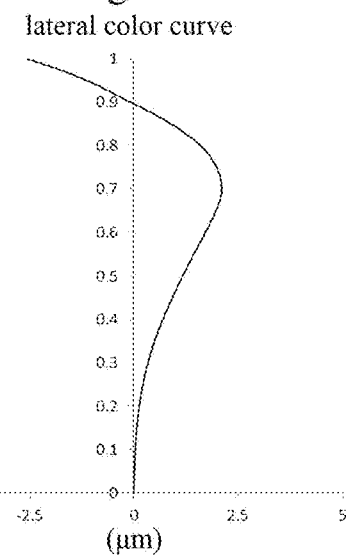

FIG. 12 illustrates the longitudinal aberration curve of the optical imaging system according to Embodiment 3, representing deviations of focal points of light of different wavelengths converged after passing through the optical system. FIG. 13 illustrates the astigmatic curve of the optical imaging system according to Embodiment 3, representing a curvature of the tangential image plane and a curvature of the sagittal image plane. FIG. 14 illustrates the distortion curve of the optical imaging system according to Embodiment 3, representing amounts of distortion at different viewing angles. FIG. 15 illustrates the lateral color curve of the optical imaging system according to Embodiment 3, representing deviations of different image heights on the image plane after light passes through the optical imaging system. In summary, it can be seen from FIGS. 12-15 that the optical imaging system according to Embodiment 3 is applicable to portable electronic products and has a large aperture, a good imaging quality, and wide-angle characteristics.

Embodiment 4

An optical imaging system according to Embodiment 4 of the present disclosure is described with reference to FIGS. 16-20.

Figure 16:
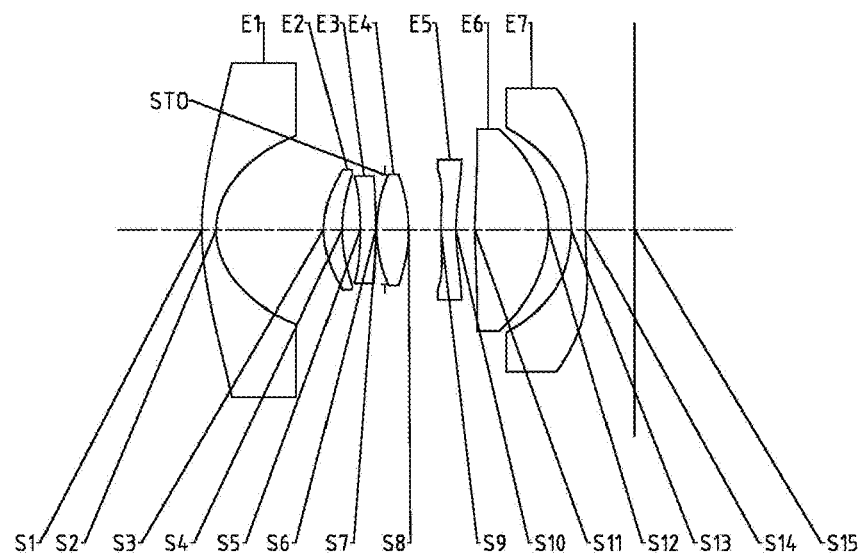
FIG. 16 is a schematic structural diagram illustrating an optical imaging system according to Embodiment 4.

FIG. 16 is a schematic structural diagram illustrating the optical imaging system according to Embodiment 4. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a concave surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a convex surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a concave surface.

Table 10 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 10

| f1(mm) | −3.24 | f(mm) | 2.11 |
|---|---|---|---|
| f2(mm) | 7.77 | TTL(mm) | 7.50 |
| f3(mm) | −15.61 | ImgH(mm) | 3.50 |
| f4(mm) | 2.42 | | |
| f5(mm) | −9.66 | | |
| f6(mm) | 2.67 | | |
| f7(mm) | −2.42 | | |

Table 11 below shows the surface type, the radius of curvature, the thickness, the material and the conic coefficient of each lens of the optical imaging system in this embodiment. The units of the radius of curvature and the thickness are both shown in millimeters (mm).

TABLE 11

| surface number | surface type | radius of curvature | thickness | material refractive index | abbe number | conic coefficient |
|---|---|---|---|---|---|---|
| OBJ | spherical | infinite | infinite | | | |
| S1 | aspheric | 4.2453 | 0.2500 | 1.54 | 55.7 | −15.7143 |
| S2 | aspheric | 1.2079 | 1.8678 | | | −0.7464 |
| S3 | aspheric | 1.6718 | 0.3134 | 1.55 | 64.1 | 0.1046 |
| S4 | aspheric | 2.5746 | 0.3149 | | | 0.9574 |
| S5 | aspheric | −5.5839 | 0.2680 | 1.67 | 20.4 | 10.9167 |
| S6 | aspheric | −12.2470 | 0.1610 | | | −94.9612 |
| STO | spherical | infinite | −0.1420 | | | |
| S7 | aspheric | 2.3856 | 0.5510 | 1.55 | 64.1 | 0.9452 |
| S8 | aspheric | −2.7296 | 0.5635 | | | 1.1908 |
| S9 | aspheric | 5.0904 | 0.2600 | 1.67 | 20.4 | −99.0000 |
| S10 | aspheric | 2.7874 | 0.3295 | | | −22.0533 |

TABLE 11-continued

| surface number | surface type | radius of curvature | thickness | material refractive index | abbe number | conic coefficient |
|---|---|---|---|---|---|---|
| S11 | aspheric | 6.8995 | 1.2782 | 1.54 | 55.7 | −99.0000 |
| S12 | aspheric | −1.6911 | 0.3939 | | | −3.5365 |
| S13 | aspheric | −2.1459 | 0.2500 | 1.67 | 20.4 | 0.1774 |
| S14 | aspheric | 6.8585 | 0.8408 | | | 0.0000 |
| S15 | spherical | infinite | | | | |
| S16 | spherical | infinite | | | | |
| S17 | spherical | infinite | | | | |

Table 12 below shows the high-order coefficients applicable to the aspheric surfaces S1-S14 of the aspheric lenses in this embodiment. The surface type of each aspheric surface may be defined by the formula (1) given in Embodiment 1.

TABLE 12

| surface number | A4 | A6 | A8 | A10 | A12 | A14 | A16 |
|---|---|---|---|---|---|---|---|
| S1 | 1.4937E−03 | −1.1693E−04 | −1.8411E−05 | 2.0288E−06 | −3.5650E−08 | 0.0000E+00 | 0.0000E+00 |
| S2 | −3.2329E−03 | 7.6079E−03 | −2.7588E−04 | 4.6373E−04 | 2.1724E−05 | 0.0000E+00 | 0.0000E+00 |
| S3 | −7.6148E−03 | −7.9015E−03 | −6.8173E−04 | −1.1196E−02 | 0.0000E+00 | 0.0000E+00 | 0.0000E+00 |
| S4 | 7.4919E−03 | −4.9231E−03 | −1.6010E−02 | −1.1759E−02 | 0.0000E+00 | 0.0000E+00 | 0.0000E+00 |
| S5 | −8.0901E−03 | −1.5741E−02 | −2.1667E−02 | 7.6736E−03 | 0.0000E+00 | 0.0000E+00 | 0.0000E+00 |
| S6 | 6.9734E−03 | −1.2450E−02 | 2.0846E−02 | −6.0933E−03 | 0.0000E+00 | 0.0000E+00 | 0.0000E+00 |
| S7 | −6.2444E−03 | 5.9440E−03 | 0.0000E+00 | 0.0000E+00 | 0.0000E+00 | 0.0000E+00 | 0.0000E+00 |
| S8 | −2.1869E−02 | 1.9168E−02 | 1.5521E−02 | −5.0512E−03 | 0.0000E+00 | 0.0000E+00 | 0.0000E+00 |
| S9 | −1.1370E−01 | 3.0064E−02 | −1.8145E−02 | −9.1474E−03 | 0.0000E+00 | 0.0000E+00 | 0.0000E+00 |
| S10 | −7.1998E−02 | 5.6598E−02 | −2.5470E−02 | 4.6465E−03 | 0.0000E+00 | 0.0000E+00 | 0.0000E+00 |
| S11 | −2.5884E−02 | 5.0096E−03 | 2.2823E−03 | −8.3308E−04 | 0.0000E+00 | 0.0000E+00 | 0.0000E+00 |
| S12 | −8.6622E−03 | −1.1872E−02 | 3.9628E−04 | 4.6550E−04 | 0.0000E+00 | 0.0000E+00 | 0.0000E+00 |
| S13 | 8.9700E−03 | −3.2449E−02 | 1.0290E−02 | −7.7537E−04 | 0.0000E+00 | 0.0000E+00 | 0.0000E+00 |
| S14 | −5.4442E−02 | 6.1130E−03 | −1.9948E−04 | −1.0546E−05 | 0.0000E+00 | 0.0000E+00 | 0.0000E+00 |

Figure 17:
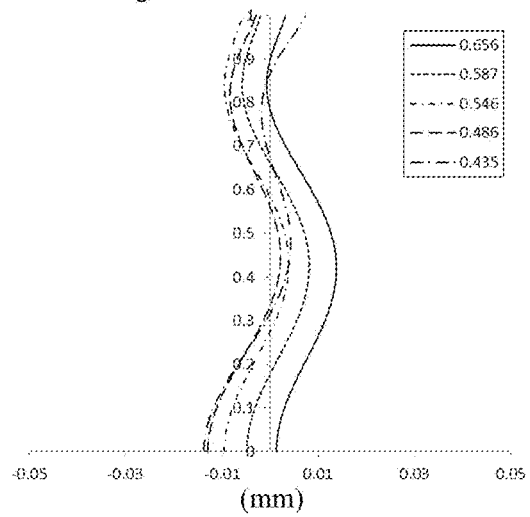
FIGS. 17-20 respectively illustrate a longitudinal aberration curve, an astigmatic curve, a distortion curve, and a lateral color curve of the optical imaging system according to Embodiment 4.
Figure 18:
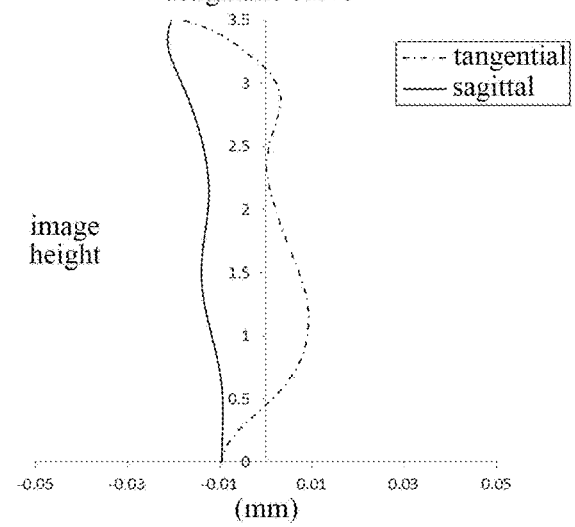
Figure 19:
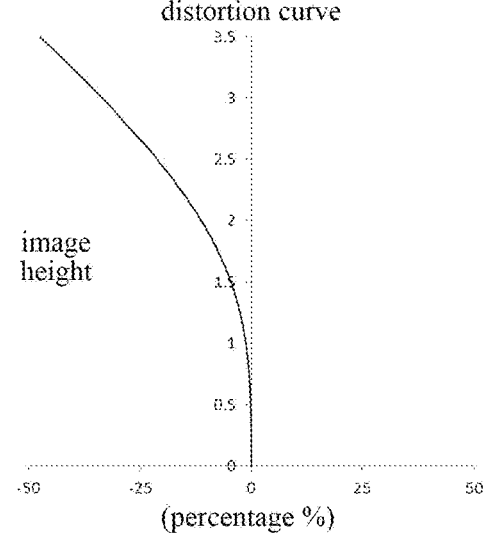
Figure 20:
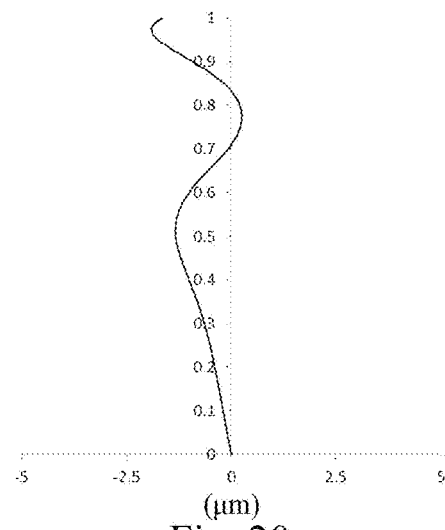

FIG. 17 illustrates the longitudinal aberration curve of the optical imaging system according to Embodiment 4, representing deviations of focal points of light of different wavelengths converged after passing through the optical system. FIG. 18 illustrates the astigmatic curve of the optical imaging system according to Embodiment 4, representing a curvature of the tangential image plane and a curvature of the sagittal image plane. FIG. 19 illustrates the distortion curve of the optical imaging system according to Embodiment 4, representing amounts of distortion at different viewing angles. FIG. 20 illustrates the lateral color curve of the optical imaging system according to Embodiment 4, representing deviations of different image heights on the image plane after light passes through the optical imaging system. In summary, it can be seen from FIGS. 17-20 that the optical imaging system according to Embodiment 4 is applicable to portable electronic products and has a large aperture, a good imaging quality, and wide-angle characteristics.

Embodiment 5

An optical imaging system according to Embodiment 5 of the present disclosure is described with reference to FIGS. 21-25.

Figure 21:
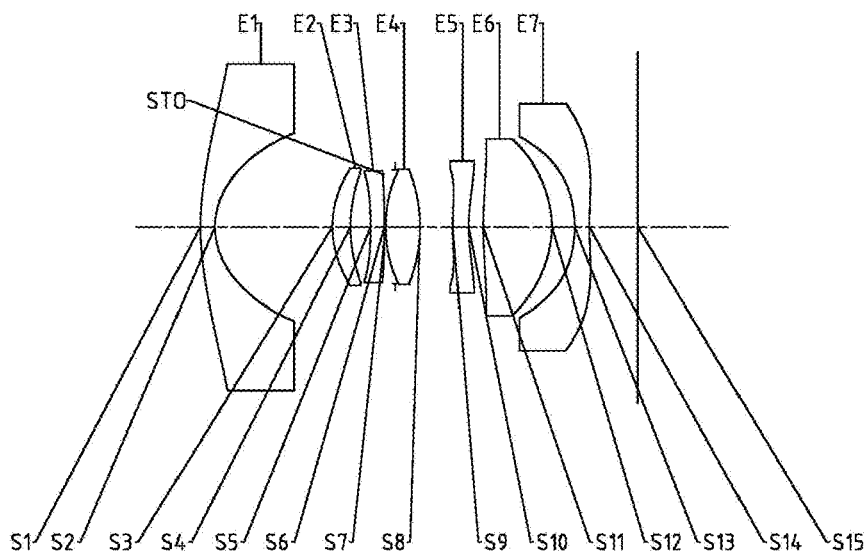
FIG. 21 is a schematic structural diagram illustrating an optical imaging system according to Embodiment 5.

FIG. 21 is a schematic structural diagram illustrating the optical imaging system according to Embodiment 5. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a concave surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a convex surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a concave surface.

Table 13 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 13

| f1(mm) | −3.20 | f(mm) | 1.96 |
|---|---|---|---|
| f2(mm) | 8.15 | TTL(mm) | 7.50 |
| f3(mm) | −17.10 | ImgH(mm) | 2.85 |
| f4(mm) | 2.41 | | |
| f5(mm) | −8.96 | | |
| f6(mm) | 2.54 | | |
| f7(mm) | −2.35 | | |

Table 14 below shows the surface type, the radius of curvature, the thickness, the material and the conic coefficient of each lens of the optical imaging system in this embodiment. The units of the radius of curvature and the thickness are both shown in millimeters (mm).

TABLE 14

| surface number | surface type | radius of curvature | thickness | material refractive index | abbe number | conic coefficient |
|---|---|---|---|---|---|---|
| OBJ | spherical | infinite | infinite | | | |
| S1 | aspheric | 4.3059 | 0.2500 | 1.54 | 55.7 | −19.9598 |
| S2 | aspheric | 1.2033 | 2.0173 | | | −0.7745 |
| S3 | aspheric | 1.7220 | 0.3109 | 1.55 | 64.1 | 0.1275 |
| S4 | aspheric | 2.6292 | 0.3455 | | | 0.9737 |
| S5 | aspheric | −5.7791 | 0.2390 | 1.67 | 20.4 | 11.2519 |
| S6 | aspheric | −11.8992 | 0.1853 | | | −99.0000 |
| STO | spherical | infinite | −0.1663 | | | |
| S7 | aspheric | 2.3630 | 0.5899 | 1.55 | 64.1 | 0.9178 |
| S8 | aspheric | −2.7237 | 0.5613 | | | 1.2462 |
| S9 | aspheric | 4.6514 | 0.2626 | 1.67 | 20.4 | −89.8161 |
| S10 | aspheric | 2.5571 | 0.2500 | | | −21.5204 |
| S11 | aspheric | 5.8634 | 1.1805 | 1.54 | 55.7 | −99.0000 |
| S12 | aspheric | −1.6491 | 0.3907 | | | −3.3309 |
| S13 | aspheric | −2.0075 | 0.2500 | 1.67 | 20.4 | 0.1333 |
| S14 | aspheric | 7.5581 | 0.8333 | | | 0.0000 |
| S15 | spherical | infinite | | | | |
| S16 | spherical | infinite | | | | |
| S17 | snherical | infinite | | | | |

Table 15 below shows the high-order coefficients applicable to the aspheric surfaces S1-S14 of the aspheric lenses in this embodiment. The surface type of each aspheric surface may be defined by the formula (1) given in Embodiment 1.

TABLE 15

| surface number | A4 | A6 | A8 | A10 | A12 | A14 | A16 |
|---|---|---|---|---|---|---|---|
| S1 | 1.3013E−03 | −1.0150E−04 | −1.7147E−05 | 1.8430E−06 | −3.5650E−08 | 0.0000E+00 | 0.0000E+00 |
| S2 | −6.1944E−03 | 8.2450E−03 | 2.0009E−04 | 2.7840E−04 | 2.1724E−05 | 0.0000E+00 | 0.0000E+00 |
| S3 | −6.2314E−03 | −8.4729E−03 | −2.9402E−04 | −1.0198E−02 | 0.0000E+00 | 0.0000E+00 | 0.0000E+00 |
| S4 | 8.1083E−03 | −6.0864E−03 | −1.6550E−02 | −1.0049E−02 | 0.0000E+00 | 0.0000E+00 | 0.0000E+00 |
| S5 | −8.0627E−03 | −1.6659E−02 | −2.2009E−02 | 7.2314E−03 | 0.0000E+00 | 0.0000E+00 | 0.0000E+00 |
| S6 | 9.7102E−03 | −1.1795E−02 | 1.6332E−03 | −5.7846E−03 | 0.0000E+00 | 0.0000E+00 | 0.0000E+00 |
| S7 | −5.1656E−03 | 5.1068E−03 | 0.0000E+00 | 0.0000E+00 | 0.0000E+00 | 0.0000E+00 | 0.0000E+00 |
| S8 | −2.2658E−02 | 1.9385E−02 | 1.4603E−02 | −4.3979E−03 | 0.0000E+00 | 0.0000E+00 | 0.0000E+00 |
| S9 | −1.1465E−01 | 3.0088E−02 | −1.7076E−02 | −8.6024E−03 | 0.0000E+00 | 0.0000E+00 | 0.0000E+00 |
| S10 | −7.4125E−02 | 5.6391E−02 | −2.5243E−02 | 4.2959E−03 | 0.0000E+00 | 0.0000E+00 | 0.0000E+00 |
| S11 | −1.9645E−02 | 6.0441E−03 | 1.7482E−03 | −1.1726E−03 | 0.0000E+00 | 0.0000E+00 | 0.0000E+00 |
| S12 | −9.5217E−03 | −1.2942E−02 | −7.4671E−06 | 4.7014E−04 | 0.0000E+00 | 0.0000E+00 | 0.0000E+00 |
| S13 | −1.4570E−03 | −3.4034E−02 | 1.0495E−02 | −6.9220E−04 | 0.0000E+00 | 0.0000E+00 | 0.0000E+00 |
| S14 | −6.1307E−02 | 7.2252E−03 | −2.0812E−04 | −2.1416E−05 | 0.0000E+00 | 0.0000E+00 | 0.0000E+00 |

Figure 22:
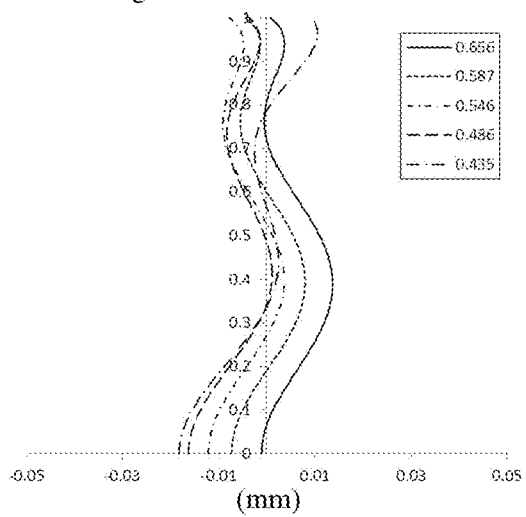
FIGS. 22-25 respectively illustrate a longitudinal aberration curve, an astigmatic curve, a distortion curve, and a lateral color curve of the optical imaging system according to Embodiment 5.
Figure 23:
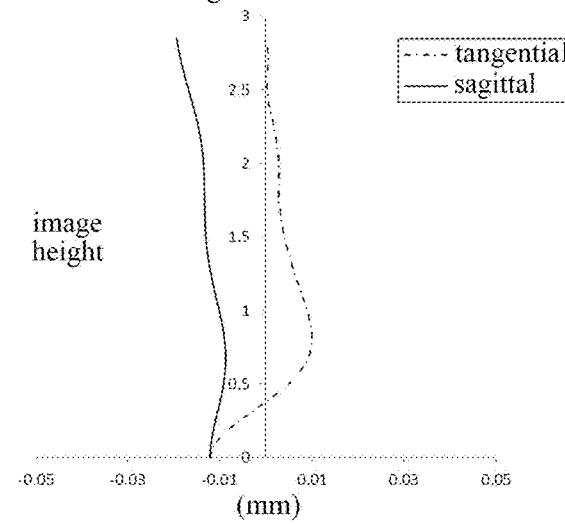
Figure 24:
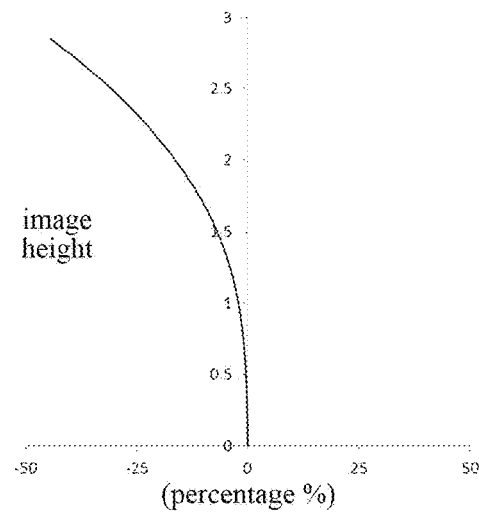
Figure 25:
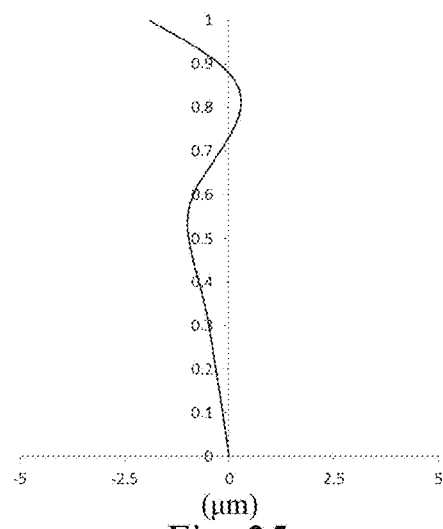

FIG. 22 illustrates the longitudinal aberration curve of the optical imaging system according to Embodiment 5, representing deviations of focal points of light of different wavelengths converged after passing through the optical system. FIG. 23 illustrates the astigmatic curve of the optical imaging system according to Embodiment 5, representing a curvature of the tangential image plane and a curvature of the sagittal image plane. FIG. 24 illustrates the distortion curve of the optical imaging system according to Embodiment 5, representing amounts of distortion at different viewing angles. FIG. 25 illustrates the lateral color curve of the optical imaging system according to Embodiment 5, representing deviations of different image heights on the image plane after light passes through the optical imaging system. In summary, it can be seen from FIGS. 22-25 that the optical imaging system according to Embodiment 5 is applicable to portable electronic products and has a large aperture, a good imaging quality, and wide-angle characteristics.

Embodiment 6

An optical imaging system according to Embodiment 6 of the present disclosure is described with reference to FIGS. 26-30.

Figure 26:
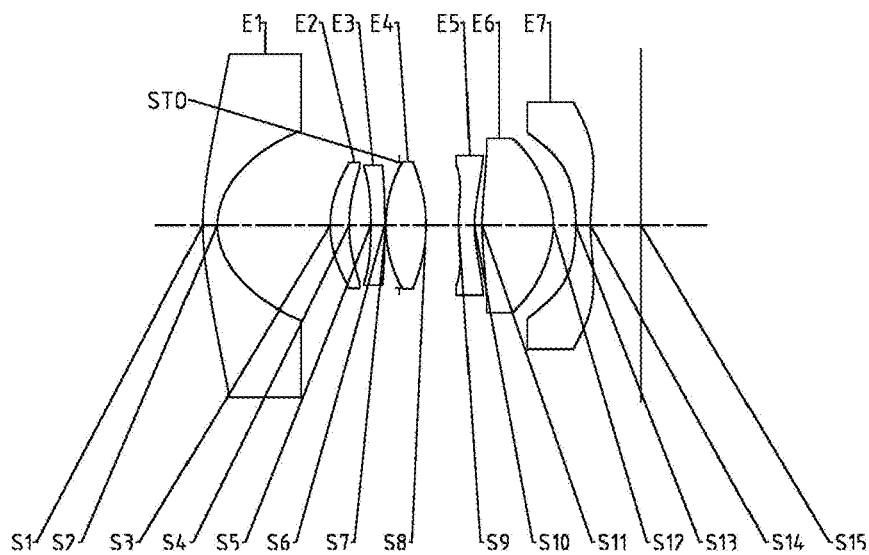
FIG. 26 is a schematic structural diagram illustrating an optical imaging system according to Embodiment 6.

FIG. 26 is a schematic structural diagram illustrating the optical imaging system according to Embodiment 6. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a concave surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a convex surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a concave surface.

Table 16 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 16

| f1(mm) | −2.89 | f(mm) | 1.77 |
|---|---|---|---|
| f2(mm) | 8.52 | TTL(mm) | 7.50 |
| f3(mm) | −18.61 | ImgH(mm) | 3.00 |
| f4(mm) | 2.40 | | |
| f5(mm) | −6.76 | | |
| f6(mm) | 2.27 | | |
| f7(mm) | −2.64 | | |

Table 17 below shows the surface type, the radius of curvature, the thickness, the material and the conic coefficient of each lens of the optical imaging system in this embodiment. The units of the radius of curvature and the thickness are both shown in millimeters (mm).

TABLE 17

| surface number | surface type | radius of curvature | thickness | material refractive index | abbe number | conic coefficient |
|---|---|---|---|---|---|---|
| OBJ | spherical | infinite | infinite | | | |
| S1 | aspheric | 4.3370 | 0.2500 | 1.54 | 55.7 | −24.3272 |
| S2 | aspheric | 1.1202 | 1.9335 | | | −0.8336 |
| S3 | aspheric | 1.7766 | 0.3255 | 1.55 | 64.1 | 0.1306 |
| S4 | aspheric | 2.6875 | 0.3721 | | | 1.1466 |
| S5 | aspheric | −6.1625 | 0.2390 | 1.67 | 20.4 | 10.5504 |
| S6 | aspheric | −12.4059 | 0.2456 | | | −87.7995 |
| STO | spherical | infinite | −0.2266 | | | |
| S7 | aspheric | 2.3197 | 0.6872 | 1.55 | 64.1 | 0.8547 |
| S8 | aspheric | −2.7036 | 0.5571 | | | 1.2367 |
| S9 | aspheric | 3.4791 | 0.2600 | 1.67 | 20.4 | −53.2697 |
| S10 | aspheric | 1.9070 | 0.1335 | | | −14.9712 |
| S11 | aspheric | 4.6970 | 1.2182 | 1.54 | 55.7 | −99.0000 |
| S12 | aspheric | −1.4966 | 0.3868 | | | −3.3308 |
| S13 | aspheric | −3.2147 | 0.2500 | 1.67 | 20.4 | 0.6322 |
| S14 | aspheric | 4.0330 | 0.8681 | | | 0.0000 |
| S15 | spherical | infinite | | | | |
| S16 | spherical | infinite | | | | |
| S17 | spherical | infinite | | | | |

Table 18 below shows the high-order coefficients applicable to the aspheric surfaces S1-S14 of the aspheric lenses in this embodiment. The surface type of each aspheric surface may be defined by the formula (1) given in Embodiment 1.

TABLE 18

| surface number | A4 | A6 | A8 | A10 | A12 | A14 | A16 |
|---|---|---|---|---|---|---|---|
| S1 | 6.8267E−04 | −4.4138E−05 | −1.1921E−05 | 1.4366E−06 | −3.5650E−08 | 0.0000E+00 | 0.0000E+00 |
| S2 | −7.7091E−03 | 7.5611E−03 | 1.2424E−03 | −6.7543E−05 | 2.1724E−05 | 0.0000E+00 | 0.0000E+00 |
| S3 | −4.6831E−03 | −1.0896E−02 | −7.3305E−02 | −9.3674E−03 | 0.0000E+00 | 0.0000E+00 | 0.0000E+00 |
| S4 | 9.8850E−03 | −6.0073E−03 | −1.7746E−02 | −7.9165E−03 | 0.0000E+00 | 0.0000E+00 | 0.0000E+00 |
| S5 | −6.5796E−03 | −1.5266E−02 | −1.9806E−02 | 3.7757E−03 | 0.0000E+00 | 0.0000E+00 | 0.0000E+00 |
| S6 | 1.2053E−02 | −1.2510E−02 | −2.3681E−04 | −4.2086E−03 | 0.0000E+00 | 0.0000E+00 | 0.0000E+00 |
| S7 | −4.6173E−03 | 2.9038E−03 | 0.0000E+00 | 0.0000E+00 | 0.0000E+00 | 0.0000E+00 | 0.0000E+00 |
| S8 | −2.1963E−02 | 2.0100E−02 | 1.2274E−02 | −3.9201E−03 | 0.0000E+00 | 0.0000E+00 | 0.0000E+00 |
| S9 | −1.2372E−01 | 3.0546E−02 | −1.2989E−02 | −9.1424E−03 | 0.0000E+00 | 0.0000E+00 | 0.0000E+00 |
| S10 | −7.3274E−02 | 5.8009E−02 | −2.3956E−02 | 3.5057E−03 | 0.0000E+00 | 0.0000E+00 | 0.0000E+00 |
| S11 | −1.1194E−02 | 9.3777E−03 | −7.5203E−05 | −2.2685E−03 | 0.0000E+00 | 0.0000E+00 | 0.0000E+00 |
| S12 | −8.0365E−03 | −1.3992E−02 | −6.2508E−04 | 5.2142E−04 | 0.0000E+00 | 0.0000E+00 | 0.0000E+00 |
| S13 | −2.5506E−02 | −4.2679E−02 | 1.0714E−02 | 1.7708E−04 | 0.0000E+00 | 0.0000E+00 | 0.0000E+00 |
| S14 | −8.1195E−02 | 9.3658E−03 | −1.9208E−04 | −1.7325E−05 | 0.0000E+00 | 0.0000E+00 | 0.0000E+00 |

Figure 27:
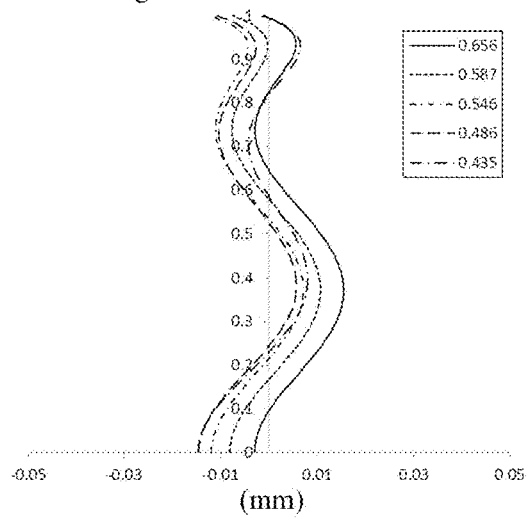
FIGS. 27-30 respectively illustrate a longitudinal aberration curve, an astigmatic curve, a distortion curve, and a lateral color curve of the optical imaging system according to Embodiment 6.
Figure 28:
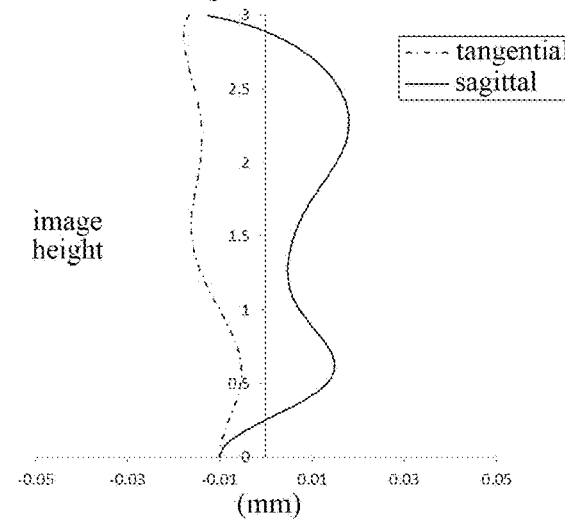
Figure 29:
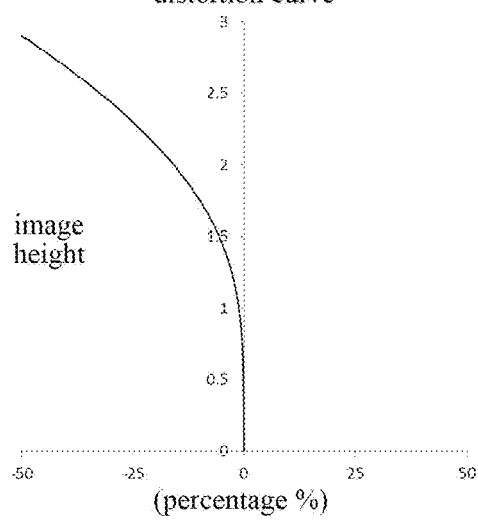
Figure 30:
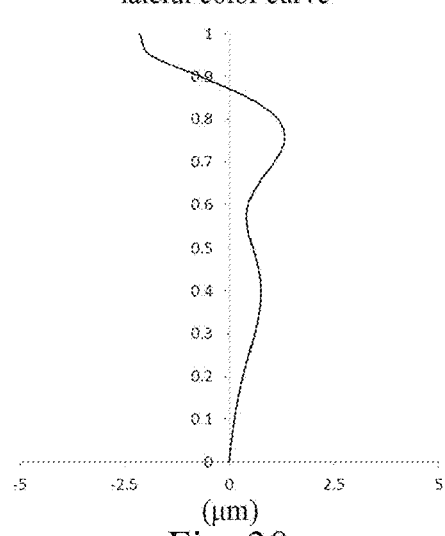

FIG. 27 illustrates the longitudinal aberration curve of the optical imaging system according to Embodiment 6, representing deviations of focal points of light of different wavelengths converged after passing through the optical system. FIG. 28 illustrates the astigmatic curve of the optical imaging system according to Embodiment 6, representing a curvature of the tangential image plane and a curvature of the sagittal image plane. FIG. 29 illustrates the distortion curve of the optical imaging system according to Embodiment 6, representing amounts of distortion at different viewing angles. FIG. 30 illustrates the lateral color curve of the optical imaging system according to Embodiment 6, representing deviations of different image heights on the image plane after light passes through the optical imaging system. In summary, it can be seen from FIGS. 27-30 that the optical imaging system according to Embodiment 6 is applicable to portable electronic products and has a large aperture, a good imaging quality, and wide-angle characteristics.

Embodiment 7

An optical imaging system according to Embodiment 7 of the present disclosure is described with reference to FIGS. 31-35.

Figure 31:
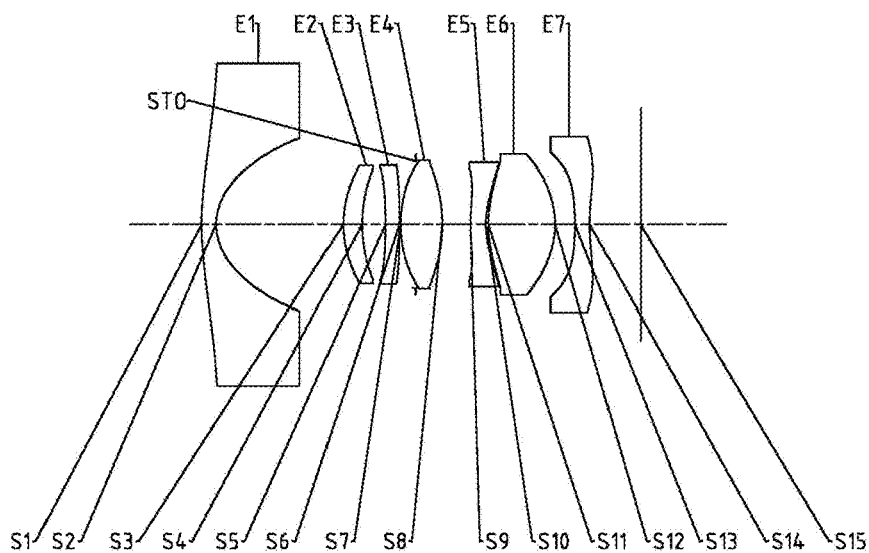
FIG. 31 is a schematic structural diagram illustrating an optical imaging system according to Embodiment 7.

FIG. 31 is a schematic structural diagram illustrating the optical imaging system according to Embodiment 7. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a concave surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a convex surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a concave surface.

Table 19 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

Table 20 below shows the surface type, the radius of curvature, the thickness, the material and the conic coefficient of each lens of the optical imaging system in this embodiment. The units of the radius of curvature and the thickness are both shown in millimeters (mm).

TABLE 20

| surface number | surface type | radius of curvature | thickness | material refractive index | abbe number | conic coefficient |
|---|---|---|---|---|---|---|
| OBJ | spherical | infinite | infinite | | | |
| S1 | aspheric | 4.8960 | 0.2500 | 1.54 | 55.7 | −38.7584 |
| S2 | aspheric | 0.9447 | 2.1701 | | | −0.8552 |
| S3 | aspheric | 1.9368 | 0.3209 | 1.55 | 64.1 | 0.2623 |
| S4 | aspheric | 2.6622 | 0.3992 | | | 1.5951 |
| S5 | aspheric | −8.3579 | 0.2390 | 1.67 | 20.4 | 14.9651 |
| S6 | aspheric | −11.3173 | 0.2739 | | | −36.0680 |
| STO | spherical | infinite | −0.2542 | | | |
| S7 | aspheric | 2.2104 | 0.7111 | 1.55 | 64.1 | 0.7685 |
| S8 | aspheric | −2.7947 | 0.4838 | | | 1.3811 |
| S9 | aspheric | 3.1953 | 0.2600 | 1.67 | 20.4 | −55.3539 |
| S10 | aspheric | 1.2786 | 0.0438 | | | −8.2422 |
| S11 | aspheric | 1.8359 | 1.1449 | 1.54 | 55.7 | −13.2311 |
| S12 | aspheric | −1.4276 | 0.3400 | | | −3.6770 |
| S13 | aspheric | −4.7884 | 0.2500 | 1.67 | 20.4 | 5.8281 |
| S14 | aspheric | 3.6453 | 0.8676 | | | 0.0000 |
| S15 | spherical | infinite | | | | |
| S16 | spherical | infinite | | | | |
| S17 | spherical | infinite | | | | |

Table 21 below shows the high-order coefficients applicable to the aspheric surfaces S1-S14 of the aspheric lenses in this embodiment. The surface type of each aspheric surface may be defined by the formula (1) given in Embodiment 1.

TABLE 21

| surface number | A4 | A6 | A8 | A10 | A12 | A14 | A16 |
|---|---|---|---|---|---|---|---|
| S1 | −1.3270E−03 | −8.2445E−06 | −3.1345E−06 | 1.0872E−06 | −3.5650E−08 | 0.0000E+00 | 0.0000E+00 |
| S2 | 2.2914E−03 | 6.9544E−03 | 3.4973E−03 | −9.0223E−04 | 2.1724E−05 | 0.0000E+00 | 0.0000E+00 |
| S3 | −9.5326E−04 | −9.5260E−03 | −1.0899E−03 | −1.0381E−02 | 0.0000E+00 | 0.0000E+00 | 0.0000E+00 |
| S4 | 1.4004E−02 | −1.8193E−03 | −2.0301E−02 | −7.2507E−03 | 0.0000E+00 | 0.0000E+00 | 0.0000E+00 |
| S5 | −9.0888E−03 | −1.2943E−02 | −1.8870E−02 | −5.5396E−04 | 0.0000E+00 | 0.0000E+00 | 0.0000E+00 |
| S6 | 1.1879E−02 | −1.1592E−02 | −1.9823E−03 | −6.0496E−03 | 0.0000E+00 | 0.0000E+00 | 0.0000E+00 |
| S7 | −4.4789E−03 | 3.1693E−03 | 0.0000E+00 | 0.0000E+00 | 0.0000E+00 | 0.0000E+00 | 0.0000E+00 |
| S8 | −2.5441E−02 | 2.3314E−02 | 1.0383E−02 | −3.4136E−03 | 0.0000E+00 | 0.0000E+00 | 0.0000E+00 |
| S9 | −1.2830E−01 | 3.0899E−02 | −1.7617E−02 | −9.9690E−03 | 0.0000E+00 | 0.0000E+00 | 0.0000E+00 |
| S10 | −5.7828E−02 | 5.8244E−02 | −2.3368E−02 | 1.2744E−02 | 0.0000E+00 | 0.0000E+00 | 0.0000E+00 |
| S11 | 6.6495E−04 | 1.3721E−02 | −1.3929E−03 | −3.2406E−03 | 0.0000E+00 | 0.0000E+00 | 0.0000E+00 |
| S12 | −3.2138E−02 | −2.0216E−02 | 1.6856E−03 | 1.6770E−03 | 0.0000E+00 | 0.0000E+00 | 0.0000E+00 |
| S13 | −5.1028E−02 | −5.8151E−02 | 1.1969E−02 | 4.4432E−03 | 0.0000E+00 | 0.0000E+00 | 0.0000E+00 |
| S14 | −1.0022E−01 | 1.2537E−02 | −8.1711E−04 | 4.3304E−04 | 0.0000E+00 | 0.0000E+00 | 0.0000E+00 |

TABLE 19

| f1(mm) | −2.23 | f(mm) | 1.27 |
|---|---|---|---|
| f2(mm) | 11.25 | TTL(mm) | 7.50 |
| f3(mm) | −49.43 | ImgH(mm) | 2.00 |
| f4(mm | 2.38 | | |
| f5(mm) | −3.37 | | |
| f6(mm) | 1.70 | | |
| f7(mm) | −3.06 | | |

Figure 32:
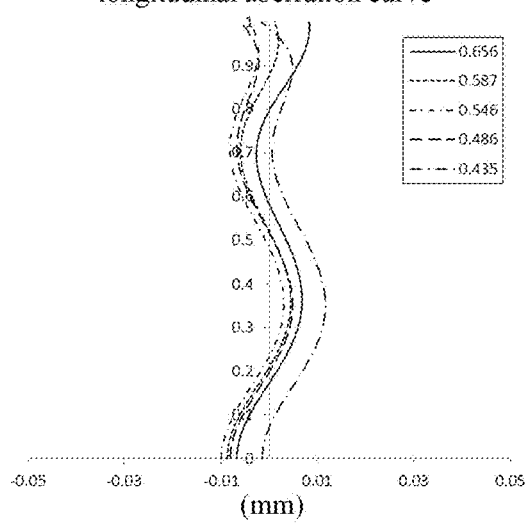
FIGS. 32-35 respectively illustrate a longitudinal aberration curve, an astigmatic curve, a distortion curve, and a lateral color curve of the optical imaging system according to Embodiment 7.
Figure 33:
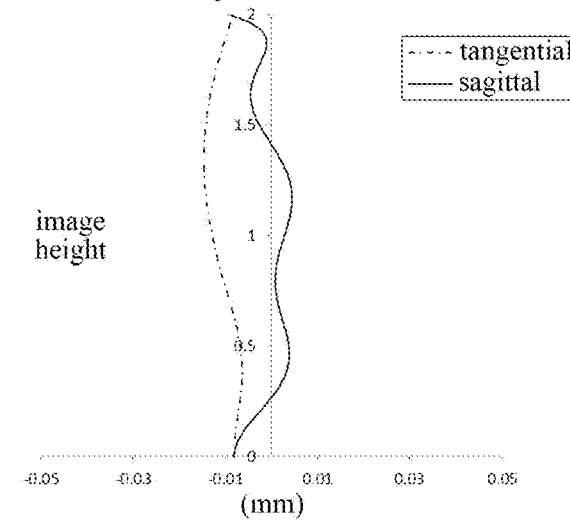
Figure 34:
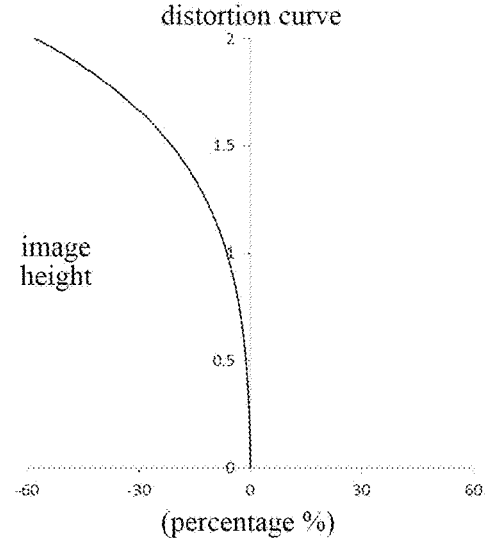
Figure 35:
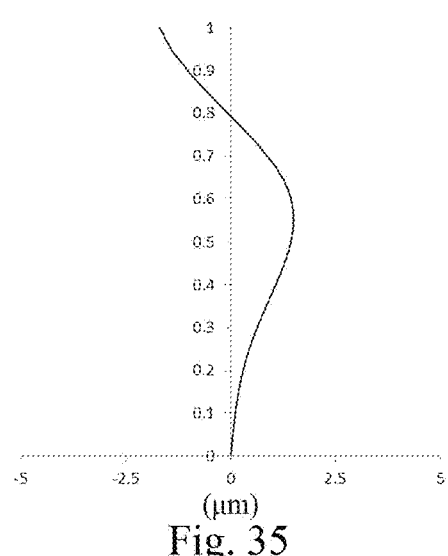

FIG. 32 illustrates the longitudinal aberration curve of the optical imaging system according to Embodiment 7, representing deviations of focal points of light of different wavelengths converged after passing through the optical system. FIG. 33 illustrates the astigmatic curve of the optical imaging system according to Embodiment 7, representing a curvature of the tangential image plane and a curvature of the sagittal image plane. FIG. 34 illustrates the distortion curve of the optical imaging system according to Embodiment 7, representing amounts of distortion at different viewing angles. FIG. 35 illustrates the lateral color curve of the optical imaging system according to Embodiment 7, representing deviations of different image heights on the image plane after light passes through the optical imaging system. In summary, it can be seen from FIGS. 31-35 that the optical imaging system according to Embodiment 7 is applicable to portable electronic products and has a large aperture, a good imaging quality, and wide-angle characteristics.

Embodiment 8

An optical imaging system according to Embodiment 8 of the present disclosure is described with reference to FIGS. 36-40.

Figure 36:
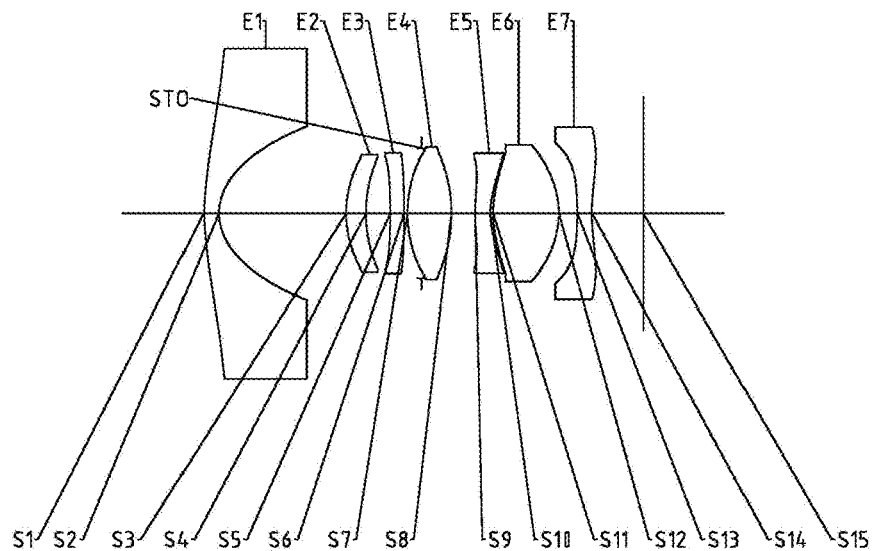
FIG. 36 is a schematic structural diagram illustrating an optical imaging system according to Embodiment 8.

FIG. 36 is a schematic structural diagram illustrating the optical imaging system according to Embodiment 8. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a concave surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a convex surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a concave surface.

Table 22 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 22

| | | | |
|---|---|---|---|
| f1(mm) | −2.16 | f(mm) | 1.17 |
| f2(mm) | 12.23 | TTL(mm) | 7.50 |
| f3(mm) | −112.89 | ImgH(mm) | 2.00 |
| f4(mm) | 2.39 | | |
| f5(mm) | −3.27 | | |

TABLE 22-continued

| | |
|---|---|
| f6(mm) | 1.65 |
| f7(mm) | −3.24 |

Table 23 below shows the surface type, the radius of curvature, the thickness, the material and the conic coefficient of each lens of the optical imaging system in this embodiment. The units of the radius of curvature and the thickness are both shown in millimeters (mm).

TABLE 23

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 4.0872 | 0.2500 | 1.54 | 55.7 | −25.8306 |
| S2 | aspheric | 0.8846 | 2.1774 | | | −0.8730 |
| S3 | aspheric | 1.9307 | 0.3383 | 1.55 | 64.1 | 0.3268 |
| S4 | aspheric | 2.5470 | 0.4152 | | | 1.8180 |
| S5 | aspheric | −10.4310 | 0.2390 | 1.67 | 20.4 | 20.0380 |
| S6 | aspheric | −12.2179 | 0.2969 | | | −18.7054 |
| STO | spherical | infinite | −0.2387 | | | |
| S7 | aspheric | 2.2588 | 0.7502 | 1.55 | 64.1 | 0.6978 |
| S8 | aspheric | −2.7203 | 0.3944 | | | 1.4705 |
| S9 | aspheric | 3.1672 | 0.2600 | 1.67 | 20.4 | −50.4459 |
| S10 | aspheric | 1.2493 | 0.0483 | | | −7.5312 |
| S11 | aspheric | 1.7227 | 1.1251 | 1.54 | 55.7 | −11.1573 |
| S12 | aspheric | −1.4035 | 0.3134 | | | −3.6920 |
| S13 | aspheric | −6.3431 | 0.2500 | 1.67 | 20.4 | 9.7180 |
| S14 | aspheric | 3.3322 | 0.8804 | | | 0.0000 |
| S15 | spherical | infinite | | | | |
| S16 | spherical | infinite | | | | |
| S17 | spherical | infinite | | | | |

Table 24 below shows the high-order coefficients applicable to the aspheric surfaces S1-S14 of the aspheric lenses in this embodiment. The surface type of each aspheric surface may be defined by the formula (1) given in Embodiment 1.

TABLE 24

| Surface number | A4 | A6 | A8 | A10 | A12 | A14 | A16 |
|---|---|---|---|---|---|---|---|
| S1 | −1.5550E−03 | −4.7647E−07 | 4.8692E−06 | 1.0143E−06 | −3.5650E−08 | 0.0000E+00 | 0.0000E+00 |
| S2 | 2.1369E−03 | 6.7554E−03 | 4.1736E−03 | −1.5156E−03 | 2.1724E−05 | 0.0000E+00 | 0.0000E+00 |
| S3 | 2.0313E−03 | −9.5916E−03 | 4.1455E−03 | −1.0379E−02 | 0.0000E+00 | 0.0000E+00 | 0.0000E+00 |
| S4 | 1.6921E−02 | −4.3830E−04 | −2.2111E−02 | −6.3648E−03 | 0.0000E+00 | 0.0000E+00 | 0.0000E+00 |
| S5 | −1.0556E−02 | −1.1580E−02 | 4.8561E−02 | −2.8230E−03 | 0.0000E+00 | 0.0000E+00 | 0.0000E+00 |
| S6 | 1.1054E−02 | −1.0891E−02 | −2.2220E−03 | −6.1912E−03 | 0.0000E+00 | 0.0000E+00 | 0.0000E+00 |
| S7 | −5.5083E−03 | 3.2990E−03 | 0.0000E+00 | 0.0000E+00 | 0.0000E+00 | 0.0000E+00 | 0.0000E+00 |
| S8 | −2.7053E−02 | 2.2625E−02 | 9.2111E−03 | −2.9780E−03 | 0.0000E+00 | 0.0000E+00 | 0.0000E+00 |
| S9 | −1.2615E−01 | 3.3542E−02 | 4.6888E−02 | −1.1563E−02 | 0.0000E+00 | 0.0000E+00 | 0.0000E+00 |
| S10 | −5.3907E−02 | 5.8428E−02 | −2.4414E−02 | −2.3524E−04 | 0.0000E+00 | 0.0000E+00 | 0.0000E+00 |
| S11 | 2.1277E−03 | 1.3774E−02 | 4.5926E−03 | −3.3607E−03 | 0.0000E+00 | 0.0000E+00 | 0.0000E+00 |
| S12 | −3.7354E−02 | −2.1428E−02 | 2.3850E−03 | 2.1489E−03 | 0.0000E+00 | 0.0000E+00 | 0.0000E+00 |
| S13 | −6.0284E−02 | −6.1189E−02 | 1.0370E−02 | 3.9951E−03 | 0.0000E+00 | 0.0000E+00 | 0.0000E+00 |
| S14 | −9.8888E−02 | 1.1824E−02 | −6.8139E−04 | 5.0016E−04 | 0.0000E+00 | 0.0000E+00 | 0.0000E+00 |

Figure 37:
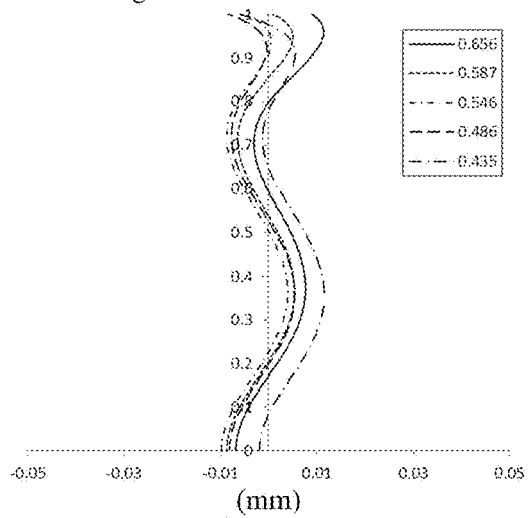
FIGS. 37-40 respectively illustrate a longitudinal aberration curve, an astigmatic curve, a distortion curve, and a lateral color curve of the optical imaging system according to Embodiment 8.
Figure 38:
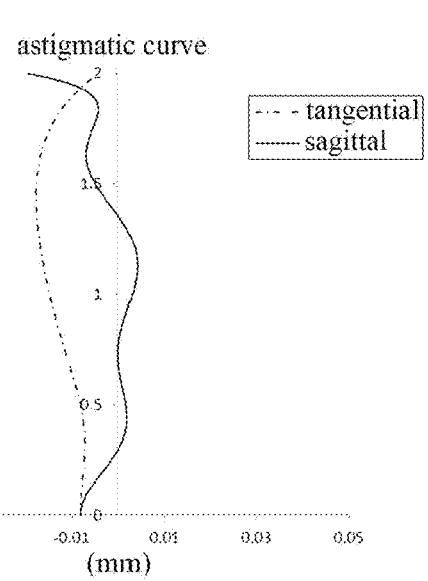
Figure 39:
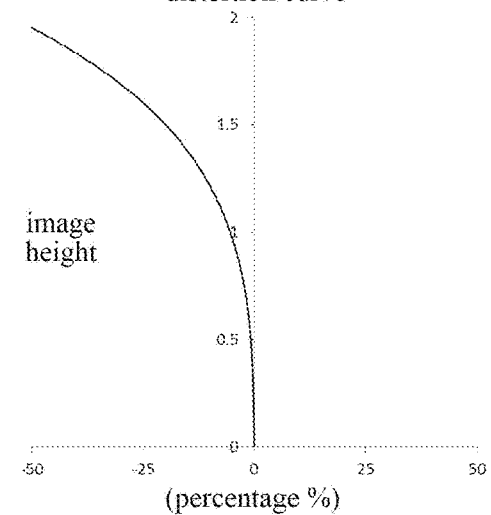
Figure 40:
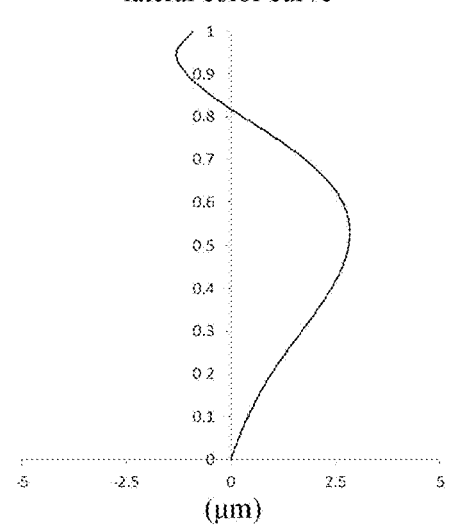

FIG. 37 illustrates the longitudinal aberration curve of the optical imaging system according to Embodiment 8, representing deviations of focal points of light of different wavelengths converged after passing through the optical system. FIG. 38 illustrates the astigmatic curve of the optical imaging system according to Embodiment 8, representing a curvature of the tangential image plane and a curvature of the sagittal image plane. FIG. 39 illustrates the distortion curve of the optical imaging system according to Embodiment 8, representing amounts of distortion at different viewing angles. FIG. 40 illustrates the lateral color curve of the optical imaging system according to Embodiment 8, representing deviations of different image heights on the image plane after light passes through the optical imaging system. In summary, it can be seen from FIGS. 36-40 that the optical imaging system according to Embodiment 8 is applicable to portable electronic products and has a large aperture, a good imaging quality, and wide-angle characteristics.

Embodiment 9

An optical imaging system according to Embodiment 9 of the present disclosure is described with reference to FIGS. 41-45.

Figure 41:
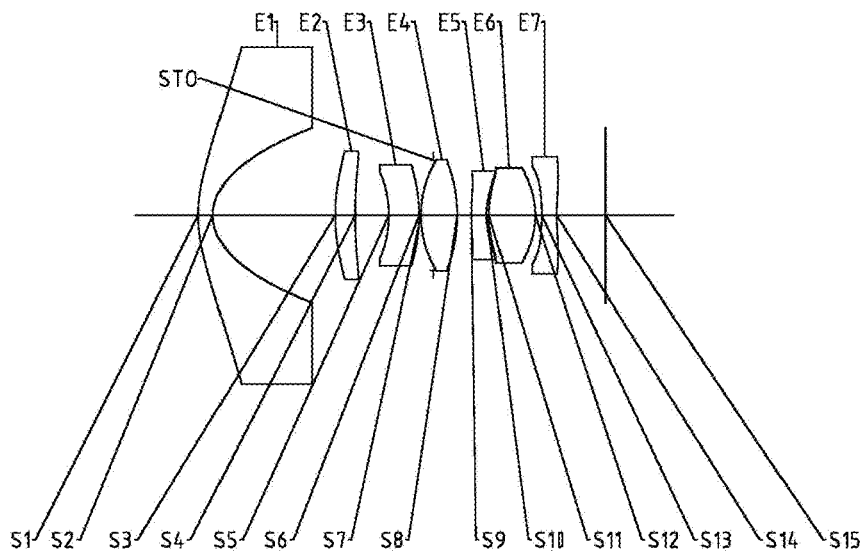
FIG. 41 is a schematic structural diagram illustrating an optical imaging system according to Embodiment 9.

FIG. 41 is a schematic structural diagram illustrating the optical imaging system according to Embodiment 9. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a concave surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a convex surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a concave surface.

Table 25 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 25

| f1(mm) | −1.91 | f(mm) | 0.79 |
|---|---|---|---|
| f2(mm) | 7.17 | TTL(mm) | 7.00 |
| f3(mm) | −16.46 | ImgH(mm) | 1.50 |
| f4(mm) | 2.03 | | |
| f5(mm) | −3.05 | | |
| f6(mm) | 1.44 | | |
| f7(mm) | −3.44 | | |

Table 26 below shows the surface type, the radius of curvature, the thickness, the material and the conic coefficient of each lens of the optical imaging system in this embodiment. The units of the radius of curvature and the thickness are both shown in millimeters (mm).

TABLE 26

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 2.3835 | 0.2500 | 1.62 | 60.3 | −6.8691 |
| S2 | aspheric | 0.7629 | 2.1053 | | | −0.9072 |
| S3 | aspheric | 3.6178 | 0.3430 | 1.76 | 27.6 | 2.0939 |
| S4 | aspheric | 10.2898 | 0.5796 | | | 78.0427 |
| S5 | aspheric | −1.9568 | 0.5233 | 1.75 | 42.3 | 0.7444 |
| S6 | aspheric | −2.5922 | 0.2424 | | | −4.0578 |
| STO | spherical | infinite | −0.2120 | | | |
| S7 | aspheric | 1.9099 | 0.6246 | 1.58 | 62.6 | 0.7514 |
| S8 | aspheric | −2.7324 | 0.2431 | | | 1.7346 |
| S9 | aspheric | 3.4890 | 0.2600 | 1.67 | 20.4 | −36.7555 |
| S10 | aspheric | 1.2464 | 0.0405 | | | −6.4948 |
| S11 | aspheric | 1.7123 | 0.7916 | 1.59 | 61.8 | −11.4988 |
| S12 | aspheric | −1.4179 | 0.1104 | | | −3.6589 |
| S13 | aspheric | −5.7796 | 0.2584 | 1.67 | 20.4 | 18.6258 |
| S14 | aspheric | 3.8853 | 0.8398 | | | 0.0000 |
| S15 | spherical | infinite | | | | |
| S16 | spherical | infinite | | | | |
| S17 | spherical | infinite | | | | |

Table 27 below shows the high-order coefficients applicable to the aspheric surfaces S1-S14 of the aspheric lenses in this embodiment. The surface type of each aspheric surface may be defined by the formula (1) given in Embodiment 1.

TABLE 27

| surface number | A4 | A6 | A8 | A10 | A12 | A14 | A16 |
|---|---|---|---|---|---|---|---|
| S1 | −3.1936E−03 | 1.3945E−04 | 1.3313E−05 | −4.5776E−07 | −3.5650E−08 | 0.0000E+00 | 0.0000E+00 |
| S2 | 1.3342E−02 | −5.7503E−03 | 9.4129E−03 | −3.2122E−03 | 2.1724E−05 | 0.0000E+00 | 0.0000E+00 |
| S3 | 2.2093E−03 | 3.3453E−03 | −1.5991E−02 | 8.3499E−04 | 0.0000E+00 | 0.0000E+00 | 0.0000E+00 |
| S4 | 1.8631E−02 | −7.4256E−03 | −1.6108E−02 | −7.6109E−03 | 0.0000E+00 | 0.0000E+00 | 0.0000E+00 |
| S5 | 1.5547E−04 | −1.5687E−02 | −2.1708E−03 | −4.5260E−02 | 0.0000E+00 | 0.0000E+00 | 0.0000E+00 |
| S6 | −5.6632E−06 | −3.0488E−04 | 1.9035E−02 | −2.4823E−02 | 0.0000E+00 | 0.0000E+00 | 0.0000E+00 |
| S7 | 2.9291E−03 | −6.3205E−03 | 0.0000E+00 | 0.0000E+00 | 0.0000E+00 | 0.0000E+00 | 0.0000E+00 |

TABLE 27-continued

| surface number | A4 | A6 | A8 | A10 | A12 | A14 | A16 |
|---|---|---|---|---|---|---|---|
| S8 | −3.6030E−02 | 3.4386E−02 | 1.6598E−02 | −7.2215E−03 | 0.0000E+00 | 0.0000E+00 | 0.0000E+00 |
| S9 | −1.5690E−01 | −4.5383E−04 | −1.8308E−02 | 2.6358E−02 | 0.0000E+00 | 0.0000E+00 | 0.0000E+00 |
| S10 | −3.9214E−02 | 6.1404E−02 | −1.5581E−02 | −1.0632E−02 | 0.0000E+00 | 0.0000E+00 | 0.0000E+00 |
| S11 | 1.7804E−02 | 3.8428E−02 | −4.8120E−03 | −4.5502E−02 | 0.0000E+00 | 0.0000E+00 | 0.0000E+00 |
| S12 | −7.1579E−02 | −3.3159E−02 | 3.4881E−02 | 2.9320E−03 | 0.0000E+00 | 0.0000E+00 | 0.0000E+00 |
| S13 | −1.8171E−01 | −5.9050E−02 | 3.3730E−02 | 8.5103E−02 | 0.0000E+00 | 0.0000E+00 | 0.0000E+00 |
| S14 | −1.8035E−01 | 2.2280E−02 | 3.1378E−02 | 3.7667E−03 | 0.0000E+00 | 0.0000E+00 | 0.0000E+00 |

Figure 42:
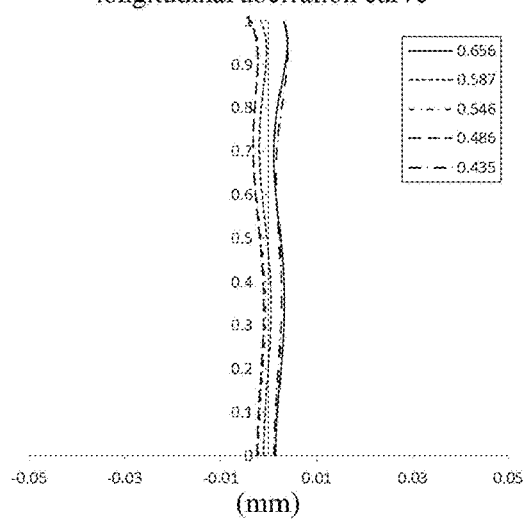
FIGS. 42-45 respectively illustrate a longitudinal aberration curve, an astigmatic curve, a distortion curve, and a lateral color curve of the optical imaging system according to Embodiment 9.
Figure 43:
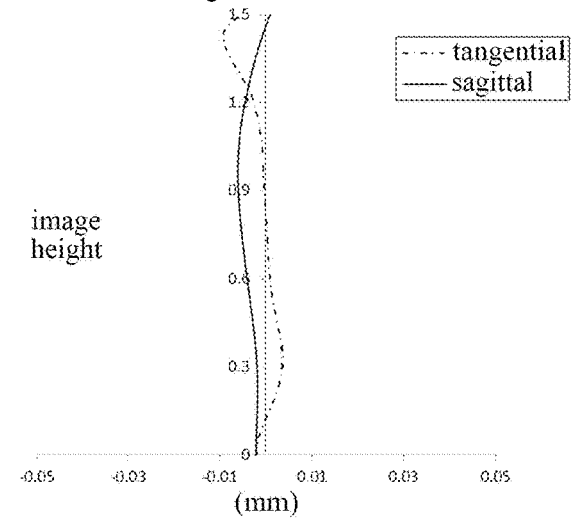
Figure 44:
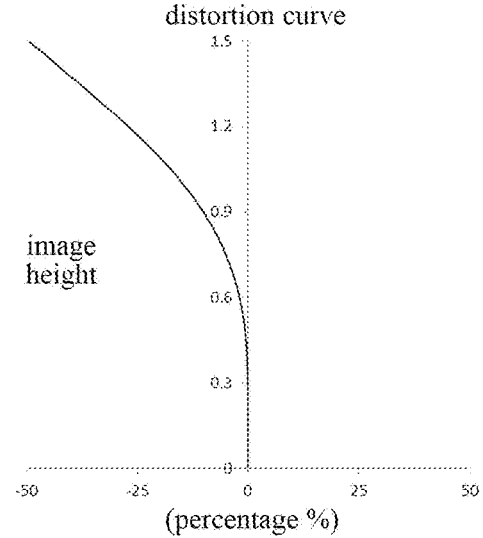
Figure 45:
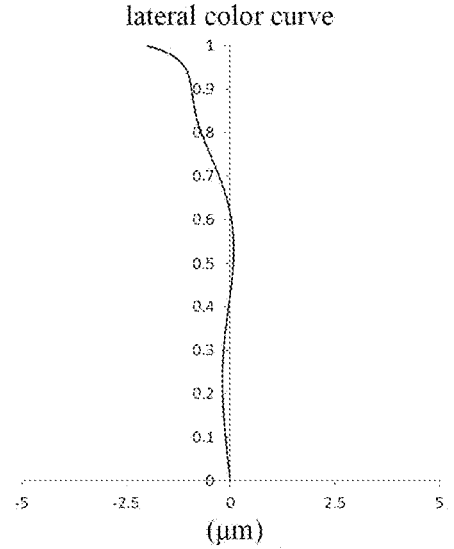

FIG. 42 illustrates the longitudinal aberration curve of the optical imaging system according to Embodiment 9, representing deviations of focal points of light of different wavelengths converged after passing through the optical system. FIG. 43 illustrates the astigmatic curve of the optical imaging system according to Embodiment 9, representing a curvature of the tangential image plane and a curvature of the sagittal image plane. FIG. 44 illustrates the distortion curve of the optical imaging system according to Embodiment 9, representing amounts of distortion at different viewing angles. FIG. 45 illustrates the lateral color curve of the optical imaging system according to Embodiment 9, representing deviations of different image heights on the image plane after light passes through the optical imaging system. In summary, it can be seen from FIGS. 41-45 that the optical imaging system according to Embodiment 9 is applicable to portable electronic products and has a large aperture, a good imaging quality, and wide-angle characteristics.

Embodiment 10

An optical imaging system according to Embodiment 10 of the present disclosure is described with reference to FIGS. 46-50.

Figure 46:
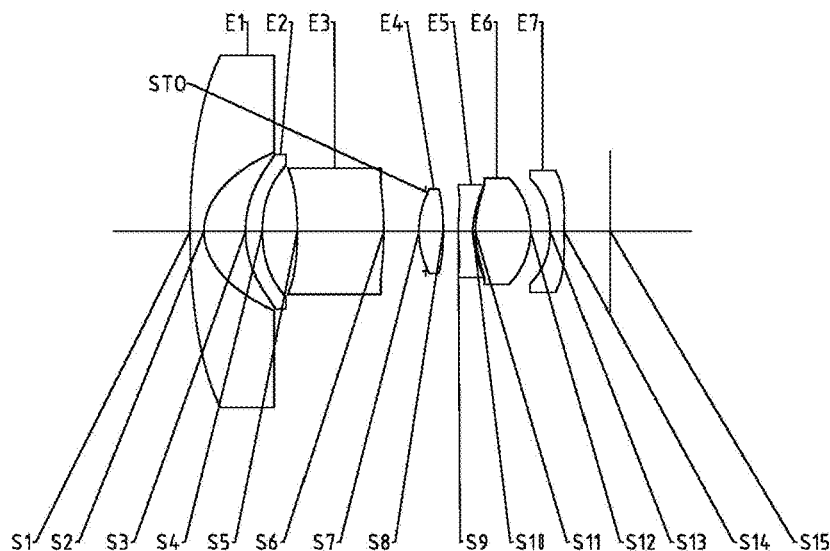
FIG. 46 is a schematic structural diagram illustrating an optical imaging system according to Embodiment 10.

FIG. 46 is a schematic structural diagram illustrating the optical imaging system according to Embodiment 10. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a concave surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a convex surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a concave surface.

Table 28 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 28

| f1(mm) | −1.91 | f(mm) | 0.97 |
|---|---|---|---|
| f2(mm) | 13.58 | TTL(mm) | 7.50 |
| f3(mm) | −19927.26 | ImgH(mm) | 1.43 |
| f4(mm) | 2.26 | | |
| f5(mm) | −2.93 | | |
| f6(mm) | 1.45 | | |
| f7(mm) | −2.54 | | |

Table 29 below shows the surface type, the radius of curvature, the thickness, the material and the conic coefficient of each lens of the optical imaging system in this embodiment. The units of the radius of curvature and the thickness are both shown in millimeters (mm).

TABLE 29

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 12.5918 | 0.2500 | 1.54 | 55.7 | −3.8741 |
| S2 | aspheric | 0.9444 | 0.7437 | | | −0.7679 |
| S3 | aspheric | 1.8772 | 0.3026 | 1.55 | 64.1 | 0.5053 |
| S4 | aspheric | 2.3699 | 0.6262 | | | 2.2997 |
| S5 | aspheric | −5.9421 | 1.5350 | 1.67 | 20.4 | 18.4808 |
| S6 | aspheric | −6.5596 | 0.7481 | | | 28.9475 |

TABLE 29-continued

| surface number | surface type | radius of curvature | thickness | material refractive index | abbe number | conic coefficient |
|---|---|---|---|---|---|---|
| STO | spherical | infinite | −0.1185 | | | |
| S7 | aspheric | 1.6170 | 0.4352 | 1.55 | 64.1 | 0.4975 |
| S8 | aspheric | −4.6912 | 0.2695 | | | 7.4179 |
| S9 | aspheric | 3.0982 | 0.2600 | 1.67 | 20.4 | −46.4407 |
| S10 | aspheric | 1.1592 | 0.0440 | | | −8.5503 |
| S11 | aspheric | 1.4184 | 0.9888 | 1.54 | 55.7 | −12.2639 |
| S12 | aspheric | −1.3123 | 0.3507 | | | −2.1012 |
| S13 | aspheric | −1.8297 | 0.2500 | 1.67 | 20.4 | 0.1919 |
| S14 | aspheric | 24.6668 | 0.8147 | | | 0.0000 |
| S15 | spherical | infinite | | | | |
| S16 | spherical | infinite | | | | |
| S17 | spherical | infinite | | | | |

Table 30 below shows the high-order coefficients applicable to the aspheric surfaces S1-S14 of the aspheric lenses in this embodiment. The surface type of each aspheric surface may be defined by the formula (1) given in Embodiment 1.

TABLE 30

| surface number | A4 | A6 | A8 | A10 | A12 | A14 | A16 |
|---|---|---|---|---|---|---|---|
| S1 | 1.2826E−03 | 7.3034E−07 | −8.1294E−07 | 8.1130E−07 | −3.1954E−08 | 0.0000E+00 | 0.0000E+00 |
| S2 | −2.3134E−02 | 1.5975E−02 | −9.3149E−03 | 3.7093E−03 | 1.9472E−05 | 0.0000E+00 | 0.0000E+00 |
| S3 | −1.6514E−02 | 5.1182E−03 | −5.0195E−03 | −3.4533E−03 | 0.0000E+00 | 0.0000E+00 | 0.0000E+00 |
| S4 | 3.0588E−02 | −1.6418E−03 | 5.8917E−03 | −1.2445E−02 | 0.0000E+00 | 0.0000E+00 | 0.0000E+00 |
| S5 | −1.8137E−02 | −6.9177E−04 | −6.6020E−03 | 6.1738E−03 | 0.0000E+00 | 0.0000E+00 | 0.0000E+00 |
| S6 | 7.9615E−03 | 1.1855E−02 | 1.0128E−02 | 9.5601E−03 | 0.0000E+00 | 0.0000E+00 | 0.0000E+00 |
| S7 | −1.6064E−02 | −1.4605E−02 | 0.0000E+00 | 0.0000E+00 | 0.0000E+00 | 0.0000E+00 | 0.0000E+00 |
| S8 | −5.0740E−02 | 1.6488E−02 | −1.0927E−02 | 2.2712E−02 | 0.0000E+00 | 0.0000E+00 | 0.0000E+00 |
| S9 | −1.6294E−01 | −2.2531E−02 | −6.6031E−02 | 7.7772E−02 | 0.0000E+00 | 0.0000E+00 | 0.0000E+00 |
| S10 | −1.7955E−02 | 7.3796E−02 | −4.7271E−03 | −1.8364E−02 | 0.0000E+00 | 0.0000E+00 | 0.0000E+00 |
| S11 | 1.6780E−02 | 3.0114E−02 | −1.0226E−02 | −3.6412E−02 | 0.0000E+00 | 0.0000E+00 | 0.0000E+00 |
| S12 | −5.4394E−02 | −4.8087E−02 | 1.1225E−02 | −4.9931E−03 | 0.0000E+00 | 0.0000E+00 | 0.0000E+00 |
| S13 | −1.2870E−01 | −2.5242E−02 | 1.5765E−02 | 3.5424E−02 | 0.0000E+00 | 0.0000E+00 | 0.0000E+00 |
| S14 | −1.4385E−01 | 2.8408E−03 | 1.1402E−02 | −6.0616E−04 | 0.0000E+00 | 0.0000E+00 | 0.0000E+00 |

Figure 47:
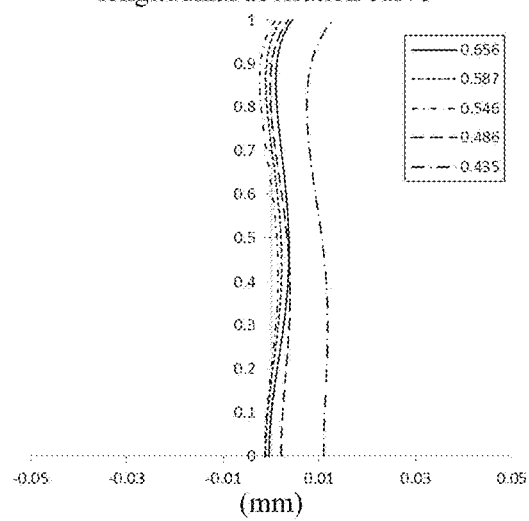
FIGS. 47-50 respectively illustrate a longitudinal aberration curve, an astigmatic curve, a distortion curve, and a lateral color curve of the optical imaging system according to Embodiment 10.
Figure 48:
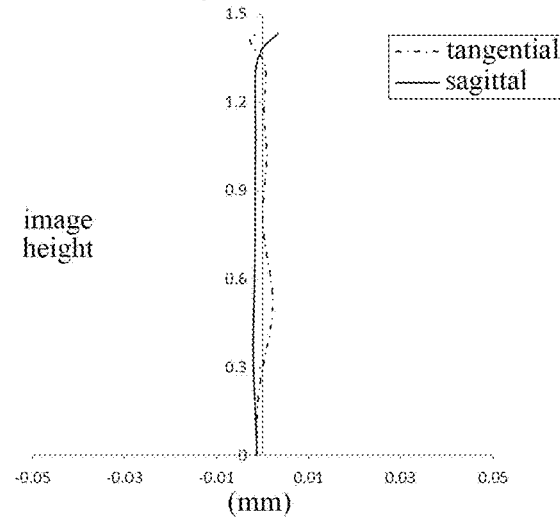
Figure 49:
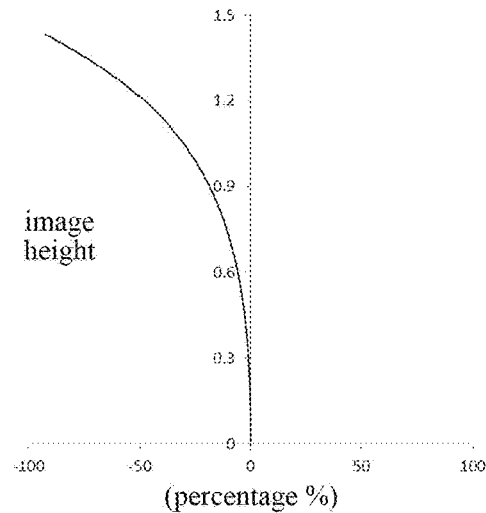
Figure 50:
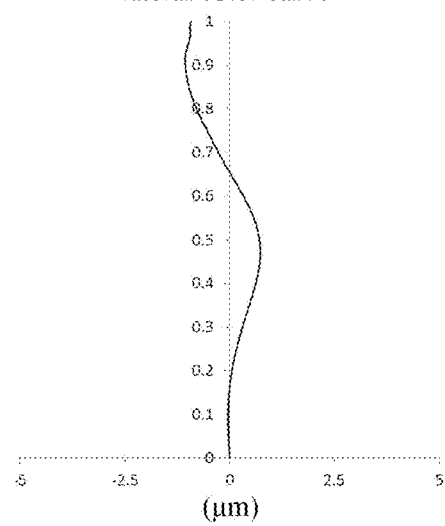

FIG. 47 illustrates the longitudinal aberration curve of the optical imaging system according to Embodiment 10, representing deviations of focal points of light of different wavelengths converged after passing through the optical system. FIG. 48 illustrates the astigmatic curve of the optical imaging system according to Embodiment 10, representing a curvature of the tangential image plane and a curvature of the sagittal image plane. FIG. 49 illustrates the distortion curve of the optical imaging system according to Embodiment 10, representing amounts of distortion at different viewing angles. FIG. 50 illustrates the lateral color curve of the optical imaging system according to Embodiment 10, representing deviations of different image heights on the image plane after light passes through the optical imaging system. In summary, it can be seen from FIGS. 46-50 that the optical imaging system according to Embodiment 10 is applicable to portable electronic products and has a large aperture, a good imaging quality, and wide-angle characteristics.

Embodiment 11

An optical imaging system according to Embodiment 11 of the present disclosure is described with reference to FIGS. 51-55.

Figure 51:
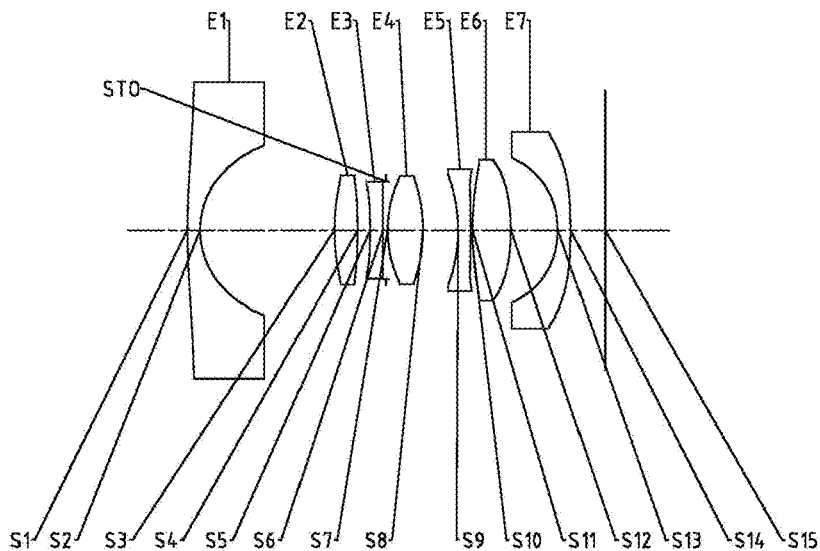
FIG. 51 is a schematic structural diagram illustrating an optical imaging system according to Embodiment 11.

FIG. 51 is a schematic structural diagram illustrating the optical imaging system according to Embodiment 11. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a convex surface.

The third lens E3 may have a negative refractive power. An object-side surface S5 of the third lens E3 may be a concave surface, and an image-side surface S6 of the third lens E3 may be a concave surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a concave surface, and an image-side surface S10 of the fifth lens E5 may be a convex surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a convex surface.

Table 31 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 31

| f1(mm) | −3.20 | f(mm) | 1.87 |
|---|---|---|---|
| f2(mm) | 5.49 | TTL(mm) | 7.50 |

TABLE 31-continued

| f3(mm) | −12.81 | ImgH(mm) | 2.50 |
|---|---|---|---|
| f4(mm) | 2.44 | | |
| f5(mm) | −7.29 | | |
| f6(mm) | 4.44 | | |
| f7(mm) | −2.96 | | |

Table 32 below shows the surface type, the radius of curvature, the thickness, the material and the conic coefficient of each lens of the optical imaging system in this embodiment. The units of the radius of curvature and the thickness are both shown in millimeters (mm).

TABLE 32

| surface number | surface type | radius of curvature | thickness | material refractive index | abbe number | conic coefficient |
|---|---|---|---|---|---|---|
| OBJ | spherical | infinite | infinite | | | |
| S1 | aspheric | 12.3574 | 0.2300 | 1.54 | 55.7 | 9.7054 |
| S2 | aspheric | 1.4979 | 2.4057 | | | −0.2084 |
| S3 | aspheric | 3.8068 | 0.4173 | 1.55 | 64.1 | −0.1139 |
| S4 | aspheric | −13.5796 | 0.2265 | | | 99.0000 |
| S5 | aspheric | −9.8386 | 0.2300 | 1.67 | 20.4 | 87.5501 |
| S6 | aspheric | 64.9639 | 0.0532 | | | 99.0000 |
| STO | spherical | infinite | 0.0300 | | | |
| S7 | aspheric | 2.2389 | 0.6387 | 1.55 | 64.1 | 0.1069 |
| S8 | aspheric | −2.9651 | 0.6314 | | | 2.0534 |
| S9 | aspheric | −3.0530 | 0.2300 | 1.67 | 20.4 | 2.7855 |
| S10 | aspheric | −8.4690 | 0.0300 | | | −99.0000 |
| S11 | aspheric | 5.9080 | 0.6887 | 1.54 | 55.7 | 14.7000 |
| S12 | aspheric | −3.8343 | 0.8435 | | | 4.9284 |
| S13 | aspheric | −1.6268 | 0.2300 | 1.67 | 20.4 | 0.3438 |
| S14 | aspheric | −9.7519 | 0.3150 | | | 23.4751 |
| S15 | spherical | infinite | 0.0000 | | | |
| S16 | spherical | infinite | 0.3000 | | | |
| S17 | spherical | infinite | | | | |

Table 33 below shows the high-order coefficients applicable to the aspheric surfaces S1-S14 of the aspheric lenses in this embodiment. The surface type of each aspheric surface may be defined by the formula (1) given in Embodiment 1.

TABLE 33

| surface number | A4 | A6 | A8 | A10 | A12 | A14 | A16 |
|---|---|---|---|---|---|---|---|
| S1 | −5.4199E−03 | 1.1027E−04 | 1.4261E−05 | −6.8889E−07 | −3.5650E−08 | 0.0000E+00 | 0.0000E+00 |
| S2 | 9.1565E−03 | −2.1396E−03 | 3.2976E−03 | −9.2671E−04 | 2.1724E−05 | 0.0000E+00 | 0.0000E+00 |
| S3 | −5.0586E−03 | −5.7481E−03 | −6.0383E−03 | 1.0614E−03 | 0.0000E+00 | 0.0000E+00 | 0.0000E+00 |
| S4 | −1.2572E−02 | −1.7189E−02 | −2.2371E−03 | 1.9264E−03 | 0.0000E+00 | 0.0000E+00 | 0.0000E+00 |
| S5 | −2.0381E−02 | −2.1096E−02 | −1.7564E−02 | 4.1104E−03 | 0.0000E+00 | 0.0000E+00 | 0.0000E+00 |
| S6 | 7.9778E−03 | −1.1287E−02 | −1.6064E−02 | −8.6357E−03 | 0.0000E+00 | 0.0000E+00 | 0.0000E+00 |
| S7 | 2.1498E−03 | 3.2918E−03 | −4.8934E−03 | 3.7284E−03 | 0.0000E+00 | 0.0000E+00 | 0.0000E+00 |
| S8 | −2.1155E−02 | 1.1055E−02 | 1.8651E−02 | −1.8335E−03 | 0.0000E+00 | 0.0000E+00 | 0.0000E+00 |
| S9 | −1.5923E−02 | 7.3649E−03 | 1.0735E−02 | 1.0233E−03 | 0.0000E+00 | 0.0000E+00 | 0.0000E+00 |
| S10 | 2.4082E−02 | 1.6938E−02 | 1.4995E−03 | 2.0482E−03 | 0.0000E+00 | 0.0000E+00 | 0.0000E+00 |
| S11 | −1.2715E−02 | −5.0993E−03 | 7.2678E−04 | 7.5279E−04 | 0.0000E+00 | 0.0000E+00 | 0.0000E+00 |
| S12 | −2.2718E−02 | 2.1163E−04 | 5.3046E−04 | −4.7744E−04 | 0.0000E+00 | 0.0000E+00 | 0.0000E+00 |
| S13 | −3.4690E−02 | 3.1185E−03 | −1.8930E−03 | 2.2183E−03 | 0.0000E+00 | 0.0000E+00 | 0.0000E+00 |
| S14 | −3.5950E−02 | 6.1441E−03 | −6.3764E−05 | −5.0009E−05 | 0.0000E+00 | 0.0000E+00 | 0.0000E+00 |

Figure 52:
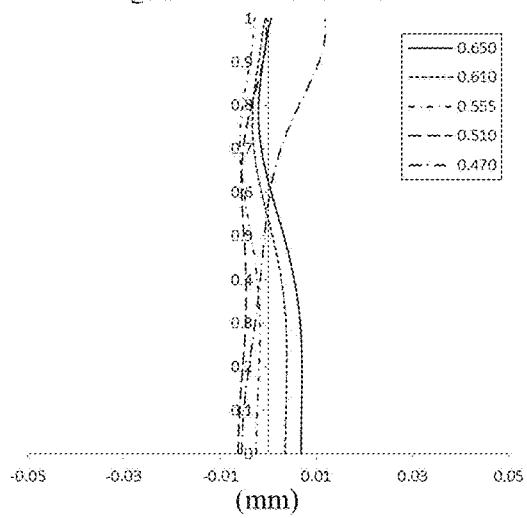
FIGS. 52-55 respectively illustrate a longitudinal aberration curve, an astigmatic curve, a distortion curve, and a lateral color curve of the optical imaging system according to Embodiment 11.
Figure 53:
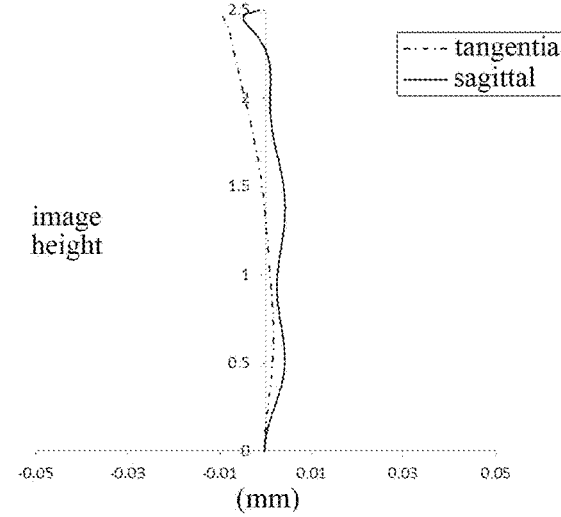
Figure 54:
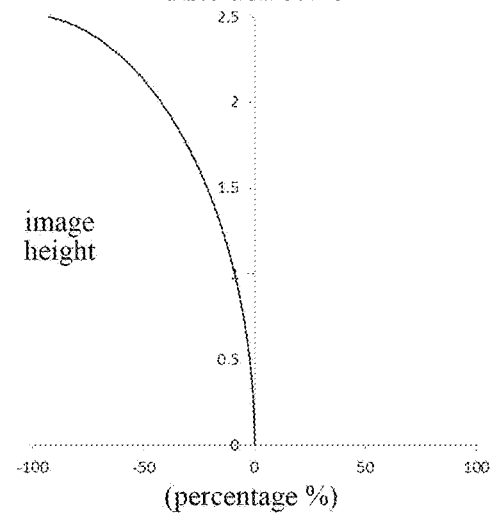
Figure 55:
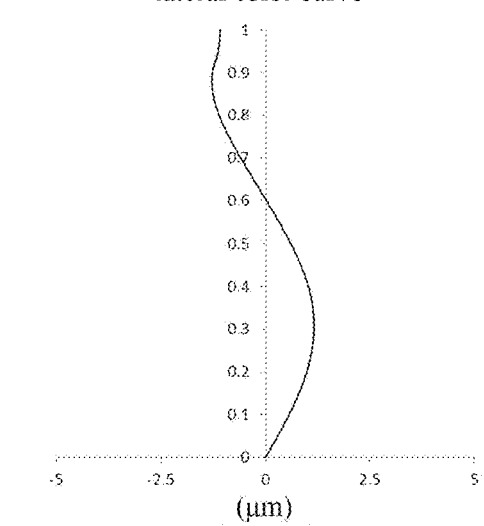

FIG. 52 illustrates the longitudinal aberration curve of the optical imaging system according to Embodiment 11, representing deviations of focal points of light of different wavelengths converged after passing through the optical system. FIG. 53 illustrates the astigmatic curve of the optical imaging system according to Embodiment 11, representing a curvature of the tangential image plane and a curvature of the sagittal image plane. FIG. 54 illustrates the distortion curve of the optical imaging system according to Embodiment 11, representing amounts of distortion at different viewing angles. FIG. 55 illustrates the lateral color curve of the optical imaging system according to Embodiment 11, representing deviations of different image heights on the image plane after light passes through the optical imaging system. In summary, it can be seen from FIGS. 51-55 that the optical imaging system according to Embodiment 11 is applicable to portable electronic products and has a large aperture, a good imaging quality, and wide-angle characteristics.

Embodiment 12

An optical imaging system according to Embodiment 12 of the present disclosure is described with reference to FIGS. 56-60.

Figure 56:
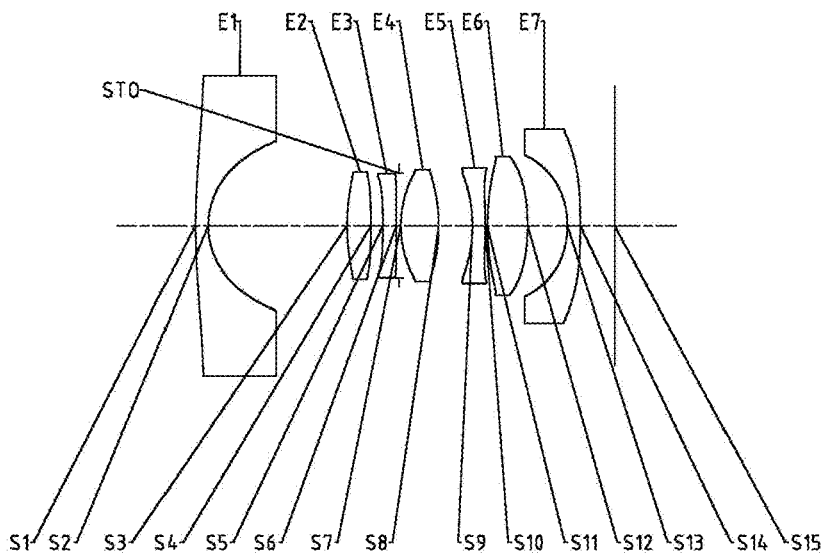
FIG. 56 is a schematic structural diagram illustrating an optical imaging system according to Embodiment 12.

FIG. 56 is a schematic structural diagram illustrating the optical imaging system according to Embodiment 12. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a convex surface.

The third lens E3 may have a negative refractive power. An object-side surface S5 of the third lens E3 may be a concave surface, and an image-side surface S6 of the third lens E3 may be a concave surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a concave surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a convex surface.

Table 34 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 34

| f1(mm) | −2.99 | f(mm) | 1.72 |
| f2(mm) | 5.41 | TTL(mm) | 7.50 |
| f3(mm) | −14.27 | ImgH(mm) | 2.50 |
| f4(mm) | 2.41 | | |
| f5(mm) | −6.17 | | |
| f6(mm) | 3.85 | | |
| f7(mm) | −2.90 | | |

Table 35 below shows the surface type, the radius of curvature, the thickness, the material and the conic coefficient of each lens of the optical imaging system in this embodiment. The units of the radius of curvature and the thickness are both shown in millimeters (mm).

TABLE 35

| surface number | surface type | radius of curvature | thickness | material refractive index | material abbe number | conic coefficient |
| --- | --- | --- | --- | --- | --- | --- |
| OBJ | spherical | infinite | infinite | | | |
| S1 | aspheric | 11.3155 | 0.2300 | 1.54 | 55.7 | 10.4844 |
| S2 | aspheric | 1.3964 | 2.4864 | | | −0.3588 |
| S3 | aspheric | 3.7278 | 0.4298 | 1.55 | 64.1 | −0.2424 |
| S4 | aspheric | −13.6129 | 0.2156 | | | 99.0000 |
| S5 | aspheric | −9.6748 | 0.2372 | 1.67 | 20.4 | 80.9353 |
| S6 | aspheric | 556.9517 | 0.0507 | | | 99.0000 |
| STO | spherical | infinite | 0.0300 | | | 0.0000 |
| S7 | aspheric | 2.0327 | 0.6813 | 1.55 | 64.1 | 0.0744 |
| S8 | aspheric | −3.2757 | 0.5925 | | | 2.8487 |
| S9 | aspheric | −2.8045 | 0.2300 | 1.67 | 20.4 | 3.1040 |
| S10 | aspheric | −9.1087 | 0.0368 | | | −99.0000 |
| S11 | aspheric | 4.3099 | 0.7224 | 1.54 | 55.7 | 7.2271 |
| S12 | aspheric | −3.7302 | 0.7123 | | | 5.0365 |
| S13 | aspheric | −1.6867 | 0.2300 | 1.67 | 20.4 | 0.4952 |
| S14 | aspheric | −14.0988 | 0.3150 | | | 52.5878 |
| S15 | spherical | infinite | 0.0000 | | | |
| S16 | spherical | infinite | 0.3000 | | | |
| S17 | spherical | infinite | | | | |

Table 36 below shows the high-order coefficients applicable to the aspheric surfaces S1-S14 of the aspheric lenses in this embodiment. The surface type of each aspheric surface may be defined by the formula (1) given in Embodiment 1.

TABLE 36

| surface number | A4 | A6 | A8 | A10 | A12 | A14 | A16 |
|---|---|---|---|---|---|---|---|
| S1 | −5.8896E−03 | 1.3230E−04 | 1.1882E−05 | −1.2394E−06 | −3.5650E−08 | 0.0000E+00 | 0.0000E+00 |
| S2 | 1.2699E−02 | 2.6138E−04 | 2.6185E−03 | −5.2076E−04 | 2.1724E−05 | 0.0000E+00 | 0.0000E+00 |
| S3 | −5.1891E−03 | −9.0681E−03 | −1.6555E−03 | −3.0310E−03 | 0.0000E+00 | 0.0000E+00 | 0.0000E+00 |
| S4 | −1.8042E−02 | −2.3189E−02 | −1.7803E−03 | 1.7471E−03 | 0.0000E+00 | 0.0000E+00 | 0.0000E+00 |
| S5 | −1.7769E−02 | −3.6670E−02 | −2.1403E−02 | 8.6515E−03 | 0.0000E+00 | 0.0000E+00 | 0.0000E+00 |
| S6 | 1.3026E−02 | −2.0266E−02 | −2.6184E−02 | 5.2012E−04 | 0.0000E+00 | 0.0000E+00 | 0.0000E+00 |
| S7 | 9.4389E−04 | 4.3339E−03 | −6.3072E−03 | 4.3899E−03 | 0.0000E+00 | 0.0000E+00 | 0.0000E+00 |
| S8 | −3.3076E−02 | 1.9887E−02 | 2.3747E−02 | −6.5654E−03 | 0.0000E+00 | 0.0000E+00 | 0.0000E+00 |
| S9 | −2.3377E−02 | 2.0744E−02 | 1.9506E−02 | −4.0279E−03 | 0.0000E+00 | 0.0000E+00 | 0.0000E+00 |
| S10 | 3.1465E−02 | 2.2399E−02 | 5.7373E−03 | 4.3603E−04 | 0.0000E+00 | 0.0000E+00 | 0.0000E+00 |
| S11 | −2.1073E−02 | −4.4208E−03 | 1.4531E−03 | −1.9112E−05 | 0.0000E+00 | 0.0000E+00 | 0.0000E+00 |
| S12 | −2.7336E−02 | 4.8699E−03 | −1.6695E−04 | −1.4181E−03 | 0.0000E+00 | 0.0000E+00 | 0.0000E+00 |
| S13 | −3.3576E−02 | 4.4795E−04 | 1.0971E−03 | −5.4839E−05 | 0.0000E+00 | 0.0000E+00 | 0.0000E+00 |
| S14 | −3.2906E−02 | 5.6333E−03 | −1.1128E−04 | −3.8457E−06 | 0.0000E+00 | 0.0000E+00 | 0.0000E+00 |

Figure 57:
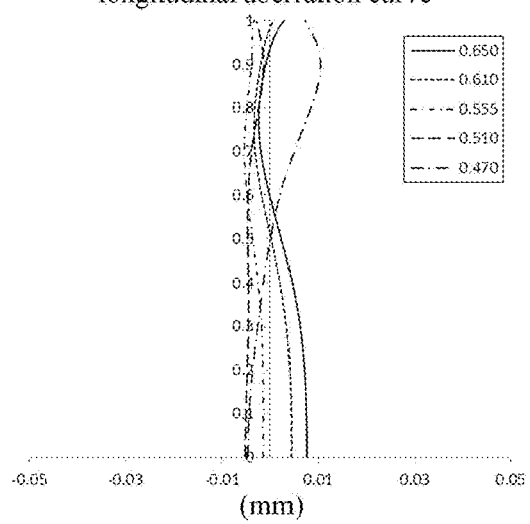
FIGS. 57-60 respectively illustrate a longitudinal aberration curve, an astigmatic curve, a distortion curve, and a lateral color curve of the optical imaging system according to Embodiment 12.
Figure 58:
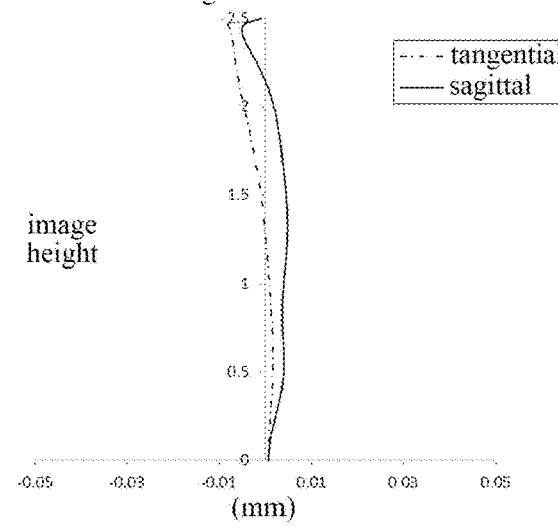
Figure 59:
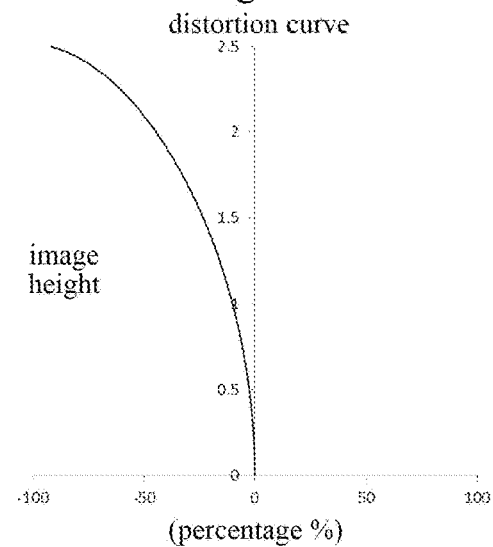
Figure 60:
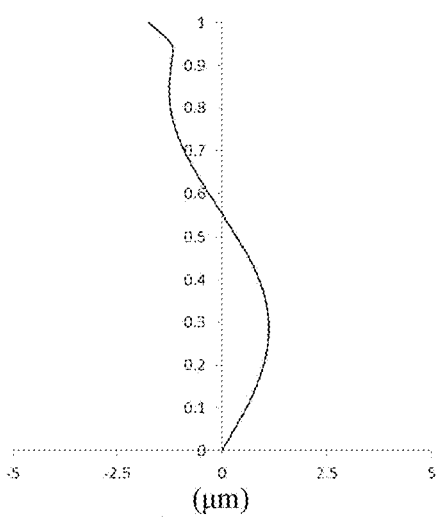

FIG. 57 illustrates the longitudinal aberration curve of the optical imaging system according to Embodiment 12, representing deviations of focal points of light of different wavelengths converged after passing through the optical system. FIG. 58 illustrates the astigmatic curve of the optical imaging system according to Embodiment 12, representing a curvature of the tangential image plane and a curvature of the sagittal image plane. FIG. 59 illustrates the distortion curve of the optical imaging system according to Embodiment 12, representing amounts of distortion at different viewing angles. FIG. 60 illustrates the lateral color curve of the optical imaging system according to Embodiment 12, representing deviations of different image heights on the image plane after light passes through the optical imaging system. In summary, it can be seen from FIGS. 56-60 that the optical imaging system according to Embodiment 12 is applicable to portable electronic products and has a large aperture, a good imaging quality, and wide-angle characteristics.

Embodiment 13

An optical imaging system according to Embodiment 13 of the present disclosure is described with reference to FIGS. 61-65.

Figure 61:
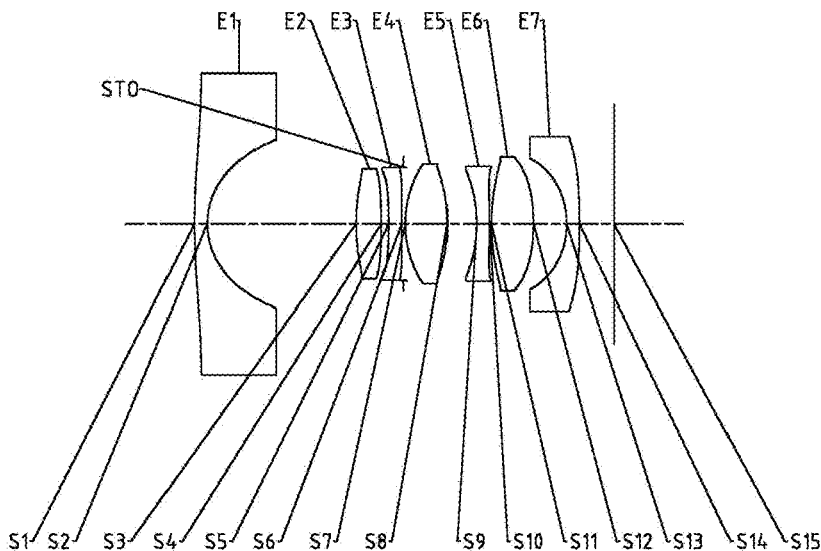
FIG. 61 is a schematic structural diagram illustrating an optical imaging system according to Embodiment 13.

FIG. 61 is a schematic structural diagram illustrating the optical imaging system according to Embodiment 13. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a convex surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a concave surface, and an image-side surface S10 of the fifth lens E5 may be a convex surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a convex surface.

Table 37 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 37

| f1(mm) | −2.85 | f(mm) | 1.53 |
|---|---|---|---|
| f2(mm) | 5.42 | TTL(mm) | 7.50 |
| f3(mm) | −16.24 | ImgH(mm) | 2.14 |
| f4(mm) | 2.40 | | |
| f5(mm) | −5.92 | | |
| f6(mm) | 3.28 | | |
| f7(mm) | −2.66 | | |

Table 38 below shows the surface type, the radius of curvature, the thickness, the material and the conic coefficient of each lens of the optical imaging system in this embodiment. The units of the radius of curvature and the thickness are both shown in millimeters (mm).

TABLE 38

| surface number | surface type | radius of curvature | thickness | material refractive index | abbe number | conic coefficient |
|---|---|---|---|---|---|---|
| OBJ | spherical | infinite | infinite | | | |
| S1 | aspheric | 11.3732 | 0.2300 | 1.54 | 55.7 | 10.1745 |
| S2 | aspheric | 1.3375 | 2.6653 | | | −0.4009 |
| S3 | aspheric | 3.7314 | 0.4494 | 1.55 | 64.1 | −0.5211 |
| S4 | aspheric | −13.6479 | 0.1390 | | | 99.0000 |
| S5 | aspheric | −9.7481 | 0.2311 | 1.67 | 20.4 | 78.3377 |
| S6 | aspheric | −98.9223 | 0.0300 | | | 81.2315 |
| STO | spherical | infinite | 0.0300 | | | |
| S7 | aspheric | 1.9757 | 0.7516 | 1.55 | 64.1 | 0.0019 |
| S8 | aspheric | −3.3591 | 0.5191 | | | 3.3953 |
| S9 | aspheric | −2.7015 | 0.2300 | 1.67 | 20.4 | 3.2821 |
| S10 | aspheric | −8.8471 | 0.0300 | | | −99.0000 |
| S11 | aspheric | 3.6013 | 0.7573 | 1.54 | 55.7 | 5.2445 |
| S12 | aspheric | −3.1983 | 0.5924 | | | 3.9827 |
| S13 | aspheric | −1.5786 | 0.2300 | 1.67 | 20.4 | 0.4450 |
| S14 | aspheric | −15.0769 | 0.3150 | | | 75.1981 |
| S15 | spherical | infinite | 0.0000 | | | |
| S16 | spherical | infinite | 0.3000 | | | |
| S17 | spherical | infinite | | | | |

Table 39 below shows the high-order coefficients applicable to the aspheric surfaces S1-S14 of the aspheric lenses in this embodiment. The surface type of each aspheric surface may be defined by the formula (1) given in Embodiment 1.

TABLE 39

| Surface number | A4 | A6 | A8 | A10 | A12 | A14 | A16 |
|---|---|---|---|---|---|---|---|
| S1 | −6.3789E−03 | 1.5045E−04 | 1.4213E−05 | −1.1805E−06 | −3.5650E−08 | 0.0000E+00 | 0.0000E+00 |
| S2 | 1.2035E−02 | −2.5635E−04 | 2.7848E−03 | −7.5484E−04 | 2.1724E−05 | 0.0000E+00 | 0.0000E+00 |
| S3 | −5.9908E−03 | −9.1088E−03 | 3.7383E−04 | −3.9659E−03 | 0.0000E+00 | 0.0000E+00 | 0.0000E+00 |
| S4 | −2.0379E−02 | −2.6846E−02 | −4.5651E−03 | 1.0251E−03 | 0.0000E+00 | 0.0000E+00 | 0.0000E+00 |
| S5 | −1.6836E−02 | −4.0364E−02 | −2.5443E−02 | 5.4934E−03 | 0.0000E+00 | 0.0000E+00 | 0.0000E+00 |
| S6 | 1.2301E−02 | −1.9881E−02 | −2.5969E−02 | 1.7722E−03 | 0.0000E+00 | 0.0000E+00 | 0.0000E+00 |
| S7 | −7.1609E−04 | 3.7505E−03 | −5.7594E−03 | 3.6934E−03 | 0.0000E+00 | 0.0000E+00 | 0.0000E+00 |
| S8 | −4.0445E−02 | 2.0714E−02 | 2.3380E−02 | −6.8733E−03 | 0.0000E+00 | 0.0000E+00 | 0.0000E+00 |
| S9 | −2.2683E−02 | 2.1567E−02 | 2.1964E−02 | −5.3806E−03 | 0.0000E+00 | 0.0000E+00 | 0.0000E+00 |
| S10 | 3.4756E−02 | 2.2651E−02 | 4.9562E−03 | 1.2608E−04 | 0.0000E+00 | 0.0000E+00 | 0.0000E+00 |
| S11 | −2.8312E−02 | −6.9522E−03 | 1.7892E−03 | −7.4743E−04 | 0.0000E+00 | 0.0000E+00 | 0.0000E+00 |
| S12 | −2.9499E−02 | 5.6250E−03 | −5.5859E−04 | −1.2155E−03 | 0.0000E+00 | 0.0000E+00 | 0.0000E+00 |
| S13 | −3.3467E−02 | 3.4902E−03 | −9.6743E−04 | 2.6331E−03 | 0.0000E+00 | 0.0000E+00 | 0.0000E+00 |
| S14 | −2.6879E−02 | 5.9465E−03 | 3.4930E−06 | −1.7788E−05 | 0.0000E+00 | 0.0000E+00 | 0.0000E+00 |

Figure 62:
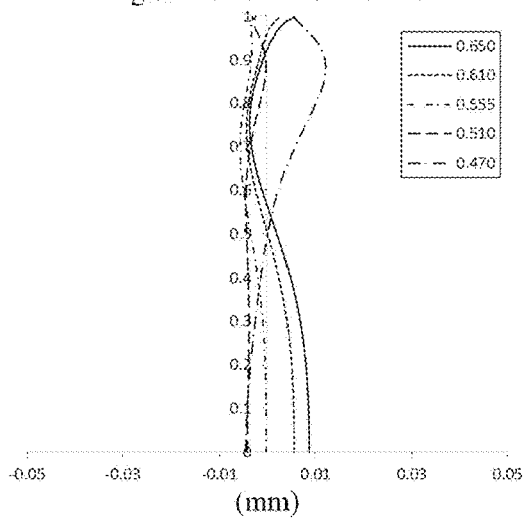
FIGS. 62-65 respectively illustrate a longitudinal aberration curve, an astigmatic curve, a distortion curve, and a lateral color curve of the optical imaging system according to Embodiment 13.
Figure 63:
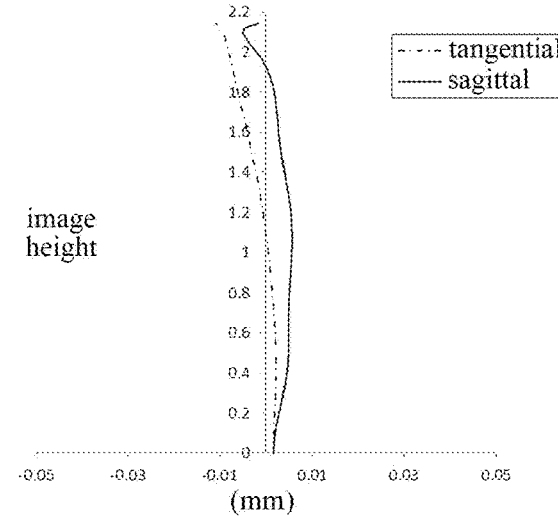
Figure 64:
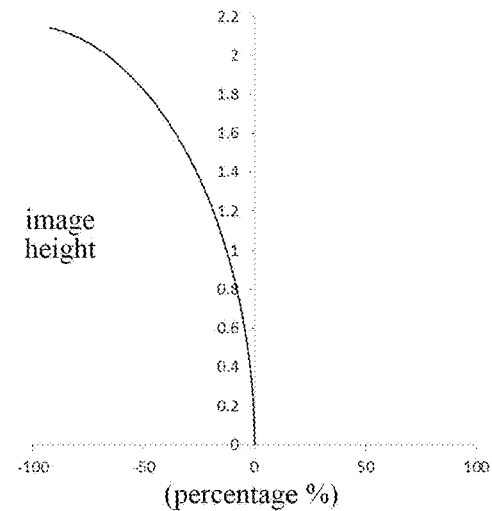
Figure 65:
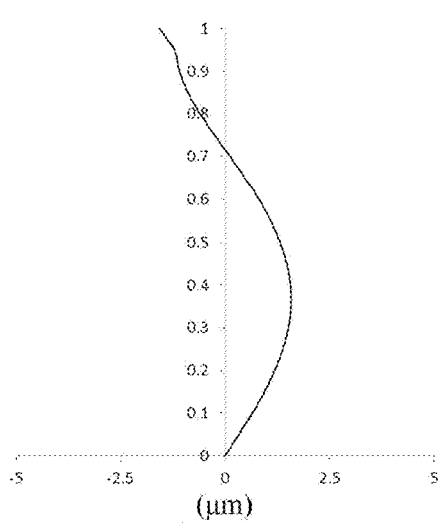

FIG. 62 illustrates the longitudinal aberration curve of the optical imaging system according to Embodiment 13, representing deviations of focal points of light of different wavelengths converged after passing through the optical system. FIG. 63 illustrates the astigmatic curve of the optical imaging system according to Embodiment 13, representing a curvature of the tangential image plane and a curvature of the sagittal image plane. FIG. 64 illustrates the distortion curve of the optical imaging system according to Embodiment 13, representing amounts of distortion at different viewing angles. FIG. 65 illustrates the lateral color curve of the optical imaging system according to Embodiment 13, representing deviations of different image heights on the image plane after light passes through the optical imaging system. In summary, it can be seen from FIGS. 61-65 that the optical imaging system according to Embodiment 13 is applicable to portable electronic products and has a large aperture, a good imaging quality, and wide-angle characteristics.

Embodiment 14

An optical imaging system according to Embodiment 14 of the present disclosure is described with reference to FIGS. 66-70.

Figure 66:
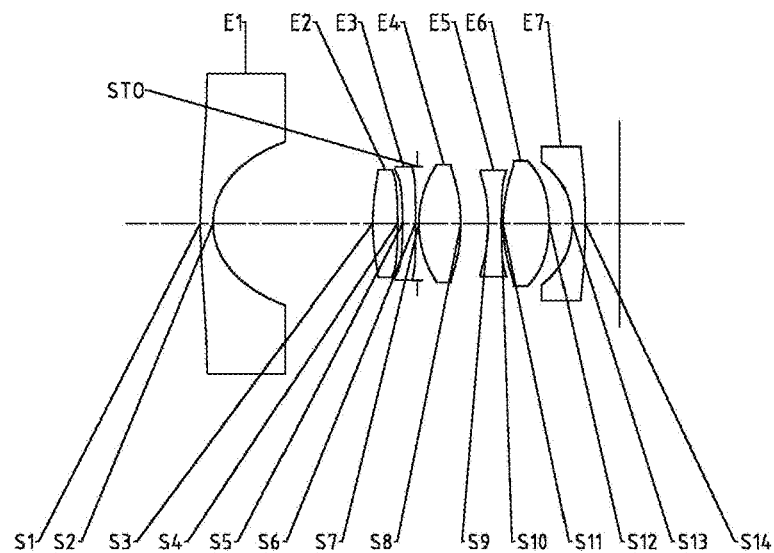
FIG. 66 is a schematic structural diagram illustrating an optical imaging system according to Embodiment 14.

FIG. 66 is a schematic structural diagram illustrating the optical imaging system according to Embodiment 14. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a convex surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a concave surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a convex surface.

Table 40 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 40

| f1(mm) | −2.53 | f(mm) | 1.30 |
|---|---|---|---|
| f2(mm) | 5.47 | TTL(mm) | 7.50 |
| f3(mm) | −21.48 | ImgH(mm) | 1.84 |
| f4(mm) | 2.34 | | |
| f5(mm) | −4.31 | | |
| f6(mm) | 2.46 | | |
| f7(mm) | −2.48 | | |

Table 41 below shows the surface type, the radius of curvature, the thickness, the material and the conic coefficient of each lens of the optical imaging system in this embodiment. The units of the radius of curvature and the thickness are both shown in millimeters (mm).

TABLE 41

| surface number | surface type | radius of curvature | thickness | refractive index | abbe number | conic coefficient |
|---|---|---|---|---|---|---|
| OBJ | spherical | infinite | infinite | | | |
| S1 | aspheric | 10.4850 | 0.2300 | 1.54 | 55.7 | 8.3872 |
| S2 | aspheric | 1.1911 | 2.8528 | | | −0.5053 |
| S3 | aspheric | 3.8454 | 0.4484 | 1.55 | 64.1 | −1.4486 |
| S4 | aspheric | −12.8060 | 0.0914 | | | 85.6668 |
| S5 | aspheric | −9.2138 | 0.2300 | 1.67 | 20.4 | 74.6697 |
| S6 | aspheric | −26.1110 | 0.0300 | | | 99.0000 |
| STO | spherical | infinite | 0.0300 | | | |
| S7 | aspheric | 1.8814 | 0.7518 | 1.55 | 64.1 | −0.1739 |
| S8 | aspheric | −3.4353 | 0.4928 | | | 3.6202 |
| S9 | aspheric | −3.5099 | 0.2300 | 1.67 | 20.4 | 6.1375 |
| S10 | aspheric | 16.2540 | 0.0300 | | | 88.7482 |
| S11 | aspheric | 2.4791 | 0.8314 | 1.54 | 55.7 | 2.3462 |
| S12 | aspheric | −2.4871 | 0.4065 | | | 2.6429 |
| S13 | aspheric | −1.4819 | 0.2300 | 1.67 | 20.4 | 0.2911 |
| S14 | aspheric | −15.1467 | 0.3150 | | | 99.0000 |
| S15 | spherical | infinite | 0.0000 | | | |
| S16 | spherical | infinite | 0.3000 | | | |
| S17 | spherical | infinite | | | | |

Table 42 below shows the high-order coefficients applicable to the aspheric surfaces S1-S14 of the aspheric lenses in this embodiment. The surface type of each aspheric surface may be defined by the formula (1) given in Embodiment 1.

TABLE 42

| surface number | A4 | A6 | A8 | A10 | A12 | A14 | A16 |
|---|---|---|---|---|---|---|---|
| S1 | −7.4484E−03 | 1.8146E−04 | 2.1218E−05 | −1.6507E−06 | −3.5650E−08 | 0.0000E+00 | 0.0000E+00 |
| S2 | 1.5942E−02 | −2.0335E−03 | 4.8605E−03 | −1.8923E−03 | 2.1724E−05 | 0.0000E+00 | 0.0000E+00 |
| S3 | −8.4429E−03 | −1.4517E−02 | 1.8873E−03 | −6.4166E−03 | 2.2960E−28 | 0.0000E+00 | 0.0000E+00 |
| S4 | −2.4558E−02 | −3.3150E−02 | −1.4564E−02 | 2.1676E−05 | 0.0000E+00 | 0.0000E+00 | 0.0000E+00 |
| S5 | −1.3827E−02 | −4.7338E−02 | −3.4528E−02 | 2.8322E−04 | 0.0000E+00 | 0.0000E+00 | 0.0000E+00 |
| S6 | 1.1061E−02 | −2.2320E−02 | −2.8305E−02 | −8.6762E−04 | 0.0000E+00 | 0.0000E+00 | 0.0000E+00 |
| S7 | −6.1893E−03 | 4.4227E−03 | −2.9603E−03 | 2.7664E−03 | 0.0000E+00 | 0.0000E+00 | 0.0000E+00 |
| S8 | −5.9389E−02 | 3.5069E−02 | 2.2365E−02 | −7.6794E−03 | 0.0000E+00 | 0.0000E+00 | 0.0000E+00 |
| S9 | −5.0357E−02 | 2.3768E−02 | 3.0652E−02 | −1.3995E−02 | 0.0000E+00 | 0.0000E+00 | 0.0000E+00 |
| S10 | 5.1637E−02 | 2.0798E−02 | 1.1826E−02 | −3.1278E−03 | 0.0000E+00 | 0.0000E+00 | 0.0000E+00 |
| S11 | −5.2543E−02 | −9.6078E−03 | 2.0843E−03 | −5.4075E−03 | 0.0000E+00 | 0.0000E+00 | 0.0000E+00 |
| S12 | −4.2190E−02 | 6.1484E−03 | 3.1427E−03 | −1.8954E−03 | 0.0000E+00 | 0.0000E+00 | 0.0000E+00 |
| S13 | −2.0163E−02 | −2.1441E−03 | 3.3680E−03 | 8.8409E−03 | 0.0000E+00 | 0.0000E+00 | 0.0000E+00 |
| S14 | −9.1787E−03 | 1.4391E−03 | 2.5869E−03 | −1.7348E−04 | 0.0000E+00 | 0.0000E+00 | 0.0000E+00 |

Figure 67:
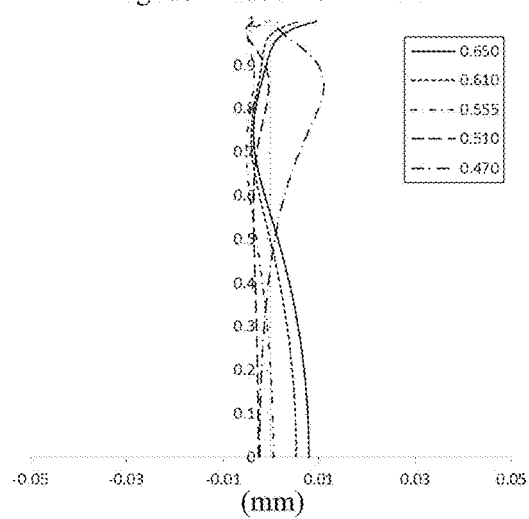
FIGS. 67-70 respectively illustrate a longitudinal aberration curve, an astigmatic curve, a distortion curve, and a lateral color curve of the optical imaging system according to Embodiment 14.
Figure 68:
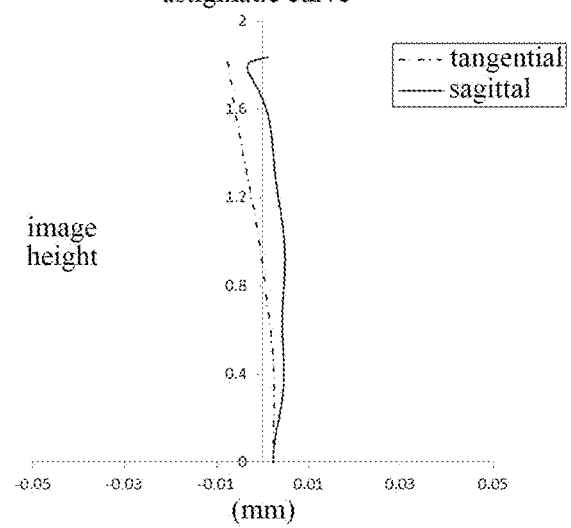
Figure 69:
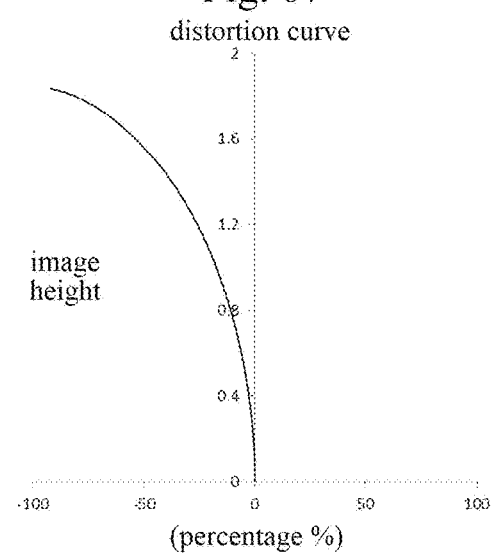
Figure 70:
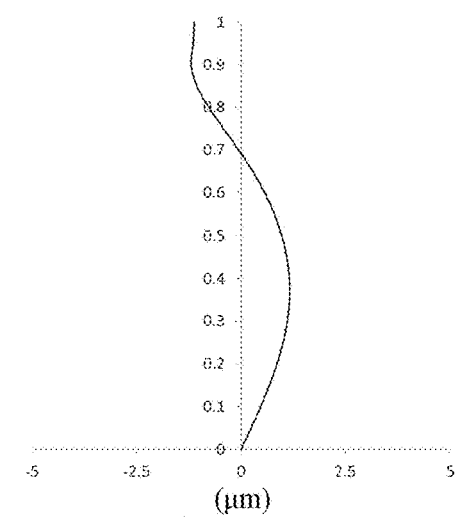

FIG. 67 illustrates the longitudinal aberration curve of the optical imaging system according to Embodiment 14, representing deviations of focal points of light of different wavelengths converged after passing through the optical system. FIG. 68 illustrates the astigmatic curve of the optical imaging system according to Embodiment 14, representing a curvature of the tangential image plane and a curvature of the sagittal image plane. FIG. 69 illustrates the distortion curve of the optical imaging system according to Embodiment 14, representing amounts of distortion at different viewing angles. FIG. 70 illustrates the lateral color curve of the optical imaging system according to Embodiment 14, representing deviations of different image heights on the image plane after light passes through the optical imaging system. In summary, it can be seen from FIGS. 66-70 that the optical imaging system according to Embodiment 14 is applicable to portable electronic products and has a large aperture, a good imaging quality, and wide-angle characteristics.

Embodiment 15

An optical imaging system according to Embodiment 15 of the present disclosure is described with reference to FIGS. 71-75.

Figure 71:
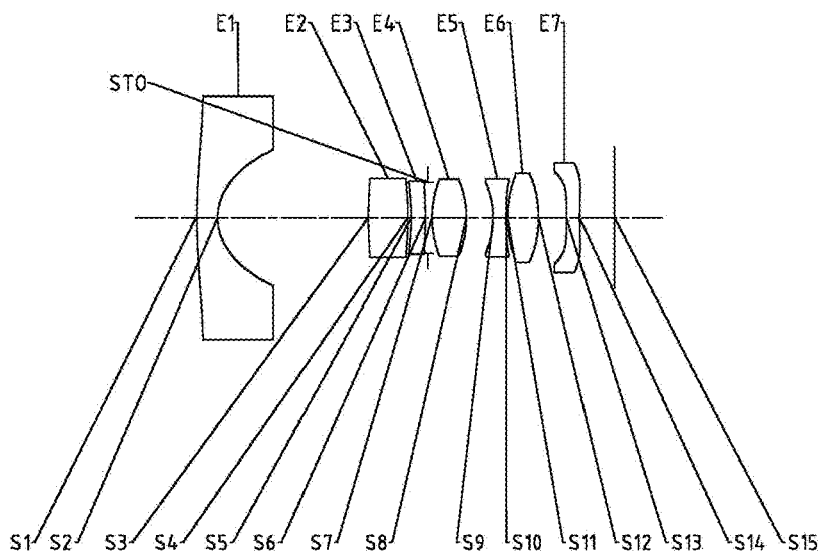
FIG. 71 is a schematic structural diagram illustrating an optical imaging system according to Embodiment 15.

FIG. 71 is a schematic structural diagram illustrating the optical imaging system according to Embodiment 15. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a convex surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a concave surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a convex surface, and an image-side surface S14 of the seventh lens E7 may be a concave surface.

Table 43 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 43

| f1(mm) | −1.93 | f(mm) | 0.94 |
| f2(mm) | 5.83 | TTL(mm) | 7.50 |
| f3(mm) | −20.12 | ImgH(mm) | 1.27 |
| f4(mm) | 1.78 | | |
| f5(mm) | −1.96 | | |
| f6(mm) | 2.29 | | |
| f7(mm) | −15.52 | | |

Table 44 below shows the surface type, the radius of curvature, the thickness, the material and the conic coefficient of each lens of the optical imaging system in this embodiment. The units of the radius of curvature and the thickness are both shown in millimeters (mm).

TABLE 44

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 10.7471 | 0.3729 | 1.54 | 55.7 | 9.0231 |
| S2 | aspheric | 0.9337 | 2.7013 | | | −0.6116 |
| S3 | aspheric | 5.2783 | 0.7144 | 1.55 | 64.1 | −28.7931 |
| S4 | aspheric | −7.6363 | 0.0629 | | | 77.4302 |
| S5 | aspheric | −3.6283 | 0.2567 | 1.67 | 20.4 | −40.2447 |
| S6 | aspheric | −5.1152 | 0.0360 | | | −56.2951 |
| STO | spherical | infinite | 0.0775 | | | |
| S7 | aspheric | 1.7079 | 0.6190 | 1.55 | 64.1 | −1.0946 |
| S8 | aspheric | −1.9637 | 0.4838 | | | 1.9271 |
| S9 | aspheric | −1.6379 | 0.2300 | 1.67 | 20.4 | 2.6332 |
| S10 | aspheric | 6.7637 | 0.0300 | | | 60.7697 |
| S11 | aspheric | 2.2315 | 0.5534 | 1.54 | 55.7 | 3.9455 |
| S12 | aspheric | −2.5082 | 0.5047 | | | 3.3999 |
| S13 | aspheric | 139.1335 | 0.2300 | 1.67 | 20.4 | 0.4450 |
| S14 | aspheric | 9.6216 | 0.3273 | | | 74.9201 |
| S15 | spherical | infinite | 0.0000 | | | |
| S16 | spherical | infinite | 0.3000 | | | |
| S17 | spherical | infinite | | | | |

Table 45 below shows the high-order coefficients applicable to the aspheric surfaces S1-S14 of the aspheric lenses in this embodiment. The surface type of each aspheric surface may be defined by the formula (1) given in Embodiment 1.

TABLE 45

| surface number | A4 | A6 | A8 | A10 | A12 | A14 | A16 |
|---|---|---|---|---|---|---|---|
| S1 | −6.5692E−03 | 6.2664E−05 | 1.3477E−05 | −4.5606E−07 | −3.5650E−08 | 0.0000E+00 | 0.0000E+00 |
| S2 | 5.0796E−03 | −1.5078E−02 | 1.1813E−02 | −4.0884E−03 | 2.1724E−05 | 0.0000E+00 | 0.0000E+00 |
| S3 | −2.7414E−02 | −3.5146E−02 | −2.2329E−02 | 1.0617E−02 | 4.4228E−24 | 0.0000E+00 | 0.0000E+00 |
| S4 | −4.3537E−03 | −4.3320E−02 | −4.8095E−02 | 4.3622E−01 | 0.0000E+00 | 0.0000E+00 | 0.0000E+00 |
| S5 | −1.8064E−02 | 7.5565E−03 | 7.8484E−02 | 2.9868E−01 | 0.0000E+00 | 0.0000E+00 | 0.0000E+00 |
| S6 | 1.2704E−02 | −5.5710E−03 | 1.8612E−01 | 7.5489E−02 | 0.0000E+00 | 0.0000E+00 | 0.0000E+00 |
| S7 | −2.6471E−02 | −5.3383E−02 | 3.1618E−02 | 2.8483E−02 | 0.0000E+00 | 0.0000E+00 | 0.0000E+00 |
| S8 | −1.0240E−02 | −3.5852E−02 | 3.1558E−03 | 7.0322E−02 | 0.0000E+00 | 0.0000E+00 | 0.0000E+00 |
| S9 | −2.3697E−03 | 1.0531E−01 | 1.1544E−01 | 3.1586E−01 | 0.0000E+00 | 0.0000E+00 | 0.0000E+00 |
| S10 | 3.3597E−02 | 2.2291E−02 | 6.6648E−03 | −1.4269E−02 | 0.0000E+00 | 0.0000E+00 | 0.0000E+00 |
| S11 | −3.0742E−02 | −1.8466E−02 | −1.6402E−02 | −2.0673E−02 | 0.0000E+00 | 0.0000E+00 | 0.0000E+00 |
| S12 | −8.1153E−02 | 4.1905E−02 | 2.5951E−02 | 1.3855E−02 | 0.0000E+00 | 0.0000E+00 | 0.0000E+00 |
| S13 | −2.0225E−01 | −6.7602E−01 | 5.2265E−01 | −9.4443E−01 | 1.8758E+00 | −9.8445E−01 | 0.0000E+00 |
| S14 | 1.3407E−01 | −8.2730E−01 | 8.1065E−01 | −3.5203E−01 | 7.2084E−02 | −5.6781E−03 | 0.0000E+00 |

Figure 72:
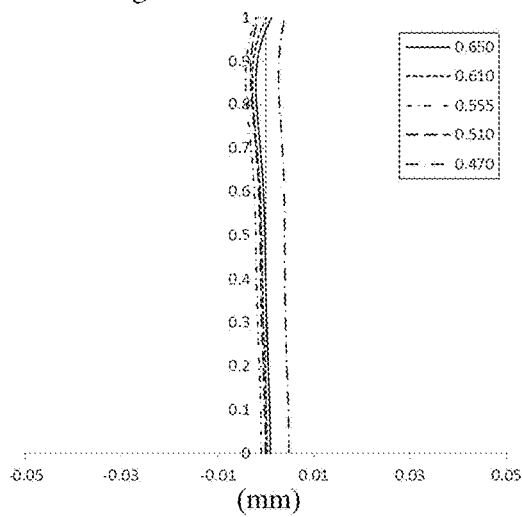
FIGS. 72-75 respectively illustrate a longitudinal aberration curve, an astigmatic curve, a distortion curve, and a lateral color curve of the optical imaging system according to Embodiment 15.
Figure 73:
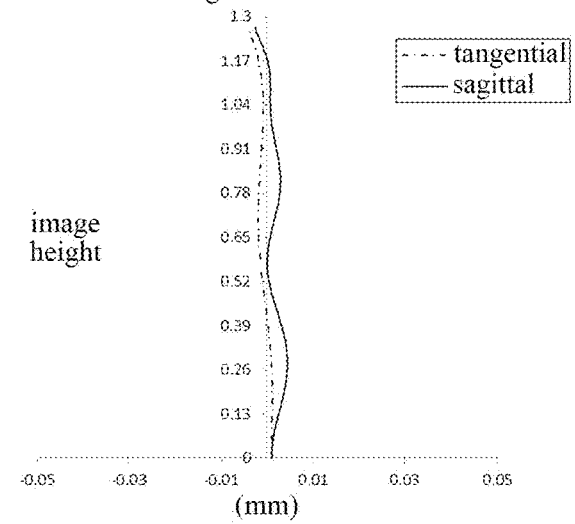
Figure 74:
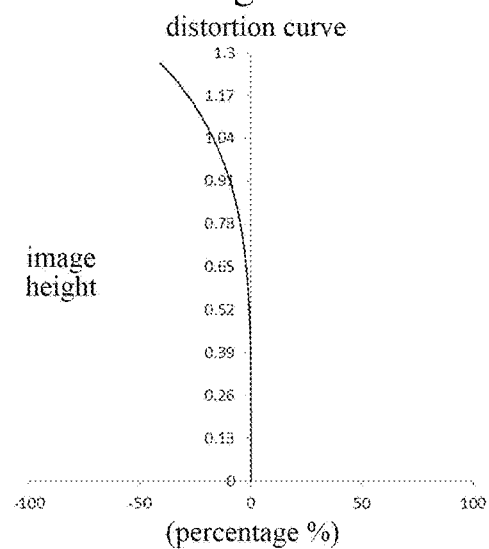
Figure 75:
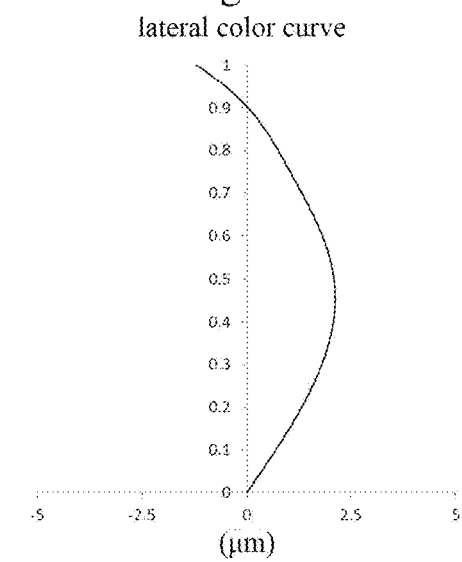

FIG. 72 illustrates the longitudinal aberration curve of the optical imaging system according to Embodiment 15, representing deviations of focal points of light of different wavelengths converged after passing through the optical system. FIG. 73 illustrates the astigmatic curve of the optical imaging system according to Embodiment 15, representing a curvature of the tangential image plane and a curvature of the sagittal image plane. FIG. 74 illustrates the distortion curve of the optical imaging system according to Embodiment 15, representing amounts of distortion at different viewing angles. FIG. 75 illustrates the lateral color curve of the optical imaging system according to Embodiment 15, representing deviations of different image heights on the image plane after light passes through the optical imaging system. In summary, it can be seen from FIGS. 71-75 that the optical imaging system according to Embodiment 15 is applicable to portable electronic products and has a large aperture, a good imaging quality, and wide-angle characteristics.

Embodiment 16

An optical imaging system according to Embodiment 16 of the present disclosure is described with reference to FIGS. 76-80.

Figure 76:
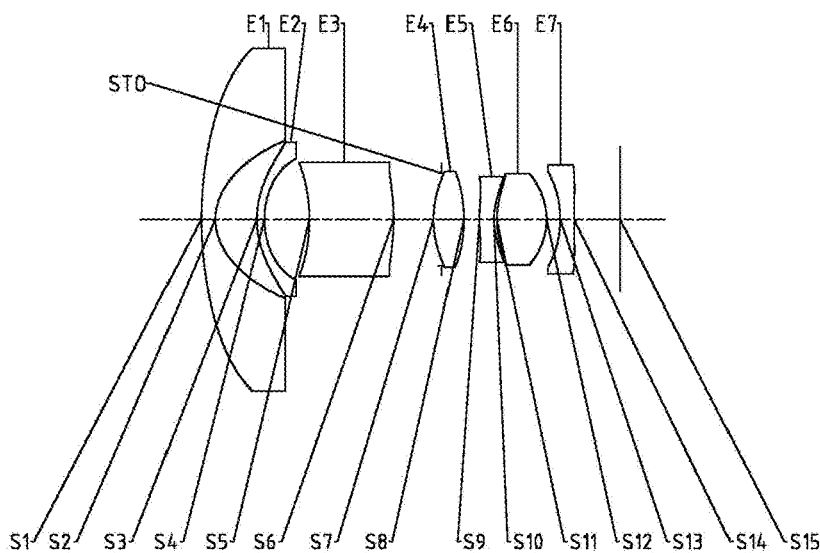
FIG. 76 is a schematic structural diagram illustrating an optical imaging system according to Embodiment 16.

FIG. 76 is a schematic structural diagram illustrating the optical imaging system according to Embodiment 16. The optical imaging system includes, sequentially from an object side to an image side, a first lens E1, a second lens E2, a third lens E3, a fourth lens E4, a fifth lens E5, a sixth len E6, and a seventh lens E7.

The first lens E1 may have a negative refractive power. An object-side surface S1 of the first lens E1 may be a convex surface, and an image-side surface S2 of the first lens E1 may be a concave surface.

The second lens E2 may have a positive refractive power. An object-side surface S3 of the second lens E2 may be a convex surface, and an image-side surface S4 of the second lens E2 may be a concave surface.

The third lens E3 may have a negative refractive power. An object-side surface S5 of the third lens E3 may be a concave surface, and an image-side surface S6 of the third lens E3 may be a convex surface.

The fourth lens E4 may have a positive refractive power. An object-side surface S7 of the fourth lens E4 may be a convex surface, and an image-side surface S8 of the fourth lens E4 may be a convex surface.

The fifth lens E5 may have a negative refractive power. An object-side surface S9 of the fifth lens E5 may be a convex surface, and an image-side surface S10 of the fifth lens E5 may be a concave surface.

The sixth lens E6 may have a positive refractive power. An object-side surface S11 of the sixth lens E6 may be a convex surface, and an image-side surface S12 of the sixth lens E6 may be a convex surface.

The seventh lens E7 may have a negative refractive power. An object-side surface S13 of the seventh lens E7 may be a concave surface, and an image-side surface S14 of the seventh lens E7 may be a concave surface.

Table 46 below shows the effective focal lengths f1-f7 of the first to seventh lenses E1-E7, the total effective focal length f of the optical imaging system, the total length TTL of the optical imaging system, and the half of the diagonal length ImgH of the effective pixel area of an electronic photosensitive element.

TABLE 46

| f1(mm) | −2.15 | f(mm) | 0.80 |
|---|---|---|---|
| f2(mm) | −64.01 | TTL(mm) | 7.50 |
| f3(mm) | −464.66 | ImgH(mm) | 1.30 |
| f4(mm) | 2.16 | | |
| f5(mm) | −2.52 | | |
| f6(mm) | 1.29 | | |
| f7(mm) | −2.39 | | |

Table 47 below shows the surface type, the radius of curvature, the thickness, the material and the conic coefficient of each lens of the optical imaging system in this embodiment. The units of the radius of curvature and the thickness are both shown in millimeters (mm).

TABLE 47

| surface number | surface type | radius of curvature | thickness | material refractive index | abbe number | conic coefficient |
|---|---|---|---|---|---|---|
| OBJ | spherical | infinite | infinite | | | |
| S1 | aspheric | 6.7409 | 0.2500 | 1.54 | 55.7 | −6.8703 |
| S2 | aspheric | 0.9724 | 0.7462 | | | −0.8584 |
| S3 | aspheric | 1.7127 | 0.1348 | 1.55 | 64.1 | 0.2735 |
| S4 | aspheric | 1.5874 | 0.8067 | | | 0.9109 |
| S5 | aspheric | −3.1871 | 1.5134 | 1.67 | 20.4 | 5.2247 |
| S6 | aspheric | −3.8323 | 0.8560 | | | −8.5561 |
| STO | spherical | infinite | −0.1413 | | | |
| S7 | aspheric | 1.9151 | 0.5341 | 1.55 | 64.1 | 0.4571 |
| S8 | aspheric | −2.7904 | 0.2781 | | | 2.5612 |
| S9 | aspheric | 3.3123 | 0.2600 | 1.67 | 20.4 | −50.9350 |
| S10 | aspheric | 1.0818 | 0.0517 | | | −7.9053 |
| S11 | aspheric | 1.2554 | 0.8939 | 1.54 | 55.7 | −10.1320 |
| S12 | aspheric | −1.1655 | 0.2431 | | | −1.8377 |
| S13 | aspheric | −2.0231 | 0.2500 | 1.67 | 20.4 | 0.2233 |
| S14 | aspheric | 7.9581 | 0.8233 | | | 0.0000 |
| S15 | spherical | infinite | | | | |
| S16 | spherical | infinite | | | | |
| S17 | spherical | infinite | | | | |

Table 48 below shows the high-order coefficients applicable to the aspheric surfaces S1-S14 of the aspheric lenses in this embodiment. The surface type of each aspheric surface may be defined by the formula (1) given in Embodiment 1.

TABLE 48

| surface number | A4 | A6 | A8 | A10 | A12 | A14 | A16 |
|---|---|---|---|---|---|---|---|
| S1 | 1.7160E−03 | 1.5262E−04 | −6.7409E−06 | 1.8743E−06 | −3.5650E−08 | 0.0000E+00 | 0.0000E+00 |
| S2 | 2.2693E−03 | 5.6830E−03 | 1.0798E−03 | 1.6469E−03 | 2.1724E−05 | 0.0000E+00 | 0.0000E+00 |
| S3 | −2.9886E−02 | −1.0712E−02 | −1.3421E−03 | −2.9571E−03 | 0.0000E+00 | 0.0000E+00 | 0.0000E+00 |
| S4 | 1.5877E−02 | −1.1268E−02 | 3.6109E−03 | −8.4881E−03 | 0.0000E+00 | 0.0000E+00 | 0.0000E+00 |
| S5 | 4.2088E−03 | 3.7491E−03 | 7.3040E−03 | 2.0876E−03 | 0.0000E+00 | 0.0000E+00 | 0.0000E+00 |
| S6 | 3.1820E−03 | 1.3259E−02 | 7.8072E−03 | 6.5239E−03 | 0.0000E+00 | 0.0000E+00 | 0.0000E+00 |
| S7 | −1.2294E−02 | −8.2805E−03 | 0.0000E+00 | 0.0000E+00 | 0.0000E+00 | 0.0000E+00 | 0.0000E+00 |
| S8 | −4.0834E−02 | 3.8783E−02 | −5.9181E−03 | 1.8351E−03 | 0.0000E+00 | 0.0000E+00 | 0.0000E+00 |
| S9 | −1.5780E−01 | −2.2525E−03 | −2.5308E−02 | −5.0645E−02 | 0.0000E+00 | 0.0000E+00 | 0.0000E+00 |
| S10 | −1.0665E−02 | 7.3901E−02 | −3.3886E−02 | −6.6898E−02 | 0.0000E+00 | 0.0000E+00 | 0.0000E+00 |
| S11 | −1.7760E−03 | 2.0956E−02 | 9.5957E−03 | −7.2931E−02 | 0.0000E+00 | 0.0000E+00 | 0.0000E+00 |
| S12 | −6.4669E−02 | −3.6759E−02 | 4.1141E−03 | −2.3479E−03 | 0.0000E+00 | 0.0000E+00 | 0.0000E+00 |
| S13 | −7.8994E−02 | 2.9373E−02 | 1.4383E−02 | 2.1908E−02 | 0.0000E+00 | 0.0000E+00 | 0.0000E+00 |
| S14 | −1.0668E−01 | −1.2308E−02 | 5.4386E−02 | −1.5946E−02 | 0.0000E+00 | 0.0000E+00 | 0.0000E+00 |

Figure 77:
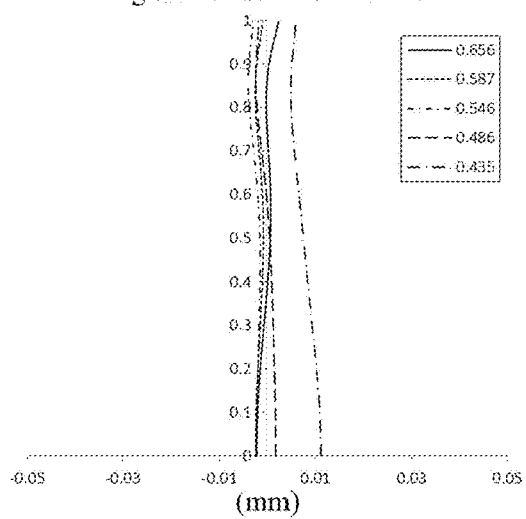
FIGS. 77-80 respectively illustrate a longitudinal aberration curve, an astigmatic curve, a distortion curve, and a lateral color curve of the optical imaging system according to Embodiment 16.
Figure 78:
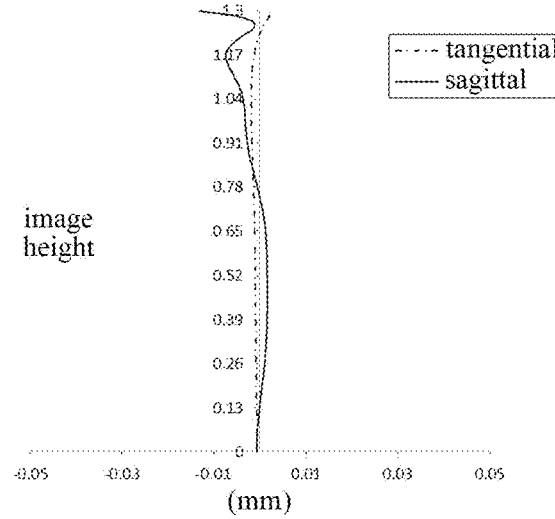
Figure 79:
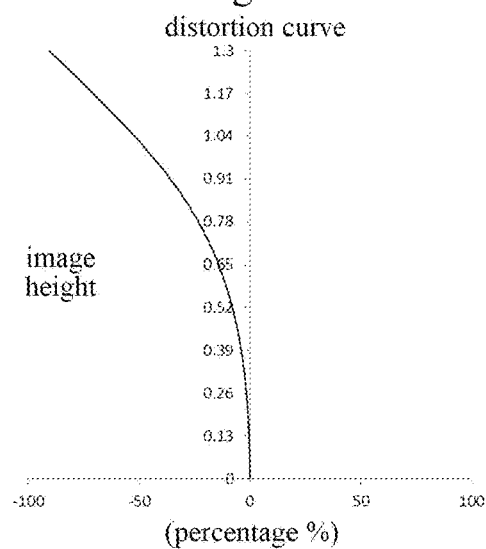
Figure 80:
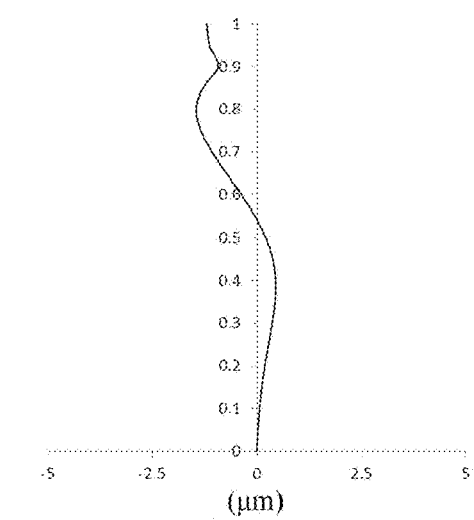

FIG. 77 illustrates the longitudinal aberration curve of the optical imaging system according to Embodiment 16, representing deviations of focal points of light of different wavelengths converged after passing through the optical system. FIG. 78 illustrates the astigmatic curve of the optical imaging system according to Embodiment 16, representing a curvature of the tangential image plane and a curvature of the sagittal image plane. FIG. 79 illustrates the distortion curve of the optical imaging system according to Embodiment 16, representing amounts of distortion at different viewing angles. FIG. 80 illustrates the lateral color curve of the optical imaging system according to Embodiment 16, representing deviations of different image heights on the image plane after light passes through the optical imaging system. In summary, it can be seen from FIGS. 76-80 that the optical imaging system according to Embodiment 16 is applicable to portable electronic products and has a large aperture, a good imaging quality, and wide-angle characteristics.

To sum up, Embodiments 1-16 respectively satisfy the relationships shown in Table 49 below.

TABLE 49

| | Embodiment | | | | | | | |
|---|---|---|---|---|---|---|---|---|
| Conditional Expression | 1 | 2 | 3 | 4 | 5 | 6 | 7 | 8 |
| f/EPD | 2.03 | 1.50 | 1.34 | 2.03 | 1.88 | 1.65 | 1.45 | 1.35 |
| HFOV | 78.1 | 63.1 | 63.1 | 72.4 | 69.1 | 75.0 | 75.0 | 75.0 |
| f1/f | −1.49 | −1.77 | −1.97 | −1.53 | −1.63 | −1.63 | −1.75 | −1.84 |
| TTL/ImgH | 2.14 | 3.00 | 4.33 | 2.14 | 2.63 | 2.50 | 3.75 | 3.75 |
| f/R12 | −1.20 | −1.03 | −0.69 | −1.25 | −1.19 | −1.18 | −0.89 | −0.84 |

TABLE 49-continued

| Conditional Expression | | | | | | | | |
|---|---|---|---|---|---|---|---|---|
| f/R3 | 1.28 | 0.83 | 0.35 | 1.26 | 1.14 | 1.00 | 0.66 | 0.61 |
| f1/f7 | 1.30 | 1.00 | 0.62 | 1.34 | 1.36 | 1.09 | 0.73 | 0.67 |
| \|R5 + R6\|/\|R5 − R6\| | 2.85 | 3.13 | 9.84 | 2.68 | 2.89 | 2.97 | 6.65 | 12.68 |
| f4/f6 | 0.92 | 1.15 | 1.79 | 0.91 | 0.95 | 1.06 | 1.40 | 1.45 |
| \|f5/R2\| + \|f5/R3\| | 1.24 | 1.89 | 3.72 | 1.38 | 1.43 | 1.59 | 2.05 | 2.18 |
| T12/TTL | 0.25 | 0.26 | 0.27 | 0.25 | 0.27 | 0.26 | 0.29 | 0.29 |
| \|N3 + N5 + N7\|/3 | 1.67 | 1.67 | 1.67 | 1.67 | 1.67 | 1.67 | 1.67 | 1.67 |
| \|f5 + f6 + f7\|\|f2 + f3 + f4\| | 1.50 | 1.02 | 0.09 | 1.74 | 1.34 | 0.93 | 0.13 | 0.05 |

| | Embodiment | | | | | | | |
|---|---|---|---|---|---|---|---|---|
| Conditional Expression | 9 | 10 | 11 | 12 | 13 | 14 | 15 | 16 |
| f/EPD | 1.25 | 1.85 | 2.03 | 1.85 | 1.65 | 1.55 | 2.00 | 1.50 |
| HFOV | 75.0 | 87.1 | 86.9 | 86.9 | 86.9 | 86.9 | 66.4 | 86.9 |
| f1/f | −2.41 | −1.97 | −1.71 | −1.74 | −1.86 | −1.94 | −2.04 | −2.69 |
| TTL/ImgH | 4.67 | 5.23 | 3.00 | 3.00 | 3.50 | 4.08 | 5.91 | 5.77 |
| f/R12 | −0.56 | −0.74 | −0.49 | −0.46 | −0.48 | −0.52 | −0.38 | −0.69 |
| f/R3 | 0.22 | 0.52 | 0.49 | 0.46 | 0.41 | 0.34 | 0.18 | 0.47 |
| f1/f7 | 0.56 | 0.75 | 1.08 | 1.03 | 1.07 | 1.02 | 0.12 | 0.90 |
| \|R5 + R6\|/\|R5 − R6\| | 7.16 | 20.25 | 0.74 | 0.97 | 1.22 | 2.09 | 5.88 | 10.88 |
| f4/f6 | 1.41 | 1.55 | 0.55 | 0.63 | 0.73 | 0.95 | 0.78 | 1.68 |
| \|f5/R2\| + \|f5/R3\| | 4.74 | 1.99 | 2.54 | 2.67 | 2.79 | 3.23 | 5.65 | 1.76 |
| T12/TTL | 0.30 | 0.10 | 0.32 | 0.33 | 0.36 | 0.38 | 0.36 | 0.10 |
| \|N3 + N5 + N7\|/3 | 1.70 | 1.67 | 1.67 | 1.67 | 1.67 | 1.67 | 1.67 | 1.67 |
| \|f5 + f6 + f7\|\|f2 + f3 + f4\| | 0.70 | 0.00 | 1.19 | 0.81 | 0.63 | 0.32 | 1.21 | 0.01 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging system comprising, sequentially from an object side to an image side,
    a first lens having a negative refractive power;
    a second lens having a refractive power;
    a third lens having a negative refractive power;
    a fourth lens having a positive refractive power;
    a fifth lens having a negative refractive power;
    a sixth lens having a positive refractive power; and
    a seventh lens having a negative refractive power,
    wherein there is an air spacing on an optical axis between any two adjacent lenses in the first to seventh lenses, and
    an effective focal length f of the optical imaging system and an entrance pupil diameter EPD of the optical imaging system satisfy: f/EPD≤2.10, and the effective focal length f of the optical imaging system and an effective focal length f1 of the first lens satisfy: f1/f>3, and
    wherein the optical imaging system is a seven-piece optical imaging system.

2. The optical imaging system according to claim 1, wherein an axial distance TTL from an object-side surface of the first lens to an image plane and half of a diagonal length ImgH of an effective pixel area on the image plane satisfy: 2≤TTL/ImgH≤6.

3. The optical imaging system according to claim 1, wherein the effective focal length f of the optical imaging system and a radius of curvature R12 of an image-side surface of the sixth lens satisfy: −1.5≤f/R12≤0.

4. The optical imaging system according to claim 1, wherein the effective focal length f of the optical imaging system and a radius of curvature R3 of an object-side surface of the second lens satisfy: 0≤f/R3≤1.5.

5. The optical imaging system according to claim 1, wherein the effective focal length f1 of the first lens and an effective focal length f7 of the seventh lens satisfy: 0<f1/f7≤1.5.

6. The optical imaging system according to claim 1, wherein a radius of curvature R5 of an object-side surface of the third lens and a radius of curvature R6 of an image-side surface of the third lens satisfy: 0.5≤|R5+R6|/|R5−R6|.

7. The optical imaging system according to claim 1, wherein an effective focal length f4 of the fourth lens and an effective focal length f6 of the sixth lens satisfy: 0≤f4/f6≤2.

8. The optical imaging system according to claim 1, wherein an effective focal length f5 of the fifth lens, a radius of curvature R2 of an image-side surface of the first lens, and a radius of curvature R3 of an object-side surface of the second lens satisfy: 2≤|f5/R2|+|f5/R3|≤15.

9. The optical imaging system according to claim 1, wherein the axial distance TTL from the object-side surface of the first lens to the image plane and an air spacing T12 on the optical axis between the first lens and the second lens satisfy: 0<T12/TTL<0.5.

10. The optical imaging system according to claim 1, wherein a refractive index N3 of the third lens, a refractive index N5 of the fifth lens, and a refractive index N7 of the seventh lens satisfy: 1.5≤|N3+N5+N7|/3.

11. An optical imaging system comprising, sequentially from an object side to an image side,
    a first lens having a negative refractive power;
    a second lens having a refractive power, wherein an object-side surface of the second lens is a convex surface;
    a third lens having a negative refractive power, wherein an object-side surface of the third lens is a concave surface;
    a fourth lens having a positive refractive power;
    a fifth lens having a negative refractive power;

a sixth lens having a positive refractive power; and
a seventh lens having a negative refractive power,
wherein an effective focal length f of the optical imaging system and an entrance pupil diameter EPD of the optical imaging system satisfy: f/EPD≤2.10, and half of a maximal field-of-view HFOV of the optical imaging system satisfies: HFOV≥60°, and
wherein the optical imaging system is a seven-piece optical imaging system.

12. The optical imaging system according to claim 11, wherein an axial distance TTL from an object-side surface of the first lens to an image plane and half of a diagonal length ImgH of an effective pixel area on the image plane satisfy: 2≤TTL/ImgH≤6.

13. The optical imaging system according to claim 11, wherein the effective focal length f of the optical imaging system and a radius of curvature R12 of an image-side surface of the sixth lens satisfy: −1.5≤f/R12≤0.

14. The optical imaging system according to claim 11, wherein the effective focal length f of the optical imaging system and a radius of curvature R3 of the object-side surface of the second lens satisfy: 0≤f/R3≤1.5.

15. The optical imaging system according to claim 11, wherein an effective focal length f1 of the first lens and an effective focal length f7 of the seventh lens satisfy: 0≤f1/f7≤1.5.

16. The optical imaging system according to claim 11, wherein a radius of curvature R5 of the object-side surface of the third lens and a radius of curvature R6 of an image-side surface of the third lens satisfy: 0.5≤|R5+R6|/|R5−R6|.

17. The optical imaging system according to claim 11, wherein an effective focal length f4 of the fourth lens and an effective focal length f6 of the sixth lens satisfy: 0≤f4/f6≤2.

18. The optical imaging system according to claim 11, wherein an effective focal length f5 of the fifth lens, a radius of curvature R2 of an image-side surface of the first lens, and a radius of curvature R3 of the object-side surface of the second lens satisfy: 2≤|f5/R2|+|f5/R3|≤15.

19. The optical imaging system according to claim 11, wherein the axial distance TTL from the object-side surface of the first lens to the image plane and an air spacing T12 on an optical axis between the first lens and the second lens satisfy: 0<T12/TTL<0.5.

20. The optical imaging system according to claim 11, wherein a refractive index N3 of the third lens, a refractive index N5 of the fifth lens, and a refractive index N7 of the seventh lens satisfy: 1.5≤|N3+N5+N7|/3.

* * * * *